United States Patent
Takahashi et al.

(10) Patent No.: US 10,634,694 B2
(45) Date of Patent: Apr. 28, 2020

(54) ATTITUDE ESTIMATION APPARATUS AND TRANSPORTATION MACHINE

(71) Applicant: YAMAHA HATSUDOKI KABUSHIKI KAISHA, Iwata-shi, Shizuoka (JP)

(72) Inventors: Go Takahashi, Shizuoka (JP); Takahiro Fujii, Shizuoka (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 183 days.

(21) Appl. No.: 16/000,262

(22) Filed: Jun. 5, 2018

(65) Prior Publication Data

US 2018/0284150 A1    Oct. 4, 2018

Related U.S. Application Data

(63) Continuation of application No. PCT/JP2017/014422, filed on Apr. 6, 2017.

(30) Foreign Application Priority Data

Apr. 6, 2016    (JP) .................................. 2016-076545

(51) Int. Cl.
*G01P 15/09*    (2006.01)
*G01P 15/08*    (2006.01)
(Continued)

(52) U.S. Cl.
CPC ........... *G01P 15/08* (2013.01); *B60W 40/076* (2013.01); *B60W 40/11* (2013.01);
(Continued)

(58) Field of Classification Search
CPC .... G01P 15/08; G01P 3/44; G01P 3/42; G01P 15/18; B60W 40/11; B60W 40/13;
(Continued)

(56) References Cited

U.S. PATENT DOCUMENTS

| 6,192,305 B1* | 2/2001 | Schiffmann ............ B60R 21/01 180/271 |
| 2005/0197755 A1 | 9/2005 | Knowlton et al. |

(Continued)

FOREIGN PATENT DOCUMENTS

| EP | 1862764 A1 | 12/2007 |
| EP | 2937255 A2 | 10/2015 |

(Continued)

OTHER PUBLICATIONS

INTE-190BC1 extended European Search Report dated Mar. 29, 2019.

*Primary Examiner* — Adam R Mott
(74) *Attorney, Agent, or Firm* — Rabin & Berdo, P.C.

(57) ABSTRACT

An attitude estimation apparatus for estimating the attitude of a movable body includes an attitude estimation unit for estimating the roll angle of the movable body and for using a calculation process to estimate the offset error for at least one of first and second angular velocity detection units and first, second and third acceleration detection units. The attitude estimation unit includes a plurality of Kalman filters that each receive at least two or more imaginary offset quantities for a detection unit of interest, the imaginary offset quantities being different from each other. Each of the Kalman filters uses detected values from the detection units, estimated values from the previous estimation operation and the imaginary offset quantities to calculate a likelihood, which indicates how reliable the estimated values are. The attitude estimation unit weights the estimated values from the Kalman filters based on the likelihood to estimate the roll angle of the movable body.

19 Claims, 51 Drawing Sheets

(51) Int. Cl.

| | |
|---|---|
| *B60W 40/112* | (2012.01) |
| *B60W 40/11* | (2012.01) |
| *B60W 40/13* | (2012.01) |
| *B60W 40/12* | (2012.01) |
| *G01C 19/00* | (2013.01) |
| *B60W 40/076* | (2012.01) |
| *G01P 21/00* | (2006.01) |
| *G01P 3/44* | (2006.01) |
| *G01C 21/16* | (2006.01) |
| *G01C 21/28* | (2006.01) |
| *G01P 3/42* | (2006.01) |
| *B62J 99/00* | (2020.01) |
| *G01P 15/18* | (2013.01) |

(52) U.S. Cl.
CPC .......... *B60W 40/112* (2013.01); *B60W 40/12* (2013.01); *B60W 40/13* (2013.01); *G01C 19/00* (2013.01); *G01C 21/16* (2013.01); *G01C 21/28* (2013.01); *G01P 3/42* (2013.01); *G01P 3/44* (2013.01); *G01P 21/00* (2013.01); *B60Q 2300/136* (2013.01); *B60T 2250/03* (2013.01); *B60T 2250/04* (2013.01); *B60W 2040/1307* (2013.01); *B60W 2300/36* (2013.01); *B60W 2520/10* (2013.01); *B60W 2520/105* (2013.01); *B60W 2520/125* (2013.01); *B60W 2520/14* (2013.01); *B60W 2520/16* (2013.01); *B60W 2520/18* (2013.01); *B62J 2099/002* (2013.01); *G01P 15/18* (2013.01)

(58) Field of Classification Search
CPC .. B60W 40/12; B60W 40/076; B60W 40/112; B60W 2040/1307; B60W 2520/14; B60W 2520/125; B60W 2520/10; B60W 2520/18; B60W 2520/16; B60W 2300/36; B60W 2520/105; G01C 19/00; G01C 21/16; G01C 21/28; B62J 2099/002; B60Q 2300/136; B60T 2250/03; B60T 2250/04

See application file for complete search history.

(56) References Cited

U.S. PATENT DOCUMENTS

| | | |
|---|---|---|
| 2007/0213904 A1 | 9/2007 | Watanabe et al. |
| 2009/0309793 A1 | 12/2009 | Loomis |
| 2011/0105957 A1 | 5/2011 | Kourogi et al. |
| 2012/0259526 A1* | 10/2012 | Inoue .................. B60W 40/112 701/70 |
| 2013/0073253 A1 | 3/2013 | Handa |
| 2015/0308827 A1 | 10/2015 | Fujii |

FOREIGN PATENT DOCUMENTS

| | | |
|---|---|---|
| JP | 2007-271605 A | 10/2007 |
| JP | 2009-073466 A | 4/2009 |
| JP | 2011-0128093 A | 6/2011 |
| JP | 2013-064695 A | 4/2013 |
| JP | 2015-209106 A | 11/2015 |
| WO | WO-2010/001970 A1 | 1/2010 |

\* cited by examiner

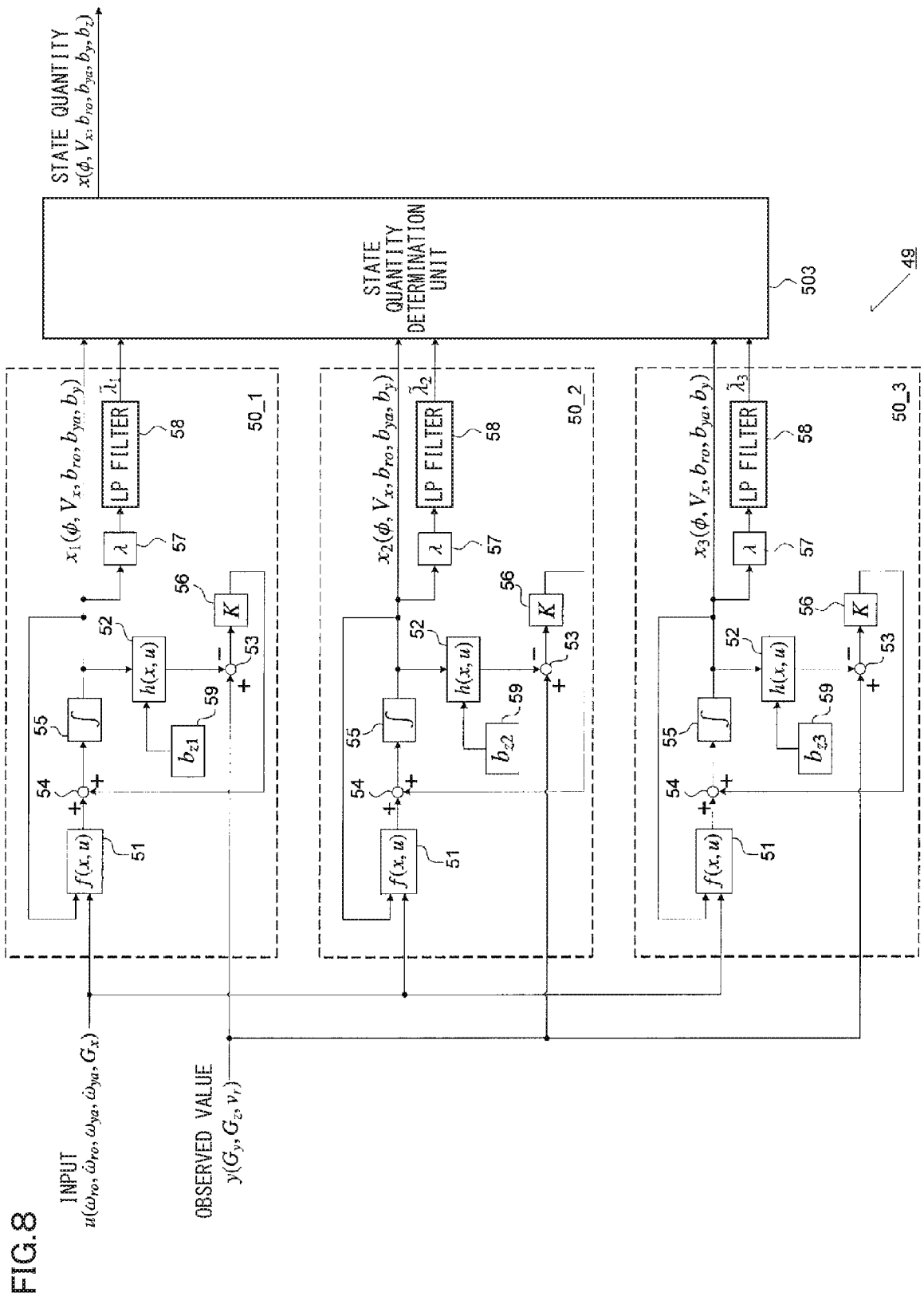

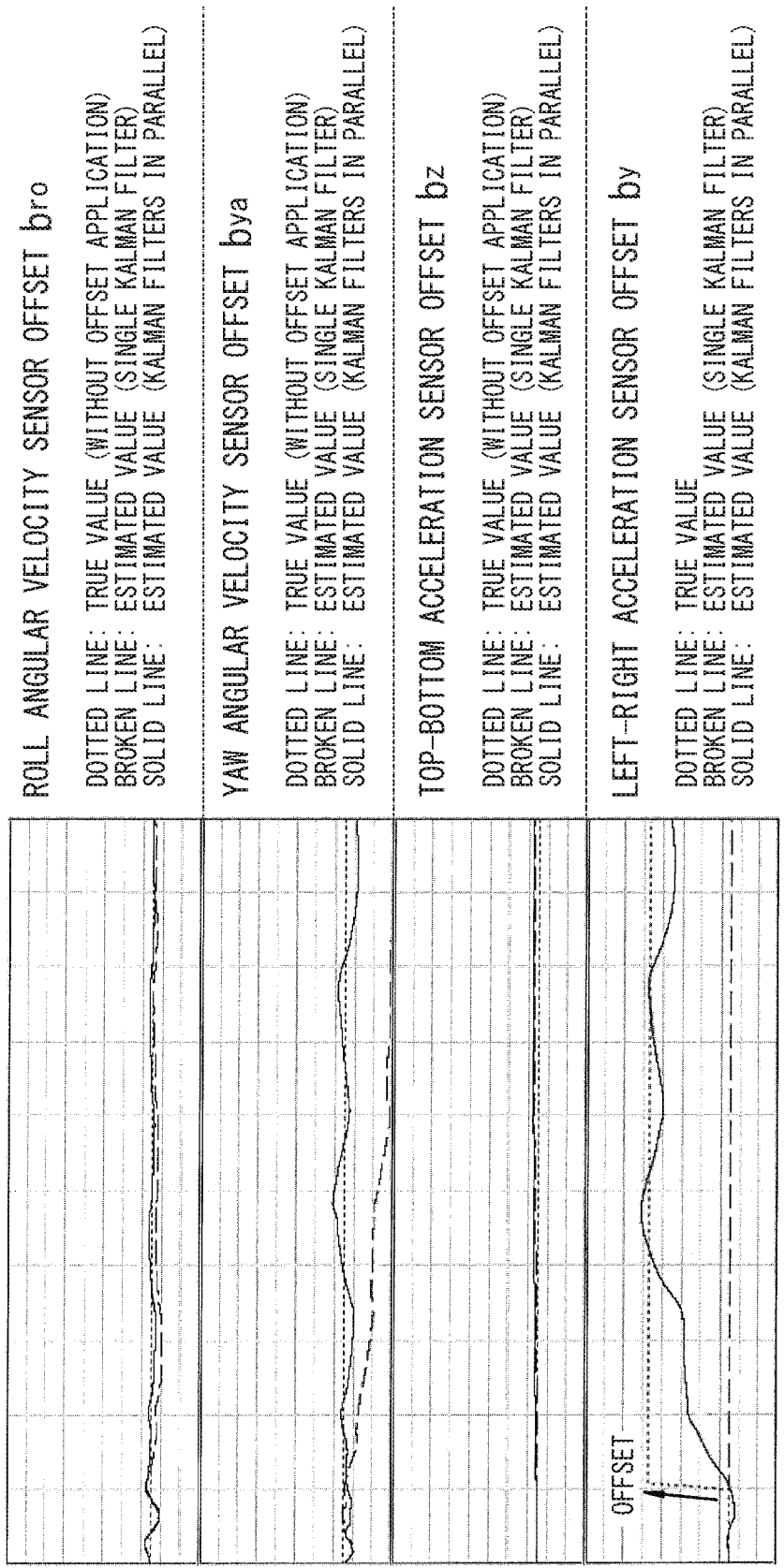

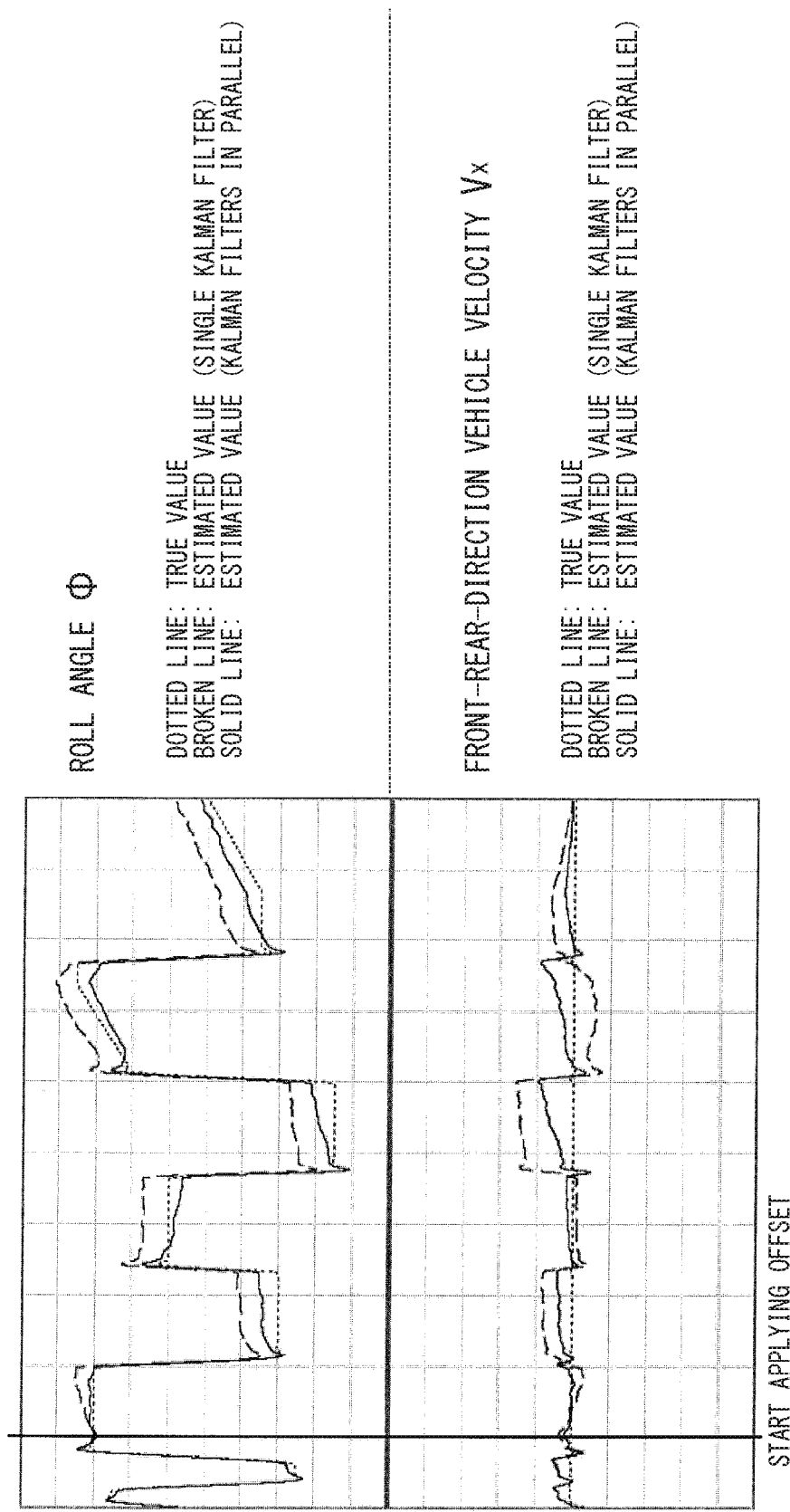

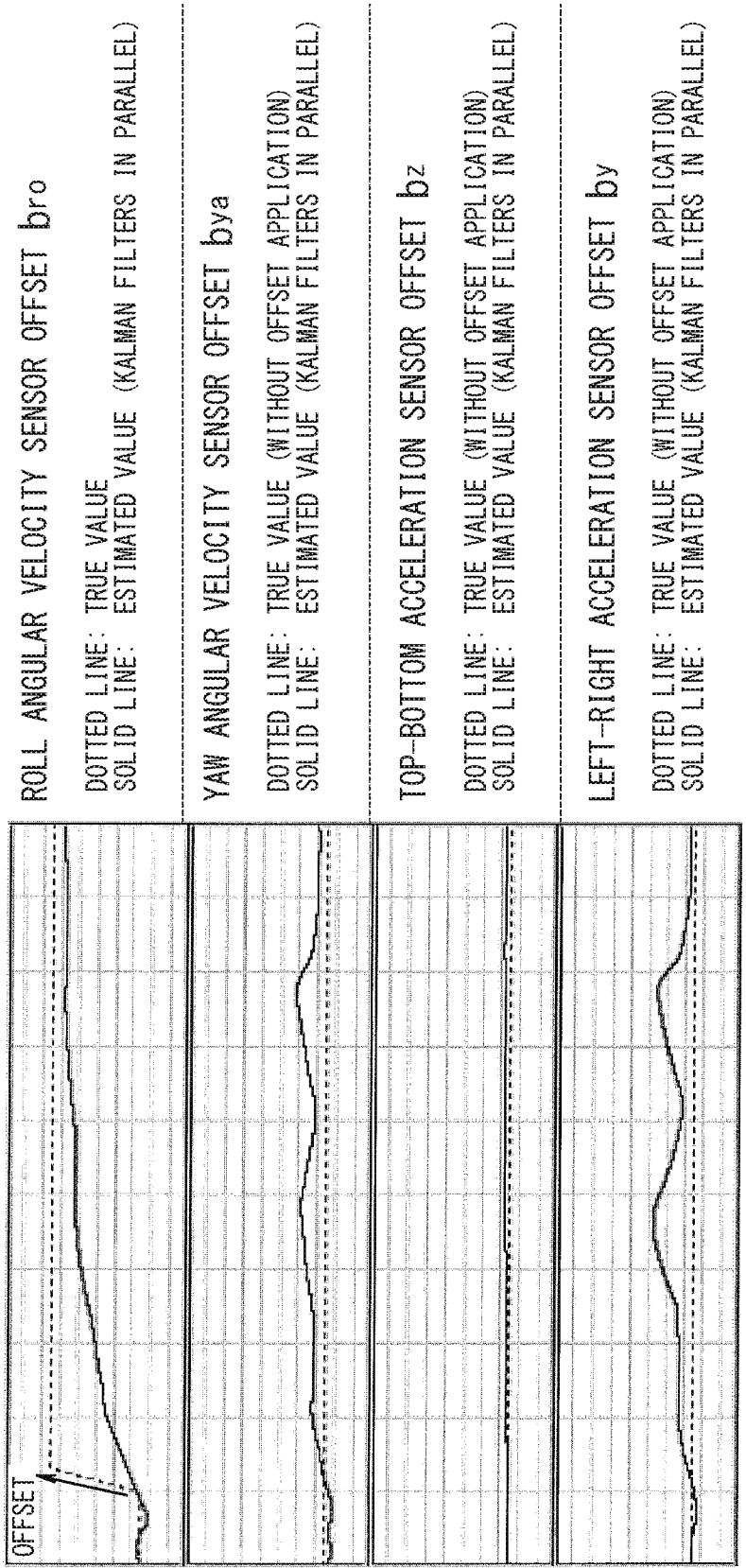

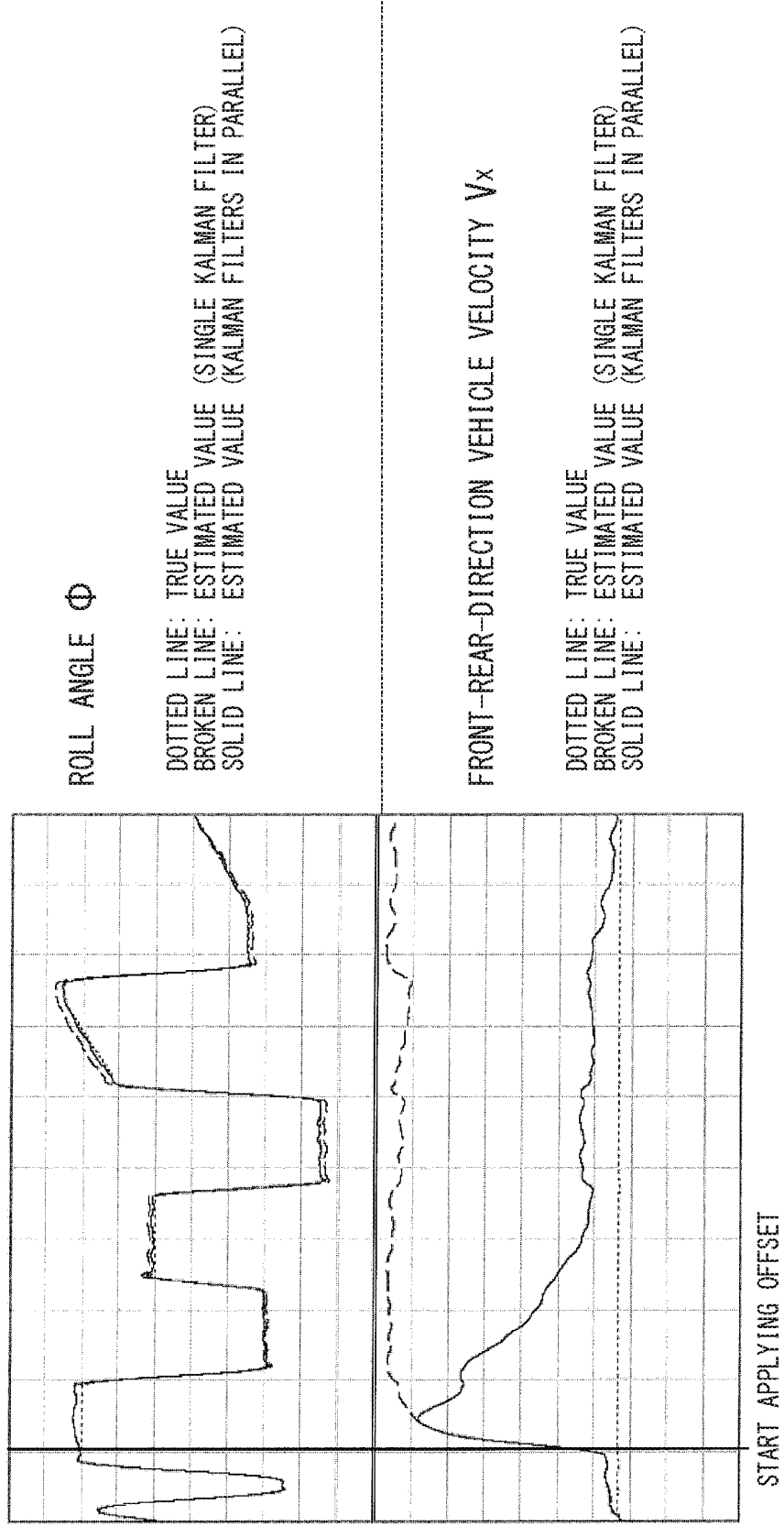

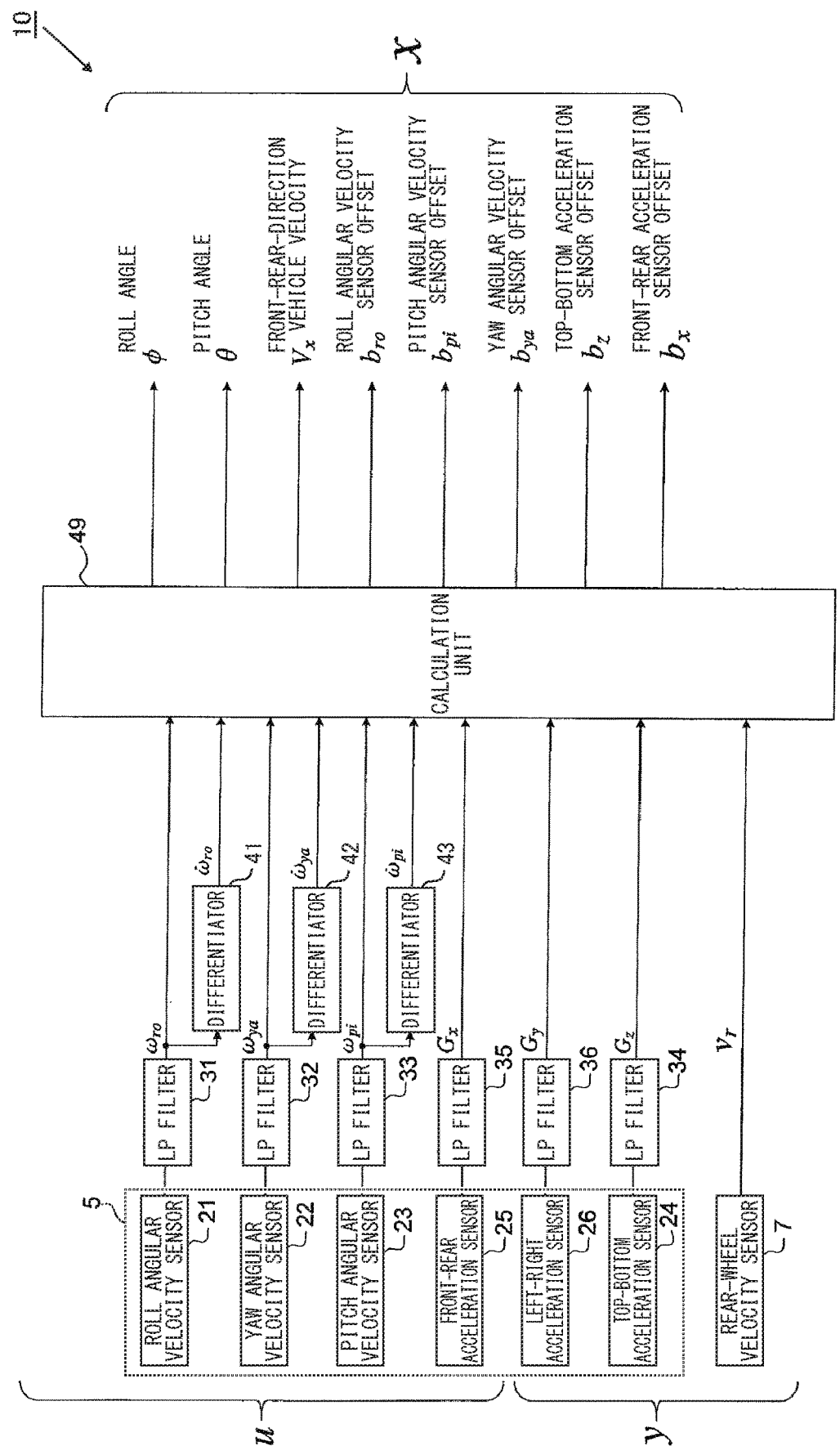

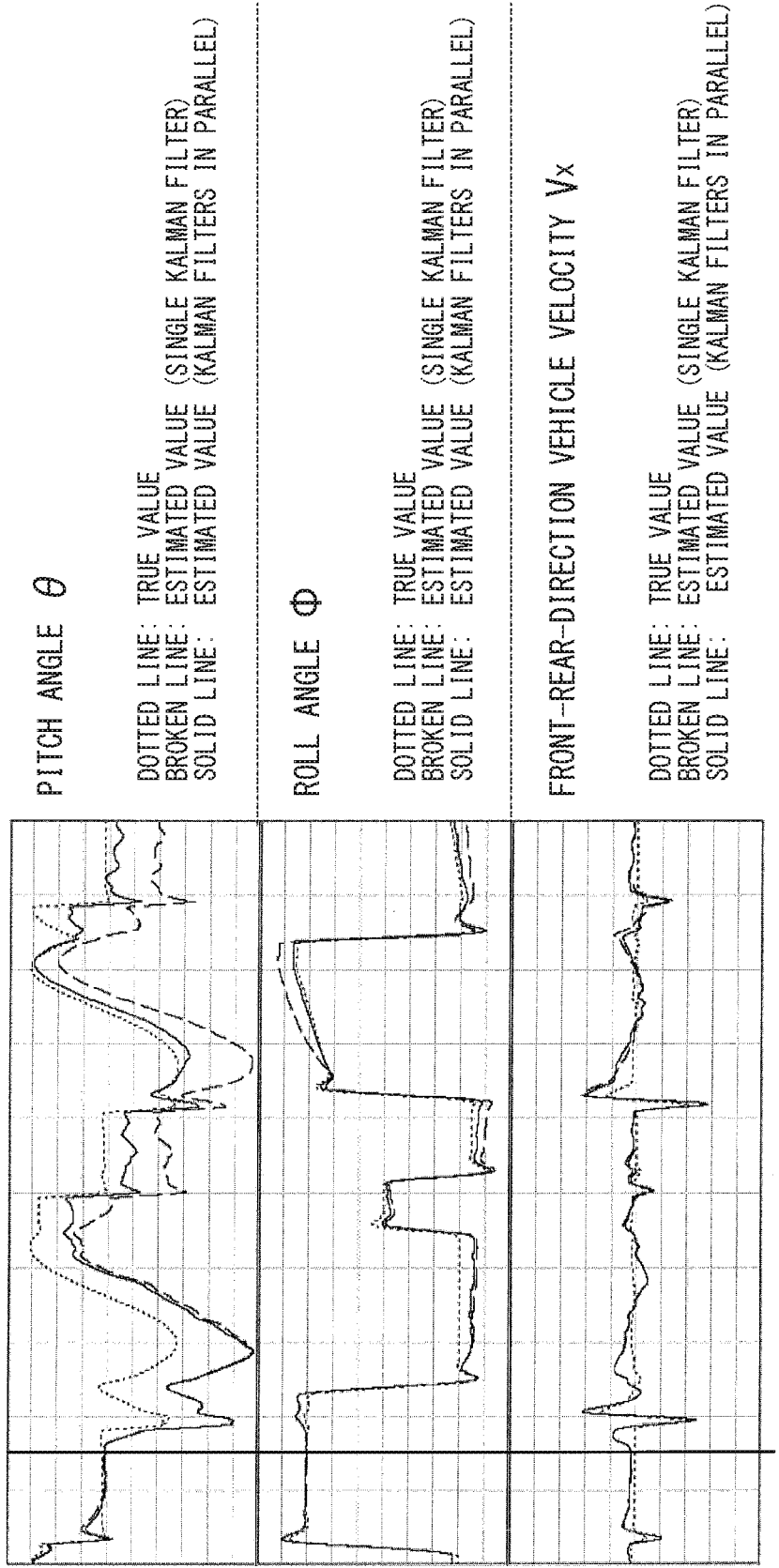

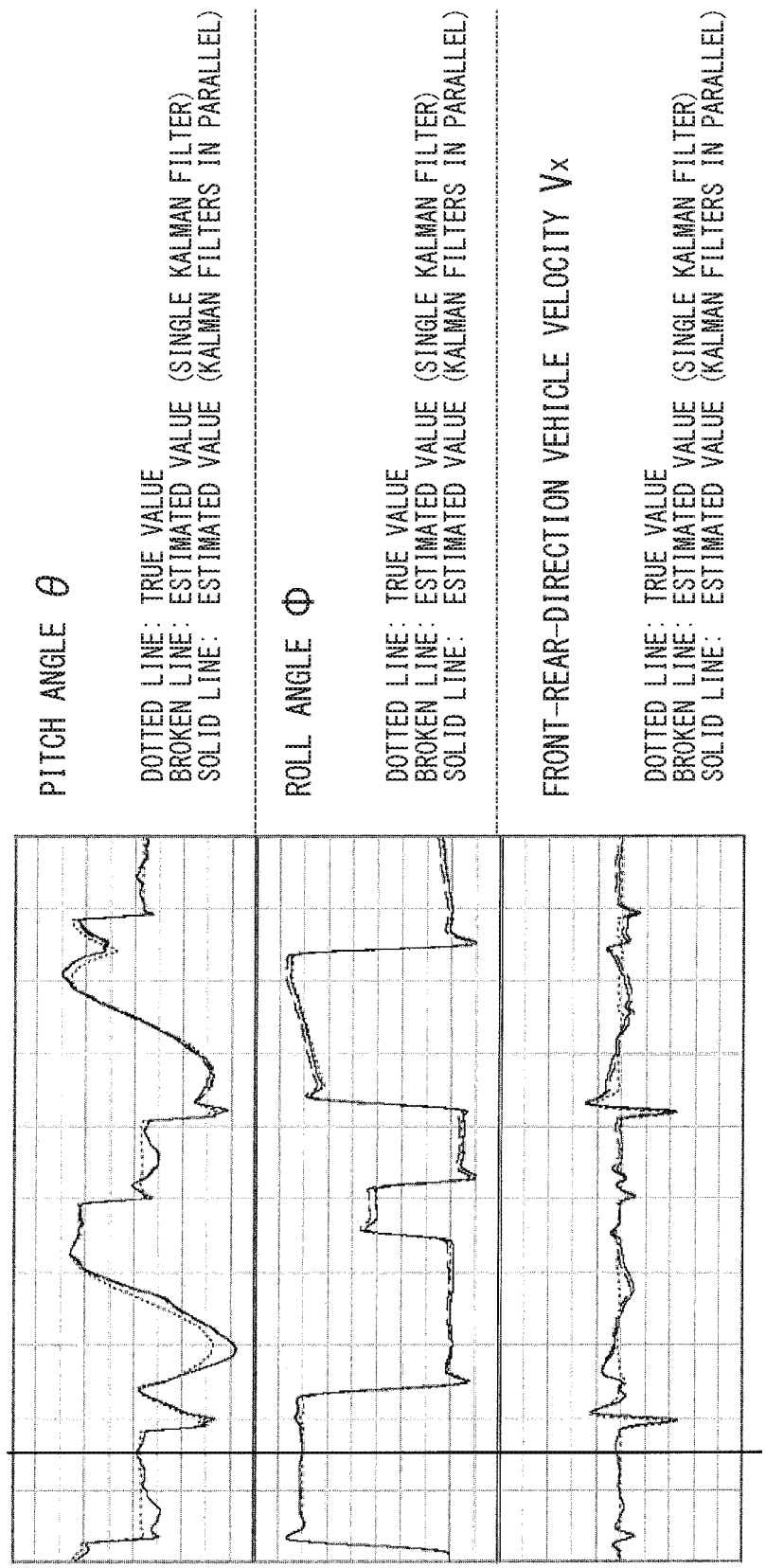

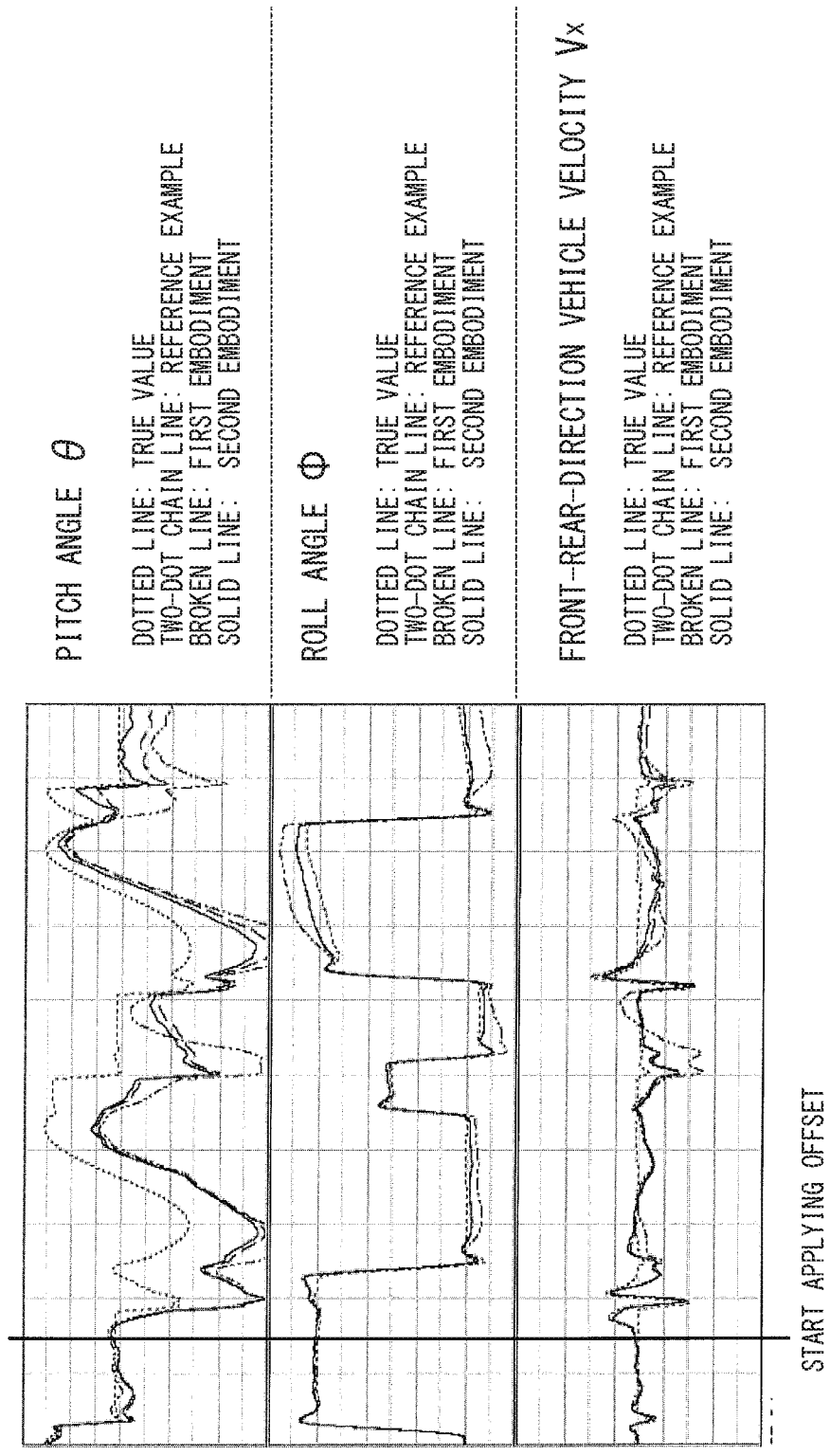

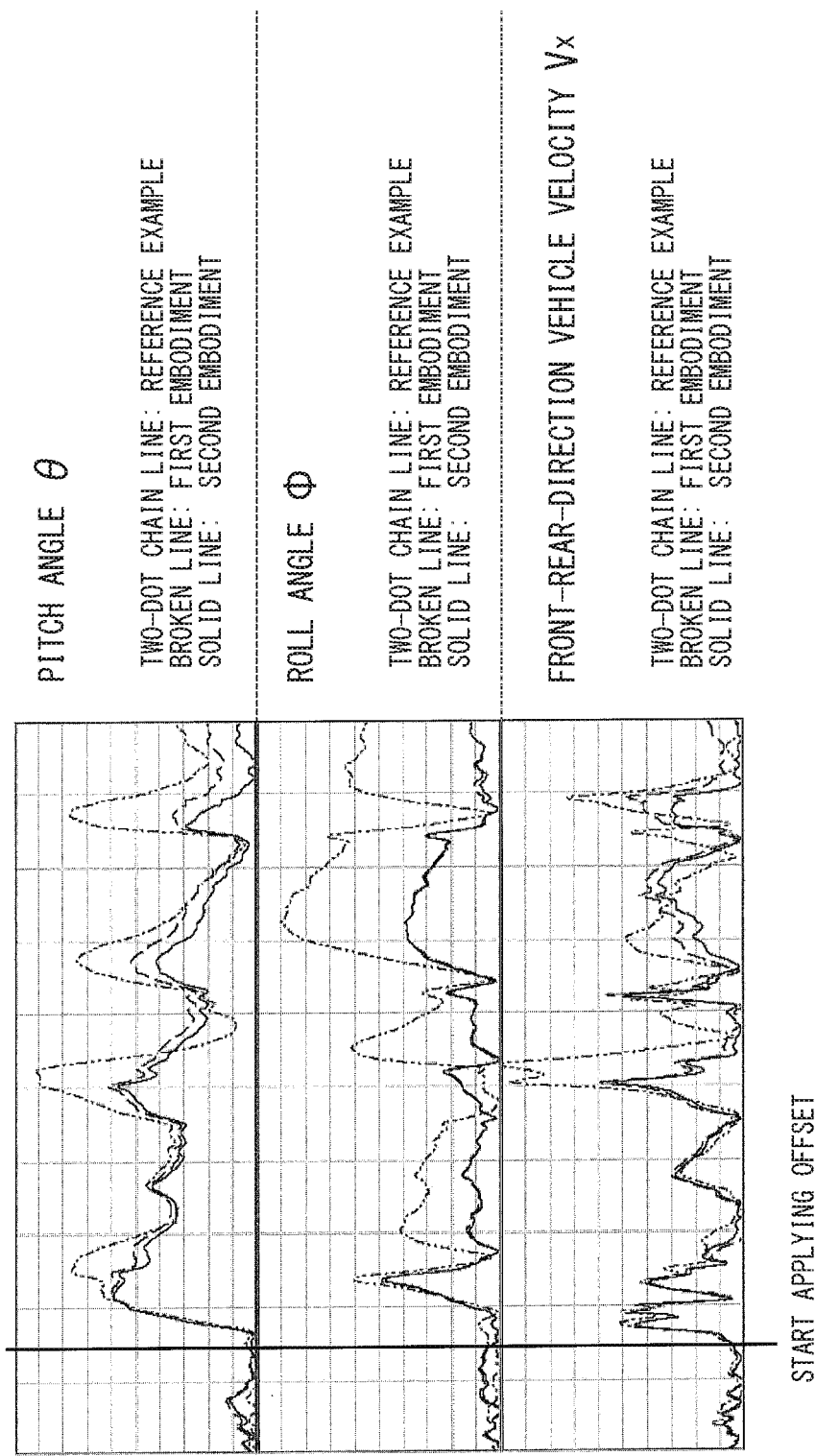

ATTITUDE ESTIMATION APPARATUS AND TRANSPORTATION MACHINE

TECHNICAL FIELD

The present invention relates to an attitude estimation apparatus and a transportation machine including the same.

BACKGROUND ART

Various estimation apparatus for estimating the roll angle of a vehicle such as motorcycle have been proposed. For example, the direction of the lighting unit may be controlled based on a roll angle estimated by an estimation apparatus to direct light in an appropriate direction from the lighting unit regardless of the inclination of the vehicle.

Patent Document 1 describes a vehicle-attitude estimation apparatus that estimates the roll angle and pitch angle based on detected values of the front/rear acceleration, lateral acceleration, top/bottom acceleration, yaw acceleration, and roll angular velocity of the vehicle, an estimated value of the front/rear vehicle-body velocity, and an estimated value of the pitch angular velocity.

PRIOR ART DOCUMENTS

Patent Documents

Patent Document 1: JP 2009-73466 A

SUMMARY OF THE INVENTION

Problems to be Solved by the Invention

In recent years, it has been desired to improve the estimation accuracy of attitude estimation apparatus.

An object of the present invention is to realize an attitude estimation apparatus with improved estimation accuracy for the attitude of a movable body, and a transportation machine that includes the same.

Means for Solving the Problems

An attitude estimation apparatus according to one aspect of the present invention is an attitude estimation apparatus for estimating an attitude of a movable body. The attitude estimation apparatus includes a first angular velocity detection unit configured to detect a first angular velocity, the first angular velocity being an angular velocity of the movable body about a first axis; a second angular velocity detection unit configured to detect a second angular velocity, the second angular velocity being an angular velocity of the movable body about a second axis, the second axis being in a different direction than that of the first axis; a first acceleration detection unit configured to detect a first acceleration, the first acceleration being an acceleration of the movable body in a first direction; a second acceleration detection unit configured to detect a second acceleration, the second acceleration being an acceleration of the movable body in a second direction, the second direction being different from the first direction; a third acceleration detection unit configured to detect a third acceleration, the third acceleration being an acceleration of the movable body in a third direction, the third direction being different from the first and second directions; a velocity information detection unit configured to detect information about a moving velocity in a direction of advance of the movable body; and an attitude estimation unit configured to estimate a roll angle of the movable body and estimate a first offset error using a calculation process, the first offset error being an offset error in at least one of the first angular velocity detection unit, the second angular velocity detection unit, the first acceleration detection unit, the second acceleration detection unit, or the third acceleration detection unit.

In the present specification and claims, " at least one of the first angular velocity detection unit, the second angular velocity detection unit, the first acceleration detection unit, the second acceleration detection unit, or the third acceleration detection unit" means any one first angular velocity detection unit, one second angular velocity detection unit, one first acceleration detection unit, one second acceleration detection unit, or one third acceleration detection unit, individually, or any combination of a first angular velocity detection unit, a second angular velocity detection unit, a first acceleration detection unit, a second acceleration detection unit and a third acceleration detection unit.

The attitude estimation unit includes a plurality of Kalman filters each configured to receive, as an imaginary offset quantity for the first offset error, an associated one of a plurality of values including at least two values different from each other.

The plurality of Kalman filters each use, in a current estimation operation, a detected value from the first angular velocity detection unit, a detected value from the second angular velocity detection unit, a detected value from the first acceleration detection unit, a detected value from the second acceleration detection unit, a detected value from the third acceleration detection unit, a detected value from the velocity information detection unit, an estimated value of the roll angle from a previous estimation operation, and the imaginary offset quantity to calculate the estimated value of the roll angle of the movable body and a likelihood in the current estimation operation, the likelihood representing a reliability of an estimation result.

The attitude estimation unit estimates the first offset error based on the likelihoods obtained from the plurality of Kalman filters and the imaginary offset quantities provided to the plurality of Kalman filters.

"Likelihood" as used herein means how reliable the quantity estimated by each Kalman filter is relative to the actual quantity. The higher the value of the likelihood for a Kalman filter, the higher the reliability of the quantity estimated by this Kalman filter; the lower the value of the likelihood for a Kalman filter, the lower the reliability of the quantity estimated by this Kalman filter. For example, the accuracy of the estimation may be improved by weighting the quantity estimated by each Kalman filter depending on the associated likelihood.

Each Kalman filter receives, in advance, a quantity relating to the offset error in a detection units of interest which is one of the detection units as "imaginary offset quantity". A plurality of imaginary offset quantities provided to a plurality of Kalman filters are different from each other. Then, the estimated quantity and likelihood are calculated by the each Kalman filter when an "imaginary offset quantity" has been generated in the detection unit of interest. Here, the likelihood calculated by each Kalman filter indicates how close (or distant) the actual offset error for the detection unit of interest is relative to the imaginary offset quantity provided to the Kalman filter. That is, the likelihood indicates how close the imaginary offset quantity is to the actual offset error for the detection unit of interest. For example, the offset error for the detection unit of interest in each Kalman filter may be weighted depending on the associated likelihood and the resulting value may be used to calculate the estimated value of the actual offset error for the detection unit of interest.

This means that the attitude estimation unit is capable of estimating, in addition to the quantity estimated by each Kalman filter, a new quantity (in this case, "first offset error"). For example, the next estimation operation may be performed based on this estimated offset error to improve the estimation accuracy of the roll angle over conventional arrangements.

The attitude estimation unit may estimate the first offset error by weighting the imaginary offset quantity received by each of the plurality of Kalman filters based on the likelihood obtained from this one of the plurality of Kalman filters. For example, the imaginary offset quantity in each Kalman filter may be weighted depending on the likelihood of this Kalman filter and the resulting value may be used to determine the estimated value of the first offset error. The estimated value determined in this manner is the imaginary offset quantities from a plurality of Kalman filters integrated depending on the likelihood.

The attitude estimation unit may calculate the estimated value of the roll angle of the movable body based on the likelihoods obtained from the plurality of Kalman filters and the roll angles of the movable body obtained from the plurality of Kalman filters. For example, the roll angle of the movable body may be estimated by weighting the roll angles of the movable body obtained from the plurality of Kalman filters based on the likelihoods obtained from the plurality of Kalman filters. That is, the estimated value of the roll angle in each Kalman filter may be weighted depending on the likelihood of this Kalman filter and the resulting value may be used to determine the estimated value of the roll angle. The estimated value determined in this manner is estimated values of the roll angle from the plurality of Kalman filters integrated depending on the likelihood.

Each of the plurality of Kalman filters included in the attitude estimation unit may include: a first Kalman filter configured to receive, as the imaginary offset quantity, a value larger than a maximum possible value of an offset quantity for a detection unit of interest, the detection unit of interest being a detection unit with which the first offset error is associated; a second Kalman filter configured to receive, as the imaginary offset quantity, a value smaller than a minimum possible value of the offset quantity of the detection unit of interest; and a third Kalman filter configured to receive, as the imaginary offset quantity, a value between the minimum possible value and the maximum possible value of the offset quantity of the detection unit of interest.

The first offset error may be estimated while assuming a situation where the detection unit of interest has generated the largest offset error. This will improve the estimation accuracy for the offset error and likelihood for the detection unit corresponding to the detection unit of interest. This will improve the estimation accuracy for the roll angle of the movable body.

The attitude estimation unit may include four or more Kalman filters. If the imaginary offset quantities provided to the Kalman filters are different, the estimation accuracy for the offset error and likelihood for the detection unit corresponding to the detection unit of interest will be further improved.

The first offset error may be the offset error from one of the first acceleration detection unit, the second acceleration detection unit, and the third acceleration detection unit.

Each of the plurality of Kalman filters may calculate a second offset error in addition to the roll angle of the movable body and the likelihood, the second offset error being the offset error from one of the first angular velocity detection unit, the second angular velocity detection unit, the first acceleration detection unit, the second acceleration detection unit, and the third acceleration detection unit, other than the detection unit of interest. In this case, each of the Kalman filters may, in a current estimation operation, calculate the estimated value of the roll angle of the movable body, an estimated value of the second offset error and the likelihood using the detected value from the first angular velocity detection unit, the detected value from the second angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, an estimated value of the second offset error from the previous estimation operation, and the imaginary offset quantity.

The attitude estimation unit may calculate the second offset error based on the likelihoods obtained from the plurality of Kalman filters and the second offset errors obtained from the plurality of Kalman filters.

The offset error from a detection unit other than the detection unit of interest (i.e. second offset error) may be estimated with improved accuracy. Since the attitude estimation unit can estimate the roll angle of the movable body taking account of the second offset error, estimation accuracy will be further improved.

The detection unit with which the second offset error is associated may be one or more detection units. That is, the second offset error may be the offset error from a detection unit other than the detection unit of interest. The detection unit other than the detection unit of interest is from at least one of the first angular velocity detection unit, the second angular velocity detection unit, the first acceleration detection unit, the second acceleration detection unit or the third acceleration detection unit.

The second offset error may include the offset errors from the first angular velocity detection unit and the second angular velocity detection unit.

The second offset error may include the offset error from a detection unit other than the detection unit of interest. The detection unit other than the detection unit of interest is from one of the first acceleration detection unit, the second acceleration detection unit and the third acceleration detection unit.

The first angular velocity detection unit may detect a roll angular velocity of the movable body, the second angular velocity detection unit may detect a yaw angular velocity of the movable body, and the second offset error may be the offset error from the first angular velocity detection unit, the offset error from the second angular velocity detection unit and the offset error from the first acceleration detection unit or the offset error from the second acceleration detection unit that is other than the first offset error.

In one embodiment, the first acceleration detection unit may detect an acceleration in a top-bottom direction of the movable body, the second acceleration detection unit may detect an acceleration in a left-right direction of the movable body, the third acceleration detection unit may detect an acceleration in a front-rear direction of the movable body, and the first offset error may be the offset error from the first acceleration detection unit or the offset error from the second acceleration detection unit.

The attitude estimation apparatus may include a third angular velocity detection unit configured to detect a third angular velocity, the third angular velocity being an angular velocity of the movable body about a third axis, the third axis being different from the first and second axes.

Each of the plurality of Kalman filters may, in a current estimation operation, calculate the estimated value of the roll angle of the movable body, an estimated value of the pitch angle of the movable body and the likelihood using the detected value from the first angular velocity detection unit, the detected value from the second angular velocity detection unit, a detected value from the third angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, the estimated value of the pitch angle from the previous estimation operation, the imaginary offset quantity, and an estimated value of the offset error from the previous estimation operation. The attitude estimation unit may estimate the first offset quantity based on the likelihoods obtained from the plurality of Kalman filters and the imaginary offset quantities provided to the plurality of Kalman filters, estimate the roll angle of the movable body based on the likelihoods obtained from the plurality of Kalman filters and the roll angles of the movable body obtained from the plurality of Kalman filters, and estimate the pitch angle of the movable body based on the likelihoods obtained from the plurality of Kalman filters and the pitch angles of the movable body obtained from the plurality of Kalman filters.

The attitude estimation apparatus is capable of detecting values for six axes. Then, based on these detected values, in addition to the roll angle and pitch angle of the movable body, the offset error for at least one detection unit is estimated. Then, taking account of this estimated offset error, the roll angle and pitch angle of the movable body and the offset error are estimated. This will improve the estimation accuracy of the roll angle and pitch angle of the movable body.

Each of the plurality of Kalman filters may, in the current estimation operation, calculate the estimated value of the roll angle of the movable body, the estimated value of the pitch angle of the movable body and the likelihood using a characteristic equation in which a value of a predetermined function is a constant, the function having, as its elements, the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, the estimated value of the pitch angle from the previous estimation operation, the imaginary offset quantity, and the estimated value of the second offset error from the previous estimation operation.

A characteristic equation may be used to estimate an offset error for a new detection unit. This will improve the estimation accuracy of the roll angle and pitch angle of the movable body. The characteristic equation may be, for example, an equation derived from an equation of the rotary motion of the movable body about the first axis.

The attitude estimation apparatus may include a load estimation unit configured to estimate a load applied to at least one of a front wheel and a rear wheel included in the movable body, where the load estimation unit may estimate the load based on the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, and the roll angle of the movable body, the pitch angle of the movable body and the first offset error estimated by the attitude estimation unit.

The attitude estimation apparatus may include a suspension stroke quantity estimation unit configured to estimate a stroke quantity of a suspension provided on at least one of the front wheel and the rear wheel of the movable body, where the load estimation unit may estimate the load applied to both the front wheel and the rear wheel provided on the movable body, and the suspension stroke quantity estimation unit may estimate the stroke quantity of the suspension based on an estimated value of the load applied to both the front wheel and the rear wheel estimated by the load estimation unit.

The attitude estimation apparatus may include an elevation/depression angle estimation unit configured to estimate an elevation/depression angle based on an estimated value of the stroke quantity of the suspension estimated by the suspension stroke quantity estimation unit, the elevation/depression angle being an angle between an axis in a vehicle-body coordinate system fixed to the movable body and an axis in a road-surface coordinate system fixed to a road surface in contact with the front wheel or the rear wheel.

Since the above-described embodiment may estimate the elevation/depression angle of the movable body, the attitude of the movable body will be estimated more accurately.

(Each of the plurality of Kalman filters may calculate the estimated value of the roll angle of the movable body, the estimated value of the pitch angle of the movable body, and the likelihood taking account of an estimated value of the elevation/depression angle estimated by the elevation/depression angle estimation unit.

An attitude estimation apparatus may further include a slope estimation unit configured to estimate a longitudinal slope of the road surface on which the movable body is placed based on an estimated value of the elevation/depression angle estimated by the elevation/depression angle estimation unit and the estimated values of the roll angle and the pitch angle of the movable body estimated by the attitude estimation unit.

The above-described arrangement will estimate the slope of the road surface more accurately.

A transportation machine including the movable body and the attitude estimation apparatus based on one of the embodiments described above is included in embodiments of the present invention.

Effects of the Invention

Embodiments of the present invention will improve the estimation accuracy for the attitude of a movable body.

BRIEF DESCRIPTION OF THE DRAWINGS

FIG. 8 is a schematic block diagram of an exemplary configuration of the calculation unit.

FIG. 9A illustrates how the estimated values of various parameters change over time.

FIG. 9B illustrates how the estimated values of various parameters change over time.

FIG. 9C illustrates how the estimated values of various parameters change over time.

FIG. 9H illustrates how the estimated values of various parameters change over time.

FIG. 17 is a schematic block diagram of an exemplary configuration of the attitude estimation apparatus.

FIG. 18B illustrates how the estimated values of various parameters change over time.

FIG. 20B illustrates how the estimated values of various parameters change over time.

FIG. 21A illustrates how the estimated values of various parameters change over time.

FIG. 21B illustrates how the estimated values of various parameters change over time.

EMBODIMENTS FOR CARRYING OUT THE INVENTION

Figure 1:
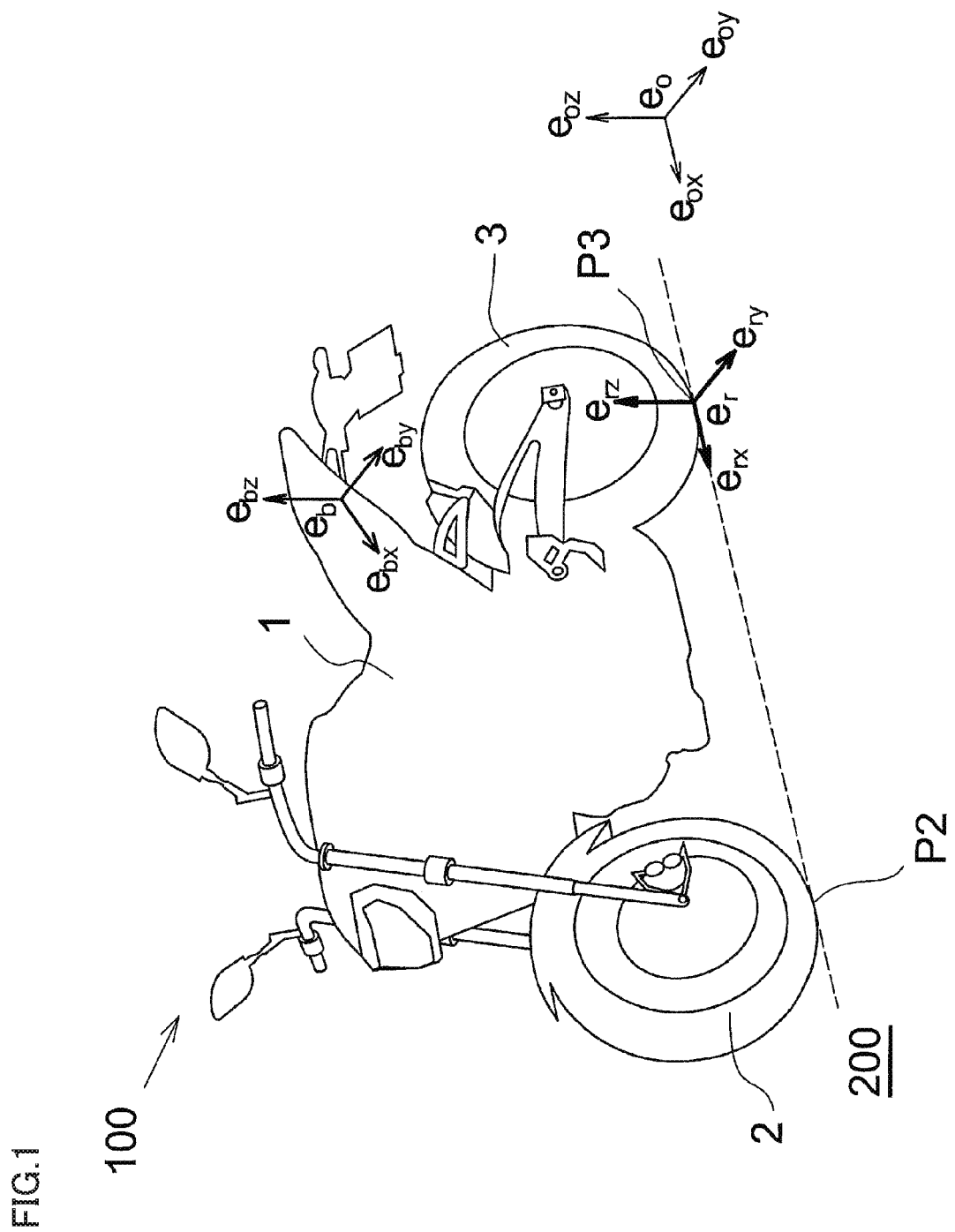
FIG. 1 illustrates the relationship between the basis vector $e_o$ of an inertia coordinate system, the basis vector $e_b$ of a vehicle coordinate system, and the basis vector $e_r$ of a road-surface coordinate system.

Embodiments of the present invention will be described with reference to the drawings. In the drawings referred to below, the size ratios in the drawings and the actual size ratios are not necessarily identical.

<Definitions>

The coordinate axes will be defined below with reference to the drawings. FIG. 1 illustrates the relationship between the basis vector $e_o$ of an inertia coordinate system, the basis vector $e_b$ of a vehicle coordinate system, and the basis vector $e_r$ of a road-surface coordinate system. In the following formulas, vectors may be expressed by bold letters. Each coordinate system includes an x-axis, a y-axis, and a z-axis. In FIG. 1, the vehicle 100 that represents a reference with respect to which a vehicle coordinate system and a road-surface coordinate system are set is a motorcycle.

$$e_o=(e_{ox},e_{oy},e_{oz})$$

$$e_b=(e_{bx},e_{by},e_{bz})$$

$$e_r=(e_{rx},e_{ry},e_{rz}) \quad \text{[Formula 1]}$$

The inertia coordinate system $e_o$ is a coordinate system fixed to the horizontal plane of the earth, and the z-axis is defined as the upward vertical direction.

In the vehicle coordinate system $e_b$, when the vehicle is standing upright on the horizontal road surface, the x- and y-axes are in the horizontal plane and the x-axis is fixed to the vehicle body so as to be the forward direction with respect to the vehicle. The angle formed by the vehicle coordinate system $e_b$ and the inertia coordinate system $e_o$ changes as the suspension of the vehicle moves. The suspension is a shock absorber provided between the vehicle wheels 2 and 3 and the vehicle body 1.

In the road-surface coordinate system $e_r$, the y-axis is the same as the y-axis of the vehicle coordinate system $e_b$, and the vehicle coordinate system $e_b$ has been rotated about the y-axis such that the direction extending from the grounding point P3 between the rear wheel 3 and road surface 200 to the grounding point P2 between the front wheel 2 and road surface 200 is the same as the x-axis.

As used herein, "yaw angle" means a rotational angle about the z-axis of the inertia coordinate system $e_o$ ($e_{oz}$), "yaw angular velocity" means a rate of change over time of the "yaw angle", and "yaw angular acceleration" means a rate of change over time of the yaw angular velocity. As used herein, "pitch angle" means a rotational angle about the y-axis of the inertia coordinate system $e_o$ ($e_{oy}$), "pitch angular velocity" means a rate of change over time of the "pitch angle", and "pitch angular acceleration" means a rate of change over time of the pitch angular velocity. As used herein, "roll angle" means a rotational angle about the x-axis of the vehicle coordinate system $e_b$ ($e_{bx}$), "roll angular velocity" means a rate of change over time of the "roll angle", and "roll angular acceleration" means a rate of change over time of the roll angular velocity.

As used herein, "top-bottom direction" means the direction of the z-axis of the vehicle coordinate system $e_b$ ($e_{bz}$), "front-rear direction" means the direction of the x-axis of the vehicle coordinate system $e_b$ ($e_{bx}$), and "left-right direction" means the direction of the y-axis of the vehicle coordinate system $e_b$ ($e_{by}$).

Roll angle, roll angular velocity, roll angular acceleration, yaw angle, yaw angular velocity, yaw angular acceleration, pitch angle, pitch angular velocity, pitch angular acceleration, top-bottom acceleration, front-rear acceleration, and left-right acceleration will be denoted by the following characters. One dot on the character denoting a parameter means first-order temporal differential.

TABLE 1

| Parameter | Meaning |
| --- | --- |
| $\psi$ | yaw angle |
| $\omega_{ya}$ | yaw angular velocity |
| $\dot{\omega}_{ya}$ | yaw angular acceleration |
| $\theta$ | pitch angle |
| $\omega_{pi}$ | pitch angular velocity |
| $\dot{\omega}_{pi}$ | pitch angular acceleration |
| $\phi$ | roll angle |
| $\omega_{ro}$ | roll angular velocity |
| $\dot{\omega}_{ro}$ | roll angular acceleration |
| $G_z$ | top bottom acceleration |
| $G_x$ | front-rear acceleration |
| $G_y$ | left-right acceleration |

[First Embodiment]

Figure 2:
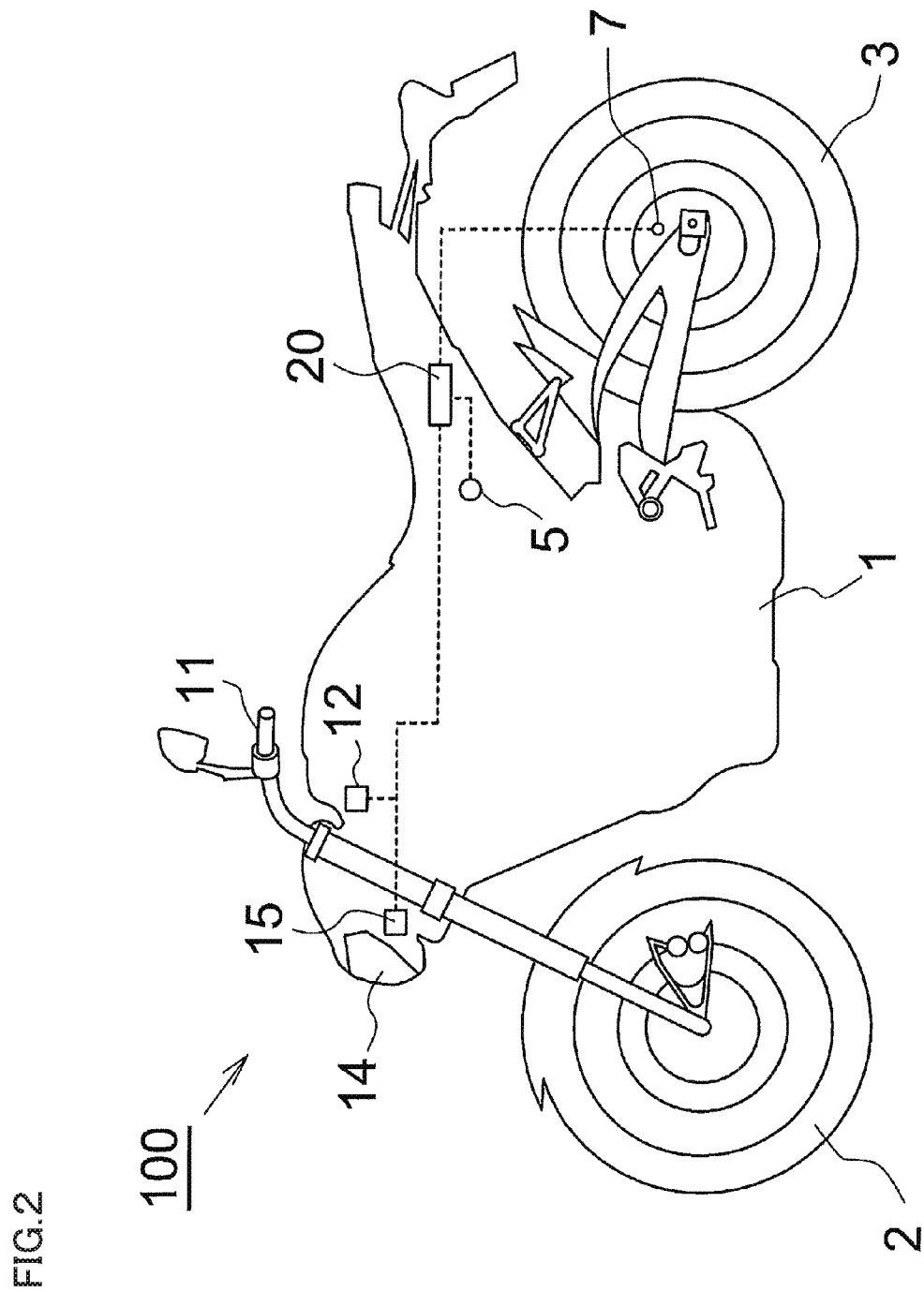
FIG. 2 is a schematic view of a vehicle including an attitude estimation apparatus according to an embodiment.

A first embodiment of the present invention will be described.
<Vehicle>
FIG. 2 is a schematic view of a vehicle including an attitude estimation apparatus according to the present embodiment. The vehicle 100 shown in FIG. 2 is a motorcycle.

As shown in FIG. 2, the vehicle 100 includes a vehicle body 1. A front wheel 2 is attached to a front portion of the vehicle body 1, and a rear wheel 3 is attached to a rear portion of the vehicle body 1. Further, a group of sensors 5 are attached to a central portion of the vehicle body 1. The group of sensors 5 will be described in detail further below.

A rear-wheel velocity sensor 7 is attached to the wheel body of the rear wheel 3 for detecting the rotational velocity of the rear wheel 3. According to the present embodiment, the rear-wheel velocity sensor 7 corresponds to the "velocity information detection unit".

Handlebars 11 are attached to the top of the front portion of the vehicle body 1 so as to be swingable to the left and right. In the implementation shown in FIG. 1, a navigation system 12 is provided near the handlebars 11, and a headlight 14 and a headlight driving device 15 are provided on the front portion of the vehicle body 1. The headlight driving device 15 controls the direction of the headlight 14. An electronic control unit 20 is provided on the rear portion of the vehicle body 1. The electronic control unit 20 will be referred to simply as "ECU 20" as appropriate below. The positions of the ECU 20 and the group of sensors 5 are not limited to those in FIG. 2.

Output signals from the group of sensors 5 and rear-wheel velocity sensor 7 are provided to the ECU 20. The ECU 20 controls the various parts of the vehicle body 1, and estimates the roll angle and other parameters of the vehicle body 1 and provide these estimated values to the navigation system 12 and headlight driving device 15, for example.

According to the present embodiment, the group of sensors 5, rear-wheel velocity sensor 7 and ECU 20 constitute the attitude estimation apparatus.

Figure 3:
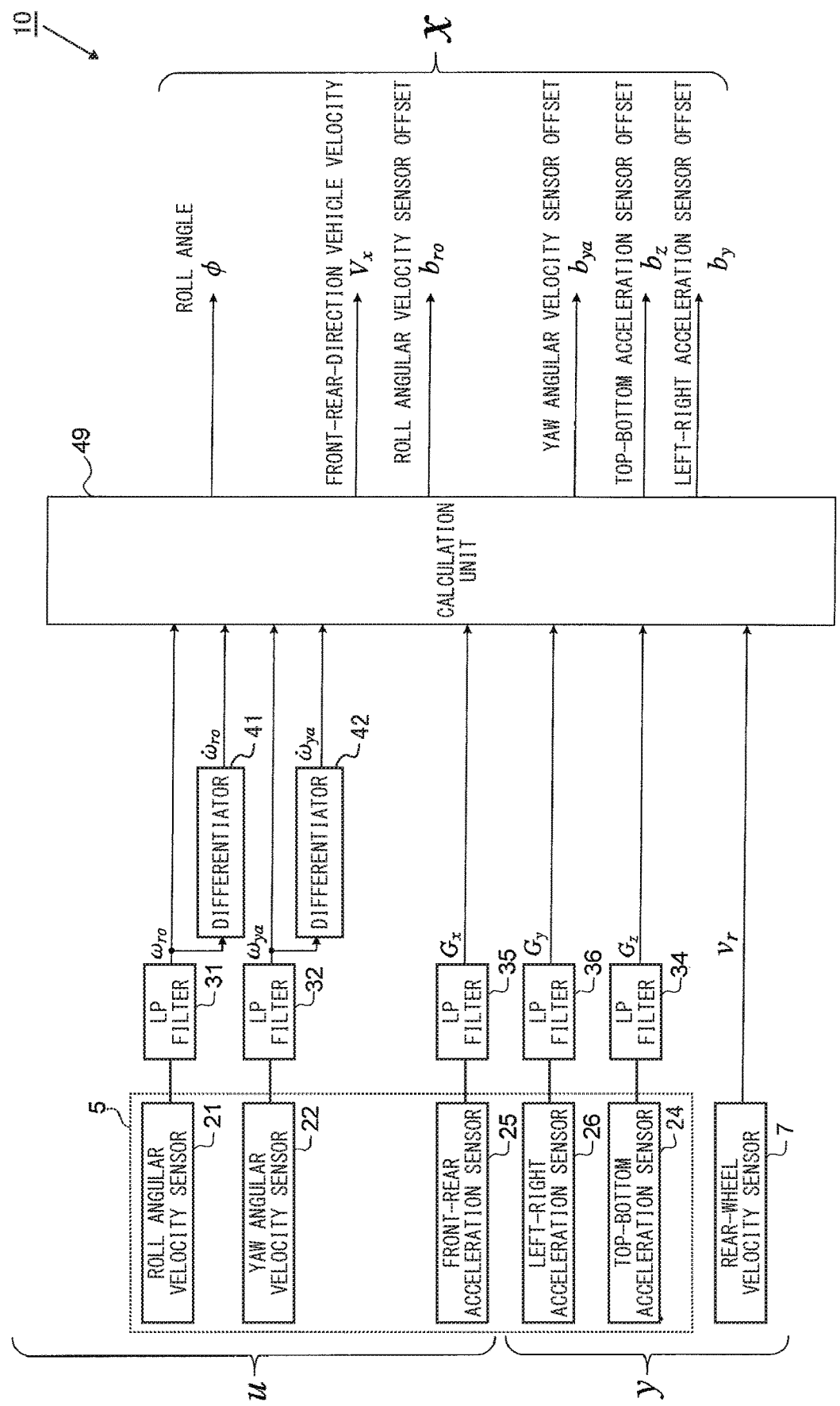
FIG. 3 is a schematic block diagram of an exemplary configuration of the attitude estimation apparatus.

<Configuration of Attitude Estimation Apparatus>
FIG. 3 is a schematic block diagram of an exemplary configuration of the attitude estimation apparatus. The attitude estimation apparatus 10 shown in FIG. 3 includes the group of sensors 5, the rear-wheel velocity sensor 7, low-pass filters 31, 32, 34, 35 and 36, differentiators 41 and 42, and a calculation unit 49. The functionality of the calculation unit 49 is realized by the ECU 20 shown in FIG. 2 and a program. The calculation unit 49 corresponds to the "attitude estimation unit".

The group of sensors 5 include a roll angular velocity sensor 21, a yaw angular velocity sensor 22, a top-bottom acceleration sensor 24, a front-rear acceleration sensor 25 and a left-right acceleration sensor 26.

The roll angular acceleration sensor 21 is provided on the vehicle body 1 so as to detect the roll angular velocity of the vehicle body 1. The yaw angular velocity sensor 22 is provided on the vehicle body 1 so as to detect the yaw angular velocity of the vehicle body 1. According to the present embodiment, the roll angular velocity sensor 21 corresponds to the "first angular velocity detection unit" and the yaw angular velocity sensor 22 corresponds to the "second angular velocity detection unit".

The top-bottom acceleration sensor 24 is provided on the vehicle body 1 so as to detect the acceleration in the top-bottom direction of the vehicle body 1. The front-rear acceleration sensor 25 is provided on the vehicle body 1 so as to detect the acceleration in the front-rear direction of the vehicle body 1. The left-right acceleration sensor 26 is provided on the vehicle body 1 so as to detect the acceleration in the left-right direction of the vehicle body 1. According to the present embodiment, the top-bottom acceleration sensor 24 corresponds to the "first acceleration detection unit", the front-rear acceleration sensor 25 corresponds to the "second acceleration detection unit", and the left-right acceleration sensor 26 corresponds to the "third acceleration detection unit".

In this exemplary implementation, the top-bottom acceleration sensor 24, front-rear acceleration sensor 25 and left-right acceleration sensor 26 detect the accelerations in directions that are perpendicular to each other. This is not essential and it is only required that the accelerations in at least three different directions be detected.

The output signal from the roll angular velocity sensor 21 is passed through the low-pass filter 31 and is fed into the calculation unit 49 and differentiator 41 as a roll angular velocity. The low-pass filter 31 removes noise from the output signal from of the roll angular velocity sensor 21. The differentiator 41 provides, to the calculation unit 49, the differential value of the roll angular velocity as a roll angular acceleration.

The output signal from the yaw angular velocity sensor 22 is passed through the low-pass filter 32 and is fed into the calculation unit 49 and differentiator 42 as a yaw angular velocity. The low-pass filter 32 removes noise from the output signal from the yaw angular velocity sensor 22. The differentiator 42 provides, to the calculation unit 49, the differential value of the yaw angular velocity as a yaw angular acceleration.

The output signal from the top-bottom acceleration sensor 24 is passed through the low-pass filter 34 and is provided to the calculation unit 49 as a top-bottom acceleration. The output signal from the front-rear acceleration sensor 25 is passed through the low-pass filter 35 and is fed into the calculation unit 49 as a front-rear acceleration. The output signal from the left-right acceleration sensor 26 is passed through the low-pass filter 36 and is provided to the calculation unit 49 as a left-right acceleration.

The frequency characteristics of the low-pass filters 31, 32, 34, 35 and 36 are decided depending on the output characteristics of the corresponding sensors 21, 22, 24, 25 and 26. More specifically, the frequency characteristics of the noise components contained in the output signals from the sensors 21, 22, 24, 25 and 26 can be identified in advance, at the stage of apparatus design. The low-pass filters 31, 32, 34, 35 and 36 may be designed to block these noise components and pass the detection signals of the sensors 21, 22, 24, 25 and 26, which will be needed.

The output signal from the rear-wheel velocity sensor 7 is fed into the calculation unit 49 as a rear-wheel velocity. The rear-wheel velocity is a rotational velocity of the outermost periphery of the tire, assuming that there is no slide between the road surface and the tire of the rear wheel 3 and, in reality, calculated based on the output signal of the rear-wheel velocity sensor 7 and the size of the tire. To simplify the explanation, FIG. 3 shows a signal indicative of rear-wheel velocity as if it were provided by the rear-wheel velocity sensor 7.

The calculation unit 49 receives detected values relating to roll angular velocity, roll angular acceleration, yaw acceleration, yaw angular acceleration, top-bottom acceleration, front-rear acceleration, left-right acceleration, and rear-wheel velocity. Based on these values, the calculation unit 49 estimates the roll angle, front-rear direction vehicle velocity, roll angular velocity sensor offset, yaw angular velocity sensor offset, left-right acceleration sensor offset and top-bottom acceleration sensor offset before outputting them.

The roll angular velocity sensor offset is the offset error for the roll angular velocity sensor 21. The yaw angular velocity sensor offset is the offset error for the yaw angular velocity sensor 22. The left-right acceleration sensor offset is the offset error for the left-right acceleration sensor 26. The top-bottom acceleration sensor offset is the offset error for the top-bottom acceleration sensor 24.

The rear-wheel velocity detected by the rear-wheel velocity sensor 7, and the front-rear direction vehicle velocity, roll angular velocity sensor offset, yaw angular velocity sensor offset, left-right acceleration sensor offset, and top-bottom acceleration sensor offset estimated by the calculation unit 49 will be denoted by the following characters.

TABLE 2

| Parameter | Meaning |
|---|---|
| $v_r$ | rear-wheel velocity |
| $V_x$ | front-rear-direction vehicle velocity |
| $b_{ro}$ | roll angular velocity sensor offset |
| $b_{ya}$ | yaw angular velocity sensor offset |
| $b_y$ | left-right acceleration sensor offset |
| $b_z$ | top-bottom acceleration sensor offset |

<Configuration of Kalman Filter>

Figure 4:
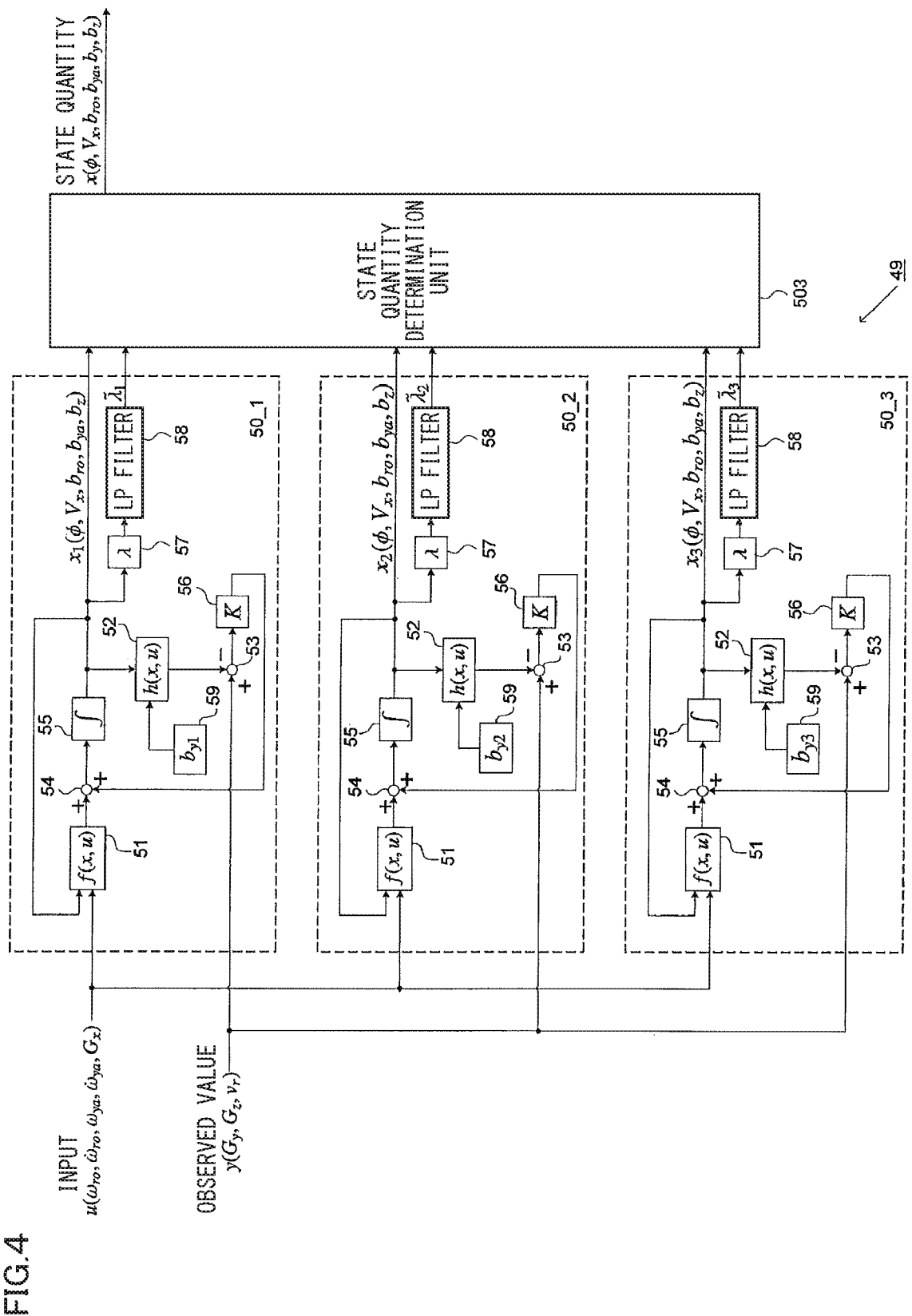
FIG. 4 is a schematic block diagram of an exemplary configuration of the calculation unit.

FIG. 4 is a schematic block diagram of an exemplary configuration of the calculation unit 49. As shown in FIG. 4, the calculation unit 49 includes a plurality of Kalman filters 50_1, 50_2 and 50_3, and a state quantity determination unit 503. In the following description, the Kalman filters 50_1, 50_2 and 50_3 may be collectively referred to as "Kalman filters 50".

FIG. 4 shows an implementation where the calculation unit 49 includes three Kalman filters 50; however, this number is merely an example. The calculation unit 49 may include two Kalman filters 50, or four or more Kalman filters 50.

The Kalman filters 50 (50_1, 50_2 and 50_3) use a kinematic model for the vehicle 100, described below.

In FIG. 4, the Kalman filters 50 (50_1, 50_2 and 50_3) each include a system equation calculation unit 51, an observation equation calculation unit 52, a subtractor 53, an adder 54, an integrator 55, a Kalman gain calculation unit 56, a likelihood calculation unit 57, a low-pass filter 58, and an imaginary offset input unit 59.

The system equation that is an equation used for the calculation at the system equation calculation unit 51 includes the function f(x,u). The observation equation that is an equation used for the calculation at the observation equation calculation unit 52 includes the function h(x,u). The Kalman gain calculation unit 56 includes a fifth-degree Kalman gain K.

The imaginary offset input unit 59 provides, as an offset value for a predetermined one of the sensors of the group 5, a predetermined value for each of the Kalman filters 50 (50_1, 50_2 and 50_3) to the observation equation calculation unit 52. According to the present embodiment, the imaginary offset input unit 59 is configured to provide the offset value $b_y$ for the left-right acceleration sensor 26 to the observation equation calculation unit 52. In this implementation, the left-right acceleration sensor 26 corresponds to the "detection unit of interest", or in other words, in this example the left-right acceleration sensor 26 is a detection unit associated with the offset error whose imaginary offset quantity is provided in each of the Kalman filters 50 (50_1, 50_2 and 50_3).

In FIG. 4, the offset value for the left-right acceleration sensor 26 provided by the imaginary offset input unit 59 of the Kalman filter 50_1 to the observation equation calculation unit 52 is denoted by $b_y$. Similarly, the offset value for the left-right acceleration sensor 26 provided by the imaginary offset input unit 59 of the Kalman filter 50_2 to the observation equation calculation unit 52 is denoted by $b_{y2}$. The offset value for the left-right acceleration sensor 26 provided by the imaginary offset input unit 59 of the Kalman filter 50_3 to the observation equation calculation unit 52 is denoted by $b_{y3}$.

The likelihood calculation unit 57 determines a likelihood using calculation, the likelihood being indicative of the reliability of the result from the estimation by the Kalman filter 50 (50_1, 50_2 or 50_3). The low-pass filter 58 is a calculation unit for filtering the value calculated by the likelihood calculation unit 57. The low-pass filter 58 may be replaced by any other calculation unit that can implement the same functionality. It is optional whether the low-pass filter 58 is included. Examples of the calculation performed by the likelihood calculation unit 57 will be described further below.

The calculation units 51, 52, 53, 54, 55, 56, 57 and 58 constituting a Kalman filter 50 may be implemented by, for example, a program that has been prepared in advance being performed by the ECU 20. Alternatively, some or all of the calculation units 51, 52, 53, 54, 55, 56, 57 and 58 may be implemented by independent hardware mounted.

In the current estimation operation, the following values are provided as the input parameter u of the function f(x,u) included in the system equation is the detected value of the roll angular velocity $\omega_{ro}$, the detected value of the roll angular acceleration (differential value of the roll angular velocity $\omega_{ro}$), the detected value of the yaw angular velocity $\omega_{ya}$, the yaw angular acceleration (differential value of the yaw angular velocity $\omega_{ya}$), and the detected value of the front-rear acceleration $G_x$.

Further, the following values are provided as the input parameter x of the function f(x,u) included in the system equation: the estimated value of the roll angle $\varphi$, the estimated value of the vehicle velocity $V_x$, the estimated value of the roll angular velocity sensor offset $b_{ro}$, the estimated value of the yaw angular velocity sensor offset $b_{ya}$, and the estimated value of the top-bottom acceleration sensor offset $b_z$ from the previous estimation operation.

The output from the system equation calculation unit 51 is the predicted differential value of the roll angle $\varphi$, the predicted differential value of the vehicle velocity $V_x$, the predicted differential value of the roll angular velocity sensor offset $b_{ro}$, the predicted differential value of the yaw angular velocity sensor offset $b_{ya}$, and the predicted differential value of the top-bottom acceleration sensor offset $b_z$.

The adder 54 adds the fifth-degree Kalman gain K obtained by the previous estimation operation to the predicted differential value of the roll angle $\varphi$, the predicted differential value of the vehicle velocity $V_x$, the predicted differential value of the roll angular velocity sensor offset $b_{ro}$, the predicted differential value of the yaw angular velocity sensor offset $b_{ya}$, and the predicted differential value of the top-bottom acceleration sensor offset $b_z$.

The predicted differential value of the roll angle $\varphi$, the predicted differential value of the vehicle velocity $V_x$, the predicted differential value of the roll angular velocity sensor offset $b_{ro}$, the predicted differential value of the yaw angular velocity sensor offset $b_{ya}$, and the predicted differential value of the top-bottom acceleration sensor offset $b_z$ to which the Kalman gain K has been added are integrated by the integrator 55. This provides the estimated value of the roll angle $\varphi$, the estimated value of the vehicle velocity $V_x$, the estimated value of the roll angular velocity sensor offset $b_{ro}$, the estimated value of the yaw angular velocity sensor offset $b_{ya}$, and the estimated value of the top-bottom acceleration sensor offset $b_z$ from the current estimation operation.

The following values are provided as the input parameter x of the function h(x,u) included in the observation equation: the estimated value of the roll angle $\varphi$, the estimated value of the vehicle velocity $V_x$, the estimated value of the roll angular velocity sensor offset $b_{ro}$, the estimated value of the yaw angular velocity sensor offset $b_{ya}$, and the estimated value of the top-bottom acceleration sensor offset $b_z$. Further, as discussed above, the offset value for left-right acceleration sensor 26 provided by the imaginary offset input unit 59 is provided as the input parameter x of the function h(x,u) included in the observation equation.

The output from the observation equation calculation unit 52 is the calculated value of the top-bottom acceleration $G_z$, the calculated value of the left-right acceleration $G_y$, and the calculated value of the rear-wheel velocity $v_r$.

The Kalman filters 50 each receive, as the input parameter y, the detected value of the top-bottom acceleration $G_z$, the detected value of the left-right acceleration $G_y$, and the detected value of the rear-wheel velocity $v_r$. The Kalman gain calculation unit 56 calculates the Kalman gain K based on the difference between the detected values of the top-bottom acceleration $G_z$, left-right acceleration $G_y$, and rear-wheel velocity $v_r$ and the calculated values (this difference may be hereinafter referred to as "observation/prediction error e").

Finding this kinematic model's system equation f(x,u) and observation equation h(x,u) gives the relational expression for the input parameters u and y and the output parameter x.

<Finding of System Equation and Observation Equation>

The present embodiment supposes the following points to simplify the kinematic model.

(a) There is no rotational slide between the rear wheel 3 and road surface.

(b) The side-skid velocity of the rear wheel 3 is zero.

(c) The road surface is flat. "Flat" as used herein means a plane without irregularities, and may be inclined.

(d) The vehicle 100 does not pitch.

Based on suppositions (a) to (d), the kinematic model equation is found in the following manner. The differential value of the yaw angle, the differential value of the pitch angle, and the differential value of the roll angle will be denoted by the following characters.

TABLE 3

| Parameter | Meaning |
|---|---|
| $\dot{\varphi}$ | differential value of roll angle |
| $\dot{\psi}$ | differential value of yaw angle |
| $\dot{\theta}$ | differential value of pitch angle |

First, the following equation may be established based on a common relational expression between Euler angle and angular velocity.

[Formula 2]

$$\begin{bmatrix} \dot{\phi} \\ \dot{\theta} \\ \dot{\psi} \end{bmatrix} = \begin{bmatrix} 1 & \tan\theta\sin\phi & \tan\theta\cos\phi \\ 0 & \cos\phi & -\sin\phi \\ 0 & \sin\phi\sec\theta & \cos\phi\sec\theta \end{bmatrix} \begin{bmatrix} \omega_{ro} \\ \omega_{pi} \\ \omega_{ya} \end{bmatrix} \quad (1)$$

Supposition (d) provided above means that the pitch angle θ and its differential value are zero. Thus, the following equation is derived from equation (1).

[Formula 3]

$$\begin{bmatrix} \dot{\phi} \\ \dot{\theta} \\ \dot{\psi} \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} \omega_{ro} \\ \omega_{pi} \\ \omega_{ya} \end{bmatrix} \quad (2)$$

Based on the second row of equation (2), the pitch angular velocity $\omega_{pi}$ may be deleted. This gives the following equation.

[Formula 4]

$$\begin{bmatrix} \dot{\phi} \\ \dot{\psi} \end{bmatrix} = \begin{bmatrix} \omega_{ro} \\ \omega_{ya}\sec\phi \end{bmatrix} \quad (3)$$

Figure 5:
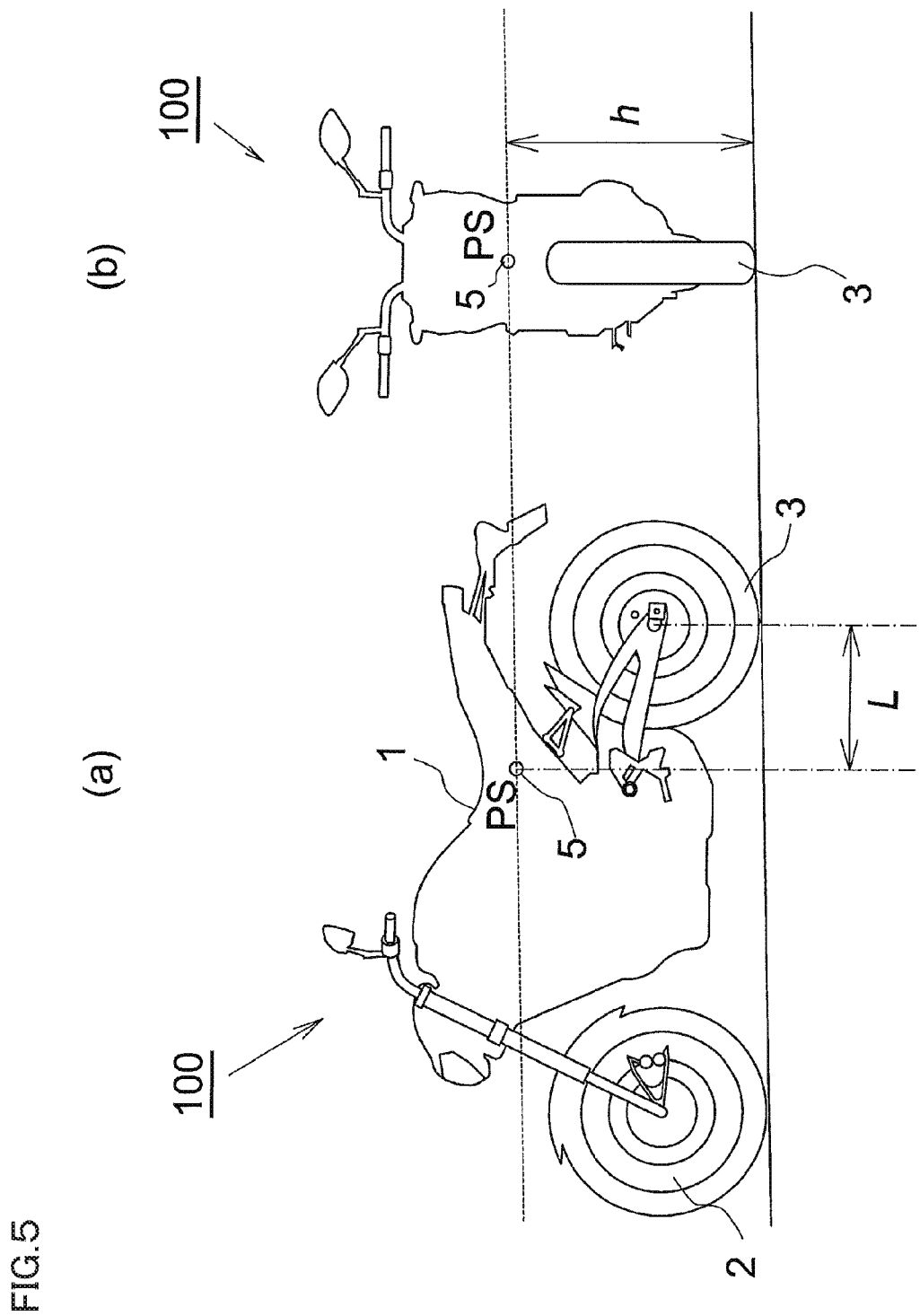
FIG. 5 illustrates where the group of sensors are mounted.
Figure 6:
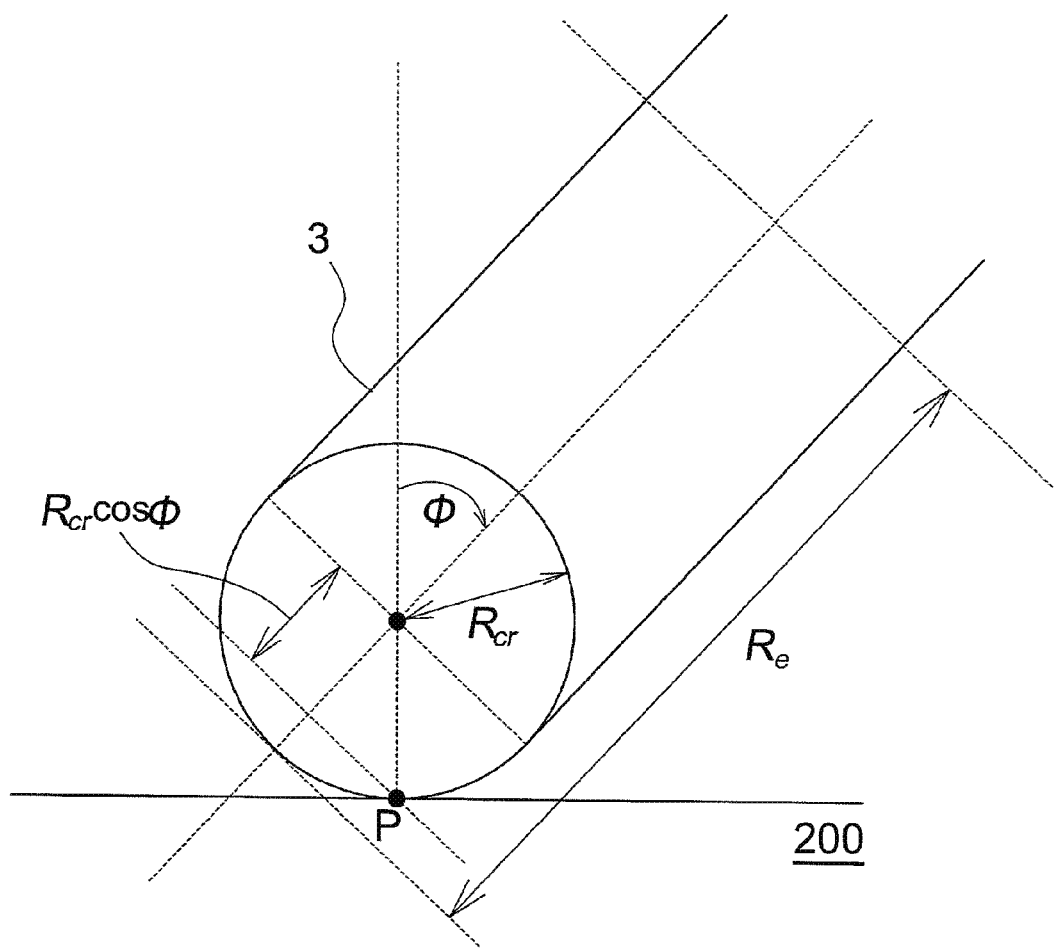
FIG. 6 is a schematic cross-sectional view of the rear wheel.
Figure 7:
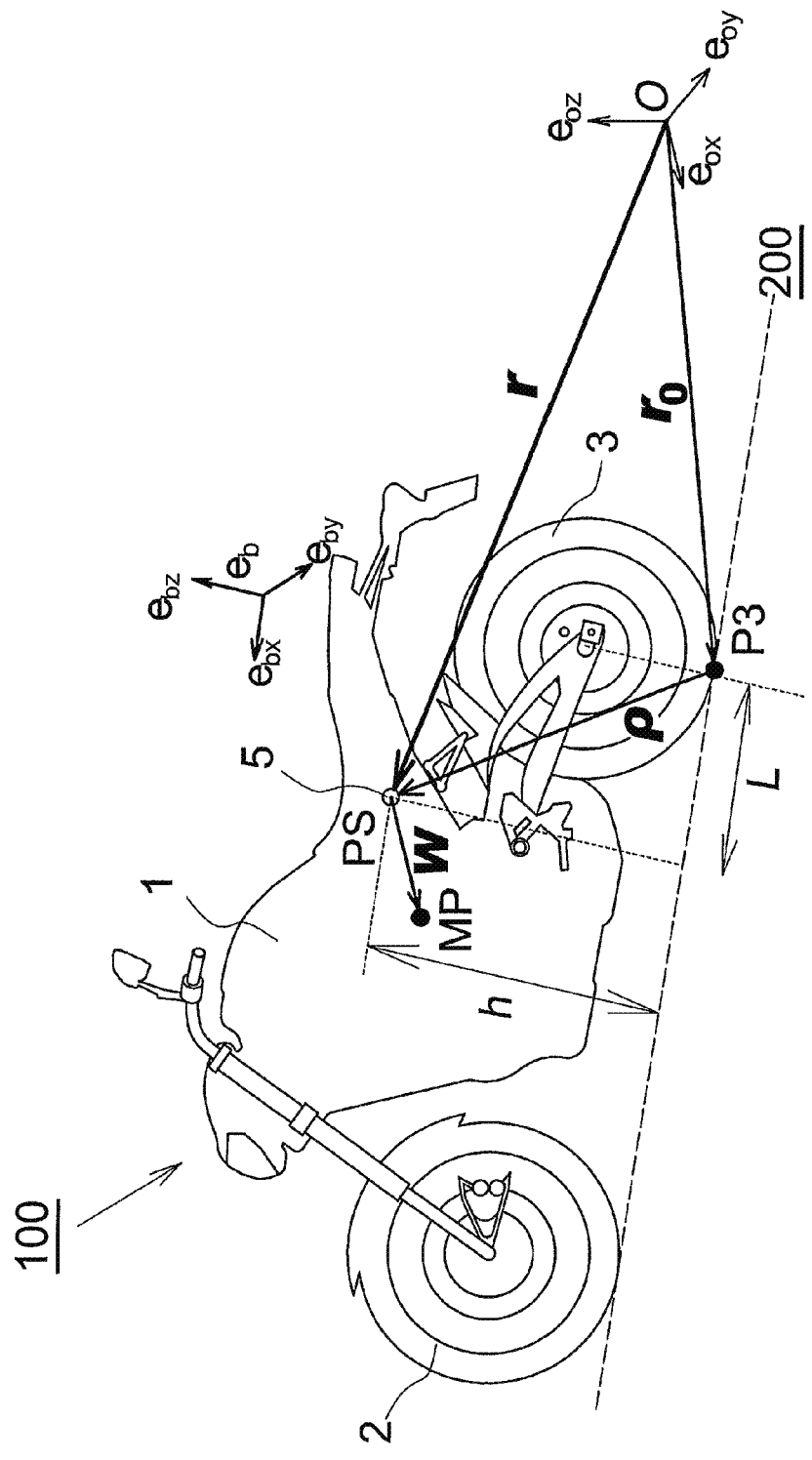
FIG. 7 illustrates where the group of sensors are mounted by means of vectors.

FIG. 5 illustrates where the group of sensors 5 are mounted. In FIG. 5, (a) shows the left side of the vehicle 100 while (b) shows the front of the vehicle 100. FIG. 6 is a schematic cross-sectional view of the rear wheel 3. FIG. 7 illustrates where the group of sensors 5 are mounted by means of vectors.

In FIG. 5, the position at which the group of sensors 5 are mounted is denoted by PS. The horizontal distance between the mounting position PS and the center of the rear wheel 3 is denoted by L, and the height of the mounting position PS relative to the road surface 200 is denoted by h.

The positional vector of the mounting position PS for the group of sensors 5 relative to the origin O of the inertia coordinate system, the positional vector of the grounding point P3 of the rear wheel 3 relative to the origin O of the inertia coordinate system, the vector from the grounding point P3 of the rear wheel 3 to the mounting position PS for the group of sensors 5, and the second-order differential vector of various vectors will be denoted by the following characters. The two dots on top of the character indicating a parameter means second-order temporal differential.

TABLE 4

| Parameter | Meaning |
| --- | --- |
| r | positional vector of mounting position PS for group of sensors 5 |
| $\ddot{r}$ | second-order differential vector of positional vector r |
| $r_0$ | positional vector of grounding point P |
| $\ddot{r}_0$ | second-order differential vector of positional vector $r_0$ |
| ρ | vector from grounding point P to mounting position PS of group of sensors 5 |
| $\ddot{\rho}$ | second-order differential vector of vector ρ |

This gives Equation (4) below.

[Formula 5]

$$r = r_0 + \rho \quad (4)$$

Gravity acceleration vector and acceleration vector detected at the mounting position PS will be denoted by the following characters. The acceleration vector G is detected by the top-bottom acceleration sensor 24 provided at the mounting position PS, front-rear acceleration sensor 25 and left-right acceleration sensor 26.

TABLE 5

| Parameter | Meaning |
| --- | --- |
| g | Gravity acceleration vector |
| G | acceleration vector at mounting position PS for group of sensors 5 |

The acceleration vector G is obtained by Equation (5) below.

[Formula 6]

$$G = \ddot{r} + g = \ddot{r}_0 + \ddot{\rho} + g \quad (5)$$

The right side of Equation (5) will be calculated below. The vector ρ shown in FIG 7 is expressed by the following equation.

[Formula 7]

$$\rho = [e_b]\rho = [e_{bx}, e_{by}, e_{bz}]\rho \quad (6)$$

As discussed above, the vector $e_b$ is the basis vector of the vehicle coordinate system, where $e_{bx}$ corresponds to the component in the forward direction with respect to the vehicle body 1, $e_{by}$ corresponds to the component in the left direction with respect to the vehicle body 1, and $e_{bz}$ corresponds to the component in the upward direction with respect to the vehicle body 1. Based on FIGS. 6 and 7, the matrix ρ shown in the right side of Equation (6) is expressed by the equation below. In FIG. 7, the radius of a cross section of the rear wheel 3 is denoted by $R_{cr}$, and the radius of the rear wheel 3 is denoted by $R_e$. As discussed above, the roll angle of the vehicle body 1 is denoted by φ.

[Formula 8]

$$\rho = \begin{bmatrix} L \\ R_{cr}\sin\phi \\ h - R_{cr}(1 - \cos\phi) \end{bmatrix} \quad (7)$$

When movements of the suspension of the vehicle 100 are considered, to speak exactly, L and h vary; however, such variances are sufficiently small compared with the values of L and h, and thus the values of L and h can be considered approximately constant.

From Equation (7) provided above, the second-order differential vector of the vector ρ can be expressed by the following equation.

[Formula 9]

$$\ddot{\rho} = [e_b] \begin{bmatrix} a_x(\omega_{ro}, \omega_{ya}, \dot{\omega}_{ro}, \dot{\omega}_{ya}, \phi, L, h, R_{cr}) \\ a_y(\omega_{ro}, \omega_{ya}, \dot{\omega}_{ro}, \dot{\omega}_{ya}, \phi, L, h, R_{cr}) \\ a_z(\omega_{ro}, \omega_{ya}, \dot{\omega}_{ro}, \dot{\omega}_{ya}, \phi, L, h, R_{cr}) \end{bmatrix} \quad (8)$$

In Equation (8), $a_x$, $a_y$ and $a_z$ are functions. The functions $a_x$, $a_y$ and $a_z$ can be determined by calculating Equations (6) and (7). Using Equation (1) provided above to rearrange Equation (7) into Equation (8) removes the differential value of the roll angle $\varphi$ and the differential value of the yaw angle $\psi$.

Next, the side-skid velocity of the vehicle 100 is denoted by $V_y$. The first-order differential vector of the positional vector $r_0$ in FIG. 7 is expressed by the following equation using the vehicle velocity $V_x$ and side-skid velocity $V_y$. The vector $e_0$ is the basis vector of the inertia coordinate system.

[Formula 10]

$$\dot{r}_0 = [e_o] \begin{bmatrix} V_x \\ V_y \\ V_z \end{bmatrix} \quad (9)$$

From Supposition (b), $V_y=0$; when Equation (9) is first-order-differentiated, the second-order differential vector of the positional vector r is expressed by the following equation.

[Formula 11]

$$\ddot{r}_0 = [e_b] \begin{bmatrix} \dot{V}_x \\ V_x \omega_{ya} \\ -V_x \omega_{ya} \tan\phi \end{bmatrix} \quad (10)$$

Next, the gravity acceleration vector may be expressed by the following equation. g in the right side of Equation (11) indicates the magnitude of the gravity acceleration.

[Formula 12]

$$g = [e_b] \begin{bmatrix} 0 \\ g\sin\phi \\ g\cos\phi \end{bmatrix} \quad (11)$$

Based on Equations (5), (8), (10) and (11), the acceleration vector G detected at the mounting position PS may be expressed by the following equation.

[Formula 13]

$$G = \ddot{r} + g = \ddot{r}_0 + \ddot{p} +$$

$$g = [e_b] \begin{bmatrix} \dot{V}_x + a_x(\omega_{ro}, \omega_{ya}, \dot{\omega}_{ro}, \dot{\omega}_{ya}, \phi, L, h, R_{cr}) \\ V_x \omega_{ya} + a_y(\omega_{ro}, \omega_{ya}, \dot{\omega}_{ro}, \dot{\omega}_{ya}, \phi, L, h, R_{cr}) + g\sin\phi \\ -V_x \omega_{ya}\tan\phi + a_z(\omega_{ro}, \omega_{ya}, \dot{\omega}_{ro}, \dot{\omega}_{ya}, \phi, L, h, R_{cr}) + g\cos\phi \end{bmatrix} \quad (12)$$

The acceleration vector G detected at the mounting position PS may be expressed by the following equation using the front-rear acceleration $G_x$ detected by the front-rear acceleration sensor 25, the left-right acceleration $G_y$ detected by the left-right acceleration sensor 26, and the top-bottom acceleration $G_z$ detected by the top-bottom acceleration sensor 24.

[Formula 14]

$$G = [e_b] \begin{bmatrix} G_x \\ G_y \\ G_z \end{bmatrix} \quad (13)$$

Thus, based on Equations (12) and (13), the front-rear acceleration $G_x$, the left-right acceleration $G_y$ and the top-bottom acceleration $G_z$ may be expressed by the following equation.

[Formula 15]

$$\begin{bmatrix} G_x \\ G_y \\ G_z \end{bmatrix} = \begin{bmatrix} \dot{V}_x + a_x(\omega_{ro}, \omega_{ya}, \dot{\omega}_{ro}, \dot{\omega}_{ya}, \phi, L, h, R_{cr}) \\ V_x \omega_{ya} + a_y(\omega_{ro}, \omega_{ya}, \dot{\omega}_{ro}, \dot{\omega}_{ya}, \phi, L, h, R_{cr}) + g\sin\phi \\ -V_x \omega_{ya}\tan\phi + a_z(\omega_{ro}, \omega_{ya}, \dot{\omega}_{ro}, \dot{\omega}_{ya}, \phi, L, h, R_{cr}) + g\cos\phi \end{bmatrix} \quad (14)$$

Next, the relationship between the rear-wheel velocity $v_r$ and vehicle velocity $V_x$ is determined. Supposition (a) means that there is no slide between the rear wheel 3 and road surface 200, and thus the relationship expressed by the following equation can be established between the rear-wheel velocity $v_r$ and vehicle velocity $V_x$.

[Formula 16]

$$\frac{V_x}{R_e - R_{cr}(1-\cos\phi)} = \frac{v_r}{R_e} \quad (15)$$

Equation (15) gives the following equation.

[Formula 17]

$$v_r = \frac{R_e}{R_e - R_{cr}(1-\cos\phi)} V_x = \frac{1}{1 - R_{cr}/R_e(1-\cos\phi)} V_x \quad (16)$$

Equations (1), (14) and (16) give the following equations.

[Formula 18]

$$\frac{d}{dt}\begin{bmatrix} \phi \\ V_x \end{bmatrix} = \begin{bmatrix} \omega_{ro} \\ G_x - a_x(\omega_{ro}, \omega_{ya}, \dot{\omega}_{ro}, \dot{\omega}_{ya}, \phi, L, h, R_{cr}) \end{bmatrix} \quad (17)$$

[Formula 19]

$$\begin{bmatrix} G_y \\ G_z \\ v_r \end{bmatrix} = \begin{bmatrix} V_x \omega_{ya} + a_y(\omega_{ro}, \omega_{ya}, \dot{\omega}_{ro}, \dot{\omega}_{ya}, \phi, L, h, R_{cr}) + g\sin\phi \\ -V_x \omega_{ya}\tan\phi + a_z(\omega_{ro}, \omega_{ya}, \dot{\omega}_{ro}, \dot{\omega}_{ya}, \phi, L, h, R_{cr}) + g\cos\phi \\ \frac{1}{1 - R_{cr}/R_e(1-\cos\phi)} V_x \end{bmatrix} \quad (18)$$

Each of the Kalman filters 50, at the system equation calculation unit 51, uses Equation (17) as the system equation to perform calculation, and, at the observation equation calculation unit 52, uses Equation (18) as the observation equation to perform calculation.

Even if the roll angular velocity offset $b_{ro}$, yaw angular velocity offset $b_{ya}$, pitch angular velocity offset $b_{pi}$ and top-bottom acceleration offset $b_z$ vary, such variances are small compared with movements of the vehicle 100. Thus, the differential value of the roll angular velocity offset $b_{ro}$, the differential value of the yaw angular velocity offset $b_{ya}$, the differential value of the pitch angular velocity offset $b_{pi}$, and the differential value of the top-bottom acceleration offset $b_z$ can be considered to be zero.

Further, replacing some values in Equations (17) and (18) with values reflecting offset errors gives the following equations.

[Formula 20]

$$\frac{d}{dt}\begin{bmatrix} \phi \\ V_x \\ b_{ro} \\ b_{ya} \\ b_z \end{bmatrix} = \begin{bmatrix} \omega_{ro} - b_{ro} \\ G_x - a_x(\omega_{ro} - b_{ro}, \omega_{ya} - b_{ya}, \dot{\omega}_{ro}, \dot{\omega}_{ya}, \phi, L, h, R_{cr}) \\ 0 \\ 0 \\ 0 \end{bmatrix} \quad (19)$$

[Formula 21]

$$\begin{bmatrix} G_y \\ G_z \\ v_r \end{bmatrix} = \begin{bmatrix} V_x \omega_{ya} + a_y(\omega_{ro}, \omega_{ya}, \dot{\omega}_{ro}, \dot{\omega}_{ya}, \phi, L, h, R_{cr}) + g\sin\phi \\ -V_x \omega_{ya}\tan\phi + a_z(\omega_{ro}, \omega_{ya}, \dot{\omega}_{ro}, \dot{\omega}_{ya}, \phi, L, h, R_{cr}) + g\cos\phi + b_z \\ \dfrac{1}{1 - R_{cr}/R_e(1-\cos\phi)} V_x \end{bmatrix} \quad (20)$$

When the offset errors are taken into consideration, each of the Kalman filters 50, at the system equation calculation unit 51, uses Equation (19) as the system equation to perform calculation, and, at the observation equation calculation unit 52, uses Equation (20) as the observation equation to perform calculation. Equations (19) and (20) take account of the roll angular velocity offset $b_{ro}$, yaw angular velocity offset $b_{ya}$, and top-bottom acceleration offset $b_z$.

As the Kalman filters 50 use Equation (19) as the system equation and use Equation (20) as the observation equation to perform calculation, the roll angle $\varphi$, vehicle velocity $V_x$, roll angular velocity offset $b_{ro}$, yaw angular velocity offset $b_{ya}$, and top-bottom acceleration offset $b_z$ may be estimated. The right side of Equation (19) corresponds to the function f(x,u) and the right side of Equation (20) corresponds to the function h(x,u).

An angular velocity sensor is more likely to have an offset error than an acceleration sensor. In view of this, according to the present embodiment, the offset error of the roll angular velocity sensor 21 (roll angular velocity sensor offset $b_{ro}$) and the offset error of the yaw angular velocity sensor 22 (yaw angular velocity sensor offset $b_{ya}$) are estimated. Using the estimated values of the roll angular velocity offset $b_{ro}$ and yaw angular velocity offset $b_{ya}$ in a subsequent estimation operation improves the estimation accuracy for the roll angle $\varphi$.

Further, if the offset errors of the three acceleration sensors (top-bottom acceleration sensor 24, front-rear acceleration sensor 25 and left-right acceleration sensor 26) can be estimated, the estimation accuracy for the roll angle $\varphi$ is expected to further improve. However, when the offset errors of the three acceleration sensors are to be estimated, observability cannot be maintained. In view of this, according to the present embodiment, the offset error of the top-bottom acceleration sensor 24 (top-bottom acceleration sensor offset $b_z$) is estimated for the following reasons. When the roll angle $\varphi$ of the vehicle body 1 is in a small range, the top-bottom acceleration of the vehicle body 1 does not change significantly. If the detected value of the top-bottom acceleration in such a case is changed by the top-bottom acceleration sensor offset $b_z$, the effect of a change in the detected value of the top-bottom acceleration when the roll angle $\varphi$ is to be estimated is large. Thus, using the estimated value of the top-bottom acceleration sensor offset $b_z$ in a subsequent estimation operation further improves the estimation accuracy found when the roll angle $\varphi$ is in a small range.

When the roll angle $\varphi$ is to be estimated, in addition to the change in the detected value of the top-bottom acceleration, although to a lesser degree, a change in the detected value of the left-right acceleration is likely to affect the result. In view of this, as discussed above with reference to FIG. 4, the calculation unit 49 according to the present embodiment uses a plurality of Kalman filters 50 to take account of the effects of the left-right acceleration sensor offset $b_y$. Specifically, the observation equation calculation unit 52 of each of the Kalman filters 50 (50_1, 50_2 and 50_3) receives the left-right acceleration sensor offset $b_y$ ($b_{y1}$, $b_{y2}$ and $b_{y3}$) from the imaginary offset input unit 59.

The observation equation calculation unit 52 according to the present embodiment uses, instead of Equation (20) provided above, the following equation as the observation equation to perform calculation.

[Formula 22]

$$\begin{bmatrix} G_y \\ G_z \\ v_r \end{bmatrix} = \begin{bmatrix} V_x \omega_{ya} + a_y(\omega_{ro}, \omega_{ya}, \dot{\omega}_{ro}, \dot{\omega}_{ya}, \phi, L, h, R_{cr}) + g\sin\phi + b_y \\ -V_x \omega_{ya}\tan\phi + a_z(\omega_{ro}, \omega_{ya}, \dot{\omega}_{ro}, \dot{\omega}_{ya}, \phi, L, h, R_{cr}) + g\cos\phi + b_z \\ \dfrac{1}{1 - R_{cr}/R_e(1-\cos\phi)} V_x \end{bmatrix} \quad (21)$$

That is, each of the Kalman filters 50 according to the present embodiment, at the system equation calculation unit 51, uses Equation (19) as the system equation to perform calculation, and, at the observation equation calculation unit 52, uses Equation (21) as the observation equation to perform calculation.

The value of $b_y$ in the first row of Equation (21) is the value of the left-right acceleration sensor offset $b_y$($b_{y1}$,$b_{y2}$, $b_{y3}$) provided by the imaginary offset input unit 59 of each of the Kalman filters 50 (50_1, 50_2 and 50_3).

Based on the observation equation including the left-right acceleration sensor offset $b_y$($b_{y1}$,$b_{y2}$,$b_{y3}$) provided by the imaginary offset input unit 59, the observation equation calculation unit 52 calculates the estimated values of the top-bottom acceleration $G_z$, left-right acceleration $G_y$ and rear-wheel velocity $v_r$. These estimated values are provided to the likelihood calculation unit 57 to calculate the value relating to the likelihood indicative of the reliability of the estimation results of the Kalman filters 50 (50_1, 50_2 and 50_3).

Preferably, the largest one of the values of the left-right acceleration sensor offset $b_y$($b_{y1}$,$b_{y2}$,$b_{y3}$) provided by the imaginary offset input unit 59 is larger than the maximum value of the zero-point offset that can be provided by the left-right acceleration sensor 26, and the smallest value is smaller than the minimum value of the zero-point offset that can be provided by the left-right acceleration sensor 26.

Thus, the observation equation calculation unit 52 can calculate the estimated values of the top-bottom acceleration $G_z$, left-right acceleration $G_y$ and rear-wheel velocity $v_r$ taking account of situations where the value of the zero-point offset of the left-right acceleration sensor 26 is the largest.

For example, if it is ensured that the value of the zero-point offset that can be provided by the left-right acceleration sensor 26 is in a range of ±100 mG, then, the offset value provided by the imaginary offset input unit 59 of the Kalman filter 50_1 may be $b_{y1} \geq 100$ mG and the offset value provided by the imaginary offset input unit 59 of the Kalman filter 50_3 may be $b_{y3} \leq -100$ mG. In this case, the offset value provided by the imaginary offset input unit 59 of the Kalman filter 50_2 may be $b_{y2} = 0$ mG.

As discussed above, the above-described embodiment describes an implementation where the calculation unit 49 includes three Kalman filters 50 (50_1, 50_2 and 50_3); alternatively, the value of the left-right acceleration sensor offset $b_y$ may be set in a similar way if the calculation unit 49 includes two Kalman filters 50 or four or more Kalman filters 50.

Next, the likelihood $\lambda$ calculated by the likelihood calculation unit 57 will be described. As discussed above, if the difference between an estimated value and an actual detected value is expressed by the observation/prediction error e, e is defined by the following equation.

[Formula 23]

$$e = y - h(x) \quad (22)$$
$$= \begin{bmatrix} G_y \\ G_z \\ v_r \end{bmatrix} - h(x)$$

In Equation (22), y is the detected value of the top-bottom acceleration $G_z$, the detected value of the left-right acceleration $G_y$, and the detected value of the rear-wheel velocity $v_r$ provided by the Kalman filters 50 as input parameters. h(x) is the calculation result from the observation equation calculation unit 52.

If the detection error in the top-bottom acceleration $G_z$ detected by the top-bottom acceleration sensor 24 is denoted by $\delta G_z$, the detection error in the left-right acceleration $G_y$ detected by the left-right acceleration sensor 26 is denoted by $\delta G_y$, and the detection error in the rear-wheel velocity $v_r$ detected by the rear-wheel velocity sensor 7 is denoted by $\delta v_r$, then, the variance-covariance matrix R of these detection errors can be expressed by the equation below. In the equation below, E(a) means the expected value of a.

[Formula 24]

$$R = \begin{bmatrix} E(\delta G_y \delta G_y) & E(\delta G_y \delta G_z) & E(\delta G_y \delta v_r) \\ E(\delta G_z \delta G_y) & E(\delta G_z \delta G_z) & E(\delta G_z \delta v_r) \\ E(\delta v_r \delta G_y) & E(\delta v_r \delta G_z) & E(\delta v_r \delta v_r) \end{bmatrix} \quad (23)$$

Further, if the estimation error in the roll angle $\varphi$ is denoted by $\delta\varphi$, the estimation error in the vehicle velocity $V_x$ is denoted by $\delta V_x$, the estimation error in the roll angular velocity sensor offset $b_{ro}$ is denoted by $\delta b_{ro}$, the estimation error in the yaw angular velocity sensor offset $b_{ya}$ is denoted by $\delta b_{ya}$, and the estimation error in the top-bottom acceleration sensor offset $b_z$ is denoted by $\delta b_z$, then, the variance-covariance matrix P of these detection errors can be expressed by the following equation.

[Formula 25]

$$P = \begin{bmatrix} E(\delta\varphi\delta\varphi) & E(\delta\varphi\delta V_x) & E(\delta\varphi\delta b_{ro}) & E(\delta\varphi\delta b_{ya}) & E(\delta\varphi\delta b_z) \\ E(\delta V_x\delta\varphi) & E(\delta V_x\delta V_x) & E(\delta V_x\delta b_{ro}) & E(\delta V_x\delta b_{ya}) & E(\delta V_x\delta b_z) \\ E(\delta b_{ro}\delta\varphi) & E(\delta b_{ro}\delta V_x) & E(\delta b_{ro}\delta b_{ro}) & E(\delta b_{ro}\delta b_{ya}) & E(\delta b_{ro}\delta b_z) \\ E(\delta b_{ya}\delta\varphi) & E(\delta b_{ya}\delta V_x) & E(\delta b_{ya}\delta b_{ro}) & E(\delta b_{ya}\delta b_{ya}) & E(\delta b_{ya}\delta b_z) \\ E(\delta b_z\delta\varphi) & E(\delta b_z\delta V_x) & E(\delta b_z\delta b_{ro}) & E(\delta b_z\delta b_{ya}) & E(\delta b_z\delta b_z) \end{bmatrix} \quad (24)$$

The Kalman filters 50 (50_1, 50_2 and 50_3) successively calculate the matrix P and matrix R.

The variance-covariance matrix S for the error contained in the observation/prediction error e is expressed by the following equation.

[Formula 26]

$$S = R + HPH^t \quad (25)$$

The superscript t in the equation provided above means transposed matrix. That is, $H^t$ means the transposed matrix of the matrix H. H is the Jacobian matrix of h(x), defined by the following equation.

[Formula 27]

$$H = \begin{bmatrix} \dfrac{\partial h(x)}{\partial \varphi} & \dfrac{\partial h(x)}{\partial V_x} & \dfrac{\partial h(x)}{\partial b_{ro}} & \dfrac{\partial h(x)}{\partial b_{ya}} & \dfrac{\partial h(x)}{\partial b_z} \end{bmatrix} \quad (26)$$

The likelihood calculation unit 57 calculates the likelihood $\lambda$ based on the equation provided below, for example. This likelihood $\lambda$ is a likelihood value that is momentary, and may be called momentary likelihood.

[Formula 28]

$$\lambda = \dfrac{1}{\sqrt{\det(S)}} \exp\left[-\dfrac{1}{2}\{y - h(x)\}^t S^{-1}\{y - h(x)\}\right] \quad (27)$$

The likelihood calculation unit 57 is only required to be configured to calculate the likelihood based on the observation/prediction error e=y−h(x), and the calculation method is not limited to Equation (27).

$x(\varphi, V_x, b_{ro}, b_{ya}, b_z)$ estimated by the Kalman filter 50_1 is denoted by $x_1$, and the likelihood $\lambda$ calculated by the likelihood calculation unit 57 of the Kalman filter 50_1 is denoted by $\lambda_1$. Similarly, $x(\varphi, V_x, b_{ro}, b_{ya}, b_z)$ estimated by the Kalman filter 50_2 is denoted by $x_2$, and the likelihood $\lambda$ calculated by the likelihood calculation unit 57 of the Kalman filter 50_2 is denoted by $\lambda_2$. Similarly, $x(\varphi, V_x, b_{ro}, b_{ya}, b_z)$ estimated by the Kalman filter 50_3 is denoted by $x_3$, and the likelihood $\lambda$ calculated by the likelihood calculation unit 57 of the Kalman filter 50_3 is denoted by $\lambda_3$. Then, the left-right acceleration sensor offset $b_y$ is calculated by the following equation.

[Formula 29]

$$b_y = \frac{\sum_{i=1}^{n} \tilde{\lambda}_i \cdot b_{yi}}{\sum_{i=1}^{n} \tilde{\lambda}_i} \qquad (28)$$

In Equation 28, the character with a tilde (~) on top of λ means a value obtained after the momentary likelihood λ has been filtered by the low-pass filter 58. It does not mean that filtering is necessary. If filtering is not performed, the value of the momentary likelihood λ may be used. In Equation (28), n is the number of Kalman filters 50 included in the calculation unit 49. According to the present embodiment, n=3.

Each Kalman filter 50 performs the estimation process taking account of the left-right acceleration sensor offset $b_y(b_{y1}, b_{y2}, b_{y3})$ provided by the imaginary offset input unit 59. Then, the indicators that show how reliable these estimation results are are calculated, which are $\lambda(\lambda_1, \lambda_2, \lambda_3)$. Thus, the value of the left-right acceleration sensor offset $b_y$ provided to the imaginary offset input unit 59 included in each of the Kalman filters 50 (50_1, 50_2 and 50_3) is weighted depending on the likelihood $\lambda(\lambda_1, \lambda_2, \lambda_3)$, which indicates how reliable the estimation results of the Kalman filters 50 (50_1, 50_2 and 50_3) are, thereby determining the estimated value of the left-right acceleration sensor offset $b_y$.

Further, based on the same reasoning, as expressed by the equation below, $x(\varphi, V_x, b_{ro}, b_{ya}, b_z)$ estimated by each Kalman filter 50 is weighted depending on the likelihood $\lambda(\lambda_1, \lambda_2, \lambda_3)$, which indicates how reliable the estimation results of the Kalman filters 50 (50_1, 50_2 and 50_3) are, thereby providing the estimation results taking account of the left-right acceleration sensor offset $b_y$.

[Formula 30]

$$x = \frac{\sum_{i=1}^{n} \tilde{\lambda}_i \cdot x_i}{\sum_{i=1}^{n} \tilde{\lambda}_i} \qquad (29)$$

The state quantity determination unit 503 performs the calculation represented by Equations (28) and (29). Thus, the calculation unit 49 estimates the left-right acceleration sensor offset $b_y$, in addition to the roll angle φ, vehicle velocity $V_x$, roll angular velocity offset $b_{ro}$, yaw angular velocity offset $b_{ya}$, and top-bottom acceleration offset $b_z$. These estimated values are estimation results taking account of the left-right acceleration sensor offset $b_y$, and thus have improved accuracy over the conventional art.

Equations (28) and (29) perform calculation with proportional distribution depending on the value of the likelihood λ; however, this calculation is merely an example. The state quantity determination unit 503 may use any other calculation method that performs weighting depending on the value of the likelihood λ.

<Alternative Configurations>

The attitude estimation apparatus 10 according to the present embodiment may use the following variations.

(1) In the embodiment described above, the state quantity determination unit 503 performs a calculation where the left-right acceleration sensor offset $b_y$ provided to each Kalman filter 50 and the estimated value x estimated by the Kalman filter are weighted depending on the likelihood λ. Alternatively, a Kalman filter 50 that is most likely to be reliable may be selected based on the likelihood λ calculated by the Kalman filters 50, the left-right acceleration sensor offset $b_y$ provided to this Kalman filter 50 may be treated as the estimated value of the left-right acceleration sensor offset and the estimation results of this Kalman filter 50 may be treated as the estimation results of the calculation unit 49. This will simplify the calculation process by the state quantity determination unit 503.

(2) In the embodiment described above, each Kalman filter 50 estimates the roll angle φ, vehicle velocity $V_x$, roll angular velocity sensor offset $b_{ro}$, yaw angular velocity sensor offset $b_{ya}$, and top-bottom acceleration sensor offset $b_z$, and the left-right acceleration sensor offset $b_y$ is estimated taking account of the likelihood obtained based on the estimation results of the Kalman filters 50. Alternatively, each Kalman filter 50 may estimate the roll angle φ, vehicle velocity $V_x$, roll angular velocity sensor offset $b_{ro}$, yaw angular velocity sensor offset $b_{ya}$, and left-right acceleration sensor offset $b_y$, and the top-bottom acceleration sensor offset $b_z$ may be estimated taking account of the likelihood obtained based on the estimation results of the Kalman filters 50. In this case, the top-bottom acceleration sensor 24 corresponds to the "detection unit of interest" or in other words, in this example the top-bottom acceleration sensor 24 is a detection unit associated with the offset error which is estimated by using the likelihood.

In this case, the calculation unit 49 has the configuration shown in FIG. 8, instead of FIG. 4. That is, the imaginary offset input unit 59 is configured to provide the offset value $b_z$ for the top-bottom acceleration sensor 24 to the observation equation calculation unit 52. The observation equation calculation unit 52 uses Equation (21) as the observation equation to perform calculation. However, unlike in the above-described embodiment, the value of bz in the second row of Equation (21) is the value of the top-bottom acceleration sensor offset $b_z(b_{z1}, b_{z2}, b_{z3})$ provided by the imaginary offset input unit 59 of each Kalman filter 50 (50_1, 50_2 and 50_3). Based on the observation equation including the top-bottom acceleration sensor offset $b_z(b_{z1}, b_{z2}, b_{z3})$ provided by this imaginary offset input unit 59, the observation equation calculation unit 52 calculates the estimated values of the top-bottom acceleration $G_z$, left-right acceleration $G_y$, and rear-wheel velocity $v_r$. These estimated values are provided to the likelihood calculation unit 57 to calculate the value relating to the likelihood indicative of how reliable the estimation results of the Kalman filters 50 (50_1, 50_2 and 50_3) are.

In this case, the state quantity determination unit 503 calculates the top-bottom acceleration sensor offset $b_z$ by performing calculation based on Equation (30), instead of Equation (28). Further, calculating the estimated value x by Equation (29) provides estimated values taking account of the roll angle φ, vehicle velocity $V_x$, roll angle velocity offset $b_{ro}$, yaw angle velocity offset $b_{ya}$, top-bottom acceleration offset $b_z$, and left-right acceleration sensor offset $b_y$.

[Formula 31]

$$b_z = \frac{\sum_{i=1}^{n} \tilde{\lambda}_i \cdot b_{zi}}{\sum_{i=1}^{n} \tilde{\lambda}_i} \qquad (30)$$

Similarly, each Kalman filter 50 may estimate the roll angle φ, vehicle velocity $V_x$, roll angle velocity sensor offset $b_{ro}$, yaw angle velocity sensor offset $b_{ya}$, and top-bottom acceleration sensor offset $b_z$, and the front-rear acceleration sensor offset $b_x$ may be estimated taking account of the likelihood obtained based on the estimation results of the Kalman filters 50. In this case, the front-rear acceleration sensor 25 corresponds to the "detection unit of interest", or in other words, in this example the front-rear acceleration sensor 25 is a detection unit associated with the offset error which is estimated by using the likelihood. The offset value for the front-rear acceleration sensor 25 provided by the imaginary offset input unit 59 is provided as the input parameter u for the function f(x,u) included in the system equation.

Similarly, each Kalman filter 50 may estimate the roll angle φ, vehicle velocity $V_x$, roll angle velocity sensor offset $b_{ro}$, yaw angle velocity sensor offset $b_{ya}$, and left-right acceleration sensor offset $b_y$, and the front-rear acceleration sensor offset $b_x$ may be estimated taking account of the likelihood obtained based on the estimation results of the Kalman filters 50. Again, the front-rear acceleration sensor 25 corresponds to the "detection unit of interest", or in other words, in this example the front-rear acceleration sensor 25 is a detection unit associated with the offset error which is estimated by using the likelihood. The offset value for the front-rear acceleration sensor 25 provided by the imaginary offset input unit 59 is provided as the input parameter u for the function f(x,u) included in the system equation.

<Calculation of Estimated Values of Parameters>

Now, the ability of the attitude estimation apparatus according to the present embodiment to estimate the attitude of the vehicle 100 with high accuracy will be proven with reference to examples.

FIGS. 9A to 9L are graphs showing the estimation results for the attitude of the vehicle 100 using the attitude estimation apparatus while the vehicle 100 was travelling on a predetermined road surface. FIGS. 9A to 9L are the results of simulations made while the vehicle 100 traveled freely on a road surface having a horizontal surface portions and slopes. The figures show the calculation results of the estimated values of the various parameters based on the detected values of the mounted roll angle velocity sensor 21, yaw angle velocity sensor 22, top-bottom acceleration sensor 24, front-rear acceleration sensor 25, left-right acceleration sensor 26, and rear-wheel velocity sensor 7 having no offset error when an offset error was intentionally generated at a predetermined moment in a predetermined sensor. To simulate actual situations, white noise is superimposed on the detected values from the sensors provided to the Kalman filters 50.

In FIGS. 9A to 9F, the estimation results by the calculation unit 49 according to the present embodiment described with reference to FIG. 4 are represented by solid lines. That is, the calculation unit 49 presupposed for FIGS. 9A to 9F is configured such that each Kalman filter 50 estimates the roll angle φ, vehicle velocity $V_x$, roll angular velocity sensor offset $b_{ro}$, yaw angular velocity sensor offset $b_{ya}$, and top-bottom acceleration sensor offset $b_z$, and the left-right acceleration sensor offset $b_y$ is estimated taking account of the likelihood obtained based on the estimation results by the Kalman filters 50.

FIGS. 9A and 9B are graphs showing the estimated values resulting when an offset error with 250 mG was superimposed in the left-right acceleration sensor 26 at a predetermined moment. In FIGS. 9A and 9B, a dotted line represents a true value, a broken line represents a value estimated using one Kalman filter 50, and a solid line represents a value estimated using a plurality of Kalman filters. The estimation results from the calculation unit 49 according to the present embodiment described with reference to FIG. 4 are represented by solid lines.

In FIG. 9A, the estimated value of the left-right acceleration sensor offset $b_y$ increases after a predetermined moment, indicating that an estimation close to the true value was achieved. The estimated values of the other sensor offsets are zero, again indicating that an estimation close to the true value was achieved.

FIG. 9B demonstrates that the solid line achieves estimation results closer to the true value than the broken line. This shows that arranging a plurality of Kalman filters 50 in parallel and additionally estimating an offset error based on a likelihood improves estimation accuracy.

FIGS. 9C to 9F are graphs showing the estimated values resulting when an offset error was generated in sensors other than the left-right acceleration sensor 26. In FIGS. 9C to 9F, a dotted line represents a true value, and a solid line represents a value estimated using a plurality of Kalman filters 50.

Figure 9D:
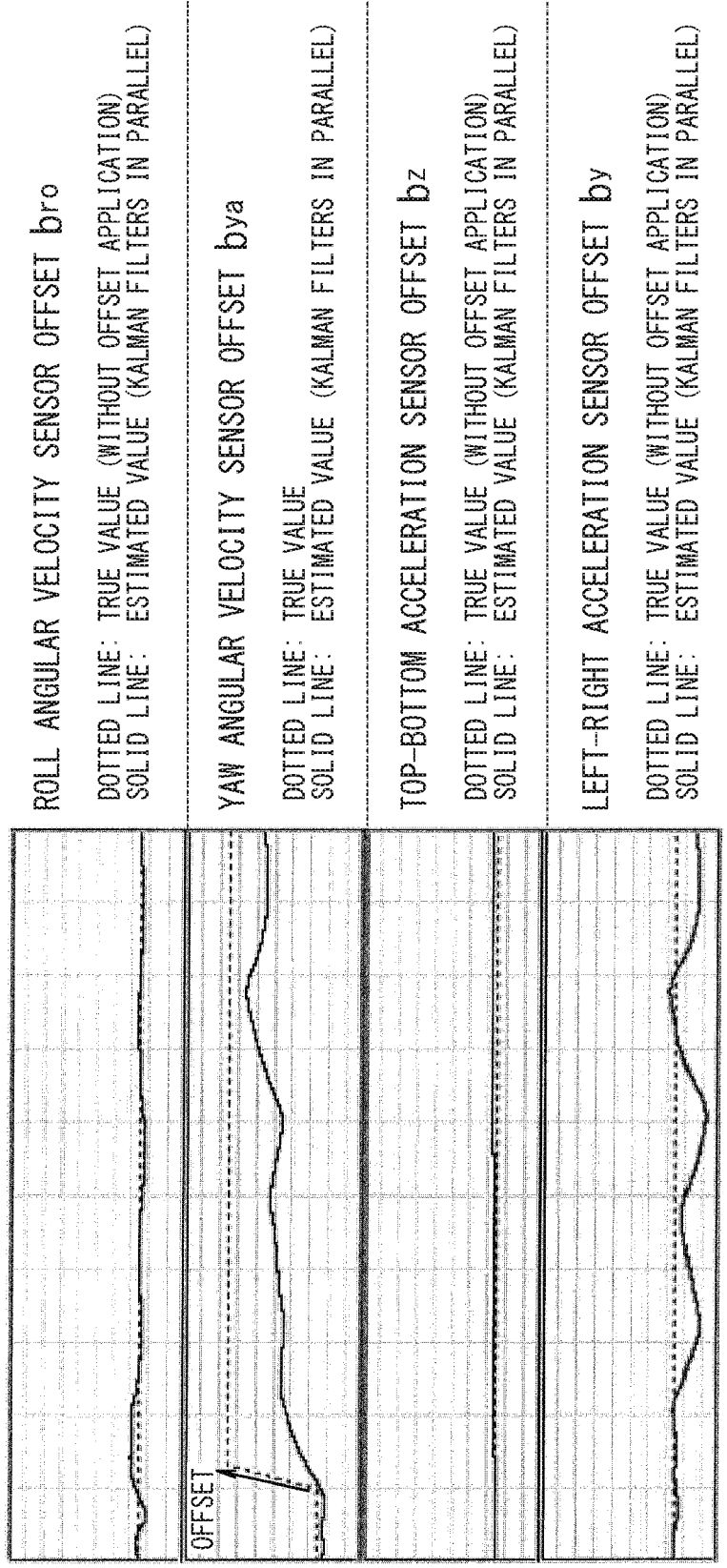
FIG. 9D illustrates how the estimated values of various parameters change over time.
Figure 9E:
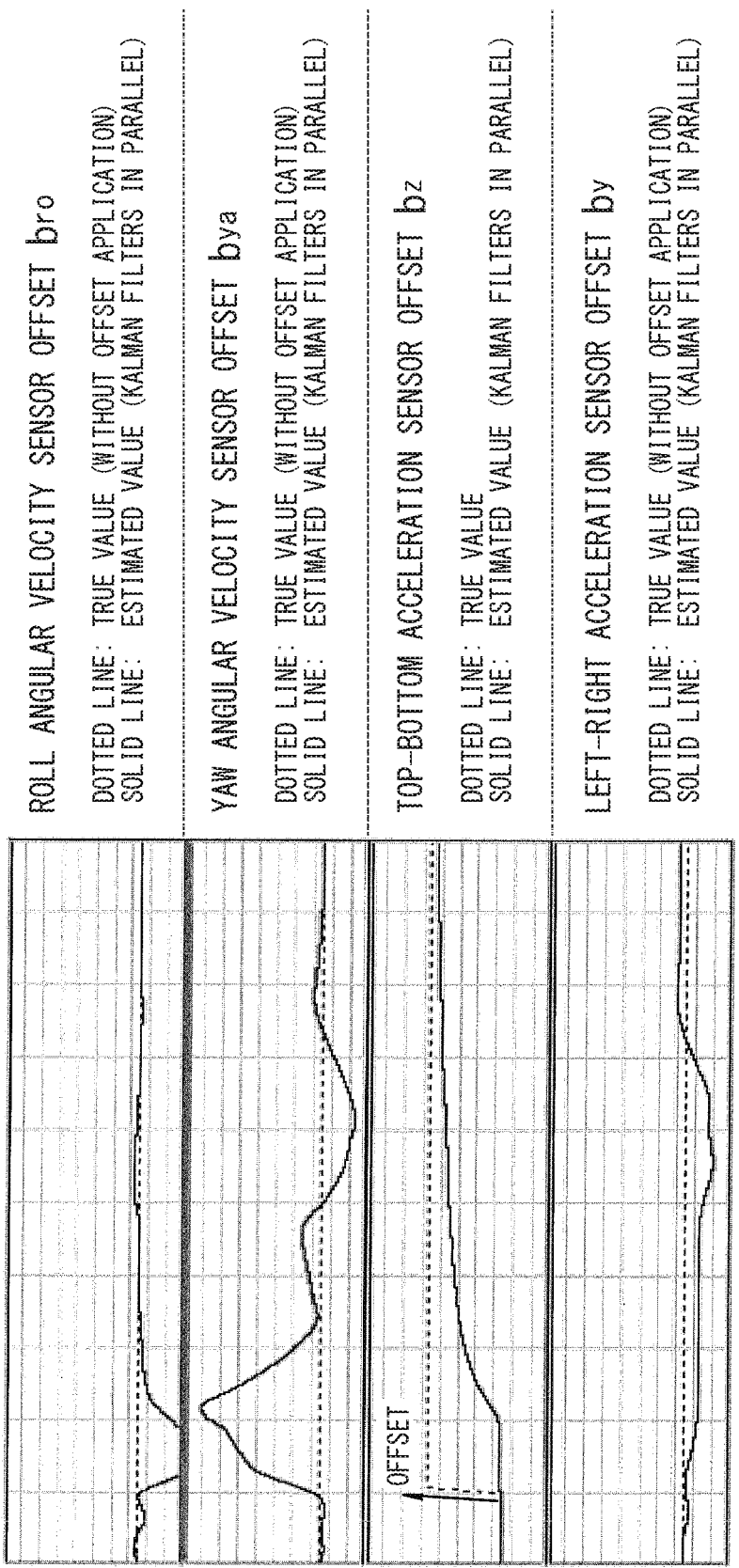
FIG. 9E illustrates how the estimated values of various parameters change over time.

FIG. 9C shows the estimated values found when an offset of 1 deg/sec was superimposed in the roll angular velocity sensor 21 after a predetermined period of time. FIG. 9D shows the estimated values found when an offset of 1 deg/sec was superimposed in the yaw angular velocity sensor 22 after a predetermined period of time. FIG. 9E shows the estimated values found when an offset of 250 mG was superimposed in the top-bottom acceleration sensor 24 after a predetermined period of time.

Figure 9F:
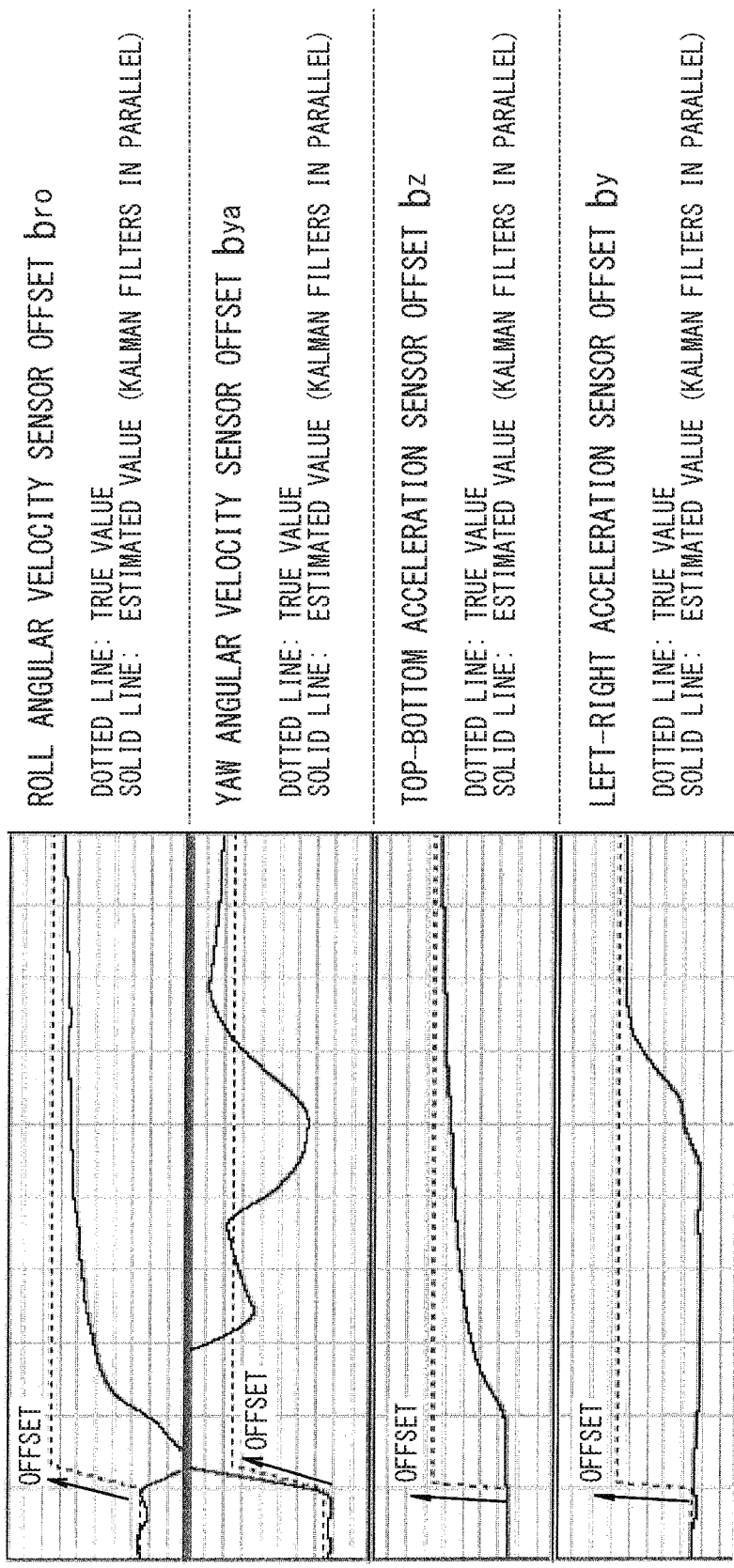
FIG. 9F illustrates how the estimated values of various parameters change over time.

FIG. 9F shows the estimated values found when offsets were superimposed in all the sensors in a combined manner. Specifically, an offset of 1 deg/sec was superimposed in the roll angular velocity sensor 21, an offset of 1 deg/sec was superimposed in the yaw angular velocity sensor 22, an offset of 250 mG was superimposed in the top-bottom acceleration sensor 24, and an offset of 250 mG was superimposed in the left-right acceleration sensor 26.

FIGS. 9C to 9F demonstrate that, immediately after an offset was superimposed, the estimated values of some other sensor offsets temporarily fluctuated, but converged over time. This verifies that, in each case, the values of the sensor offsets were estimated with high accuracy without being interfered with by other offsets.

The calculation unit 49 presupposed for FIGS. 9G to 9L is configured such that each Kalman filter 50 estimates the roll angle φ, vehicle velocity $V_x$, roll angle velocity sensor offset $b_{ro}$, yaw angle velocity sensor offset $b_{ya}$, and top-bottom acceleration sensor offset $b_z$, and the front-rear acceleration sensor offset $b_x$ was estimated taking account of the likelihood obtained based on the estimation results of the Kalman filters 50. In FIGS. 9G to 9L, the estimation results by the calculation unit 49 are represented by solid lines.

Figure 9G:
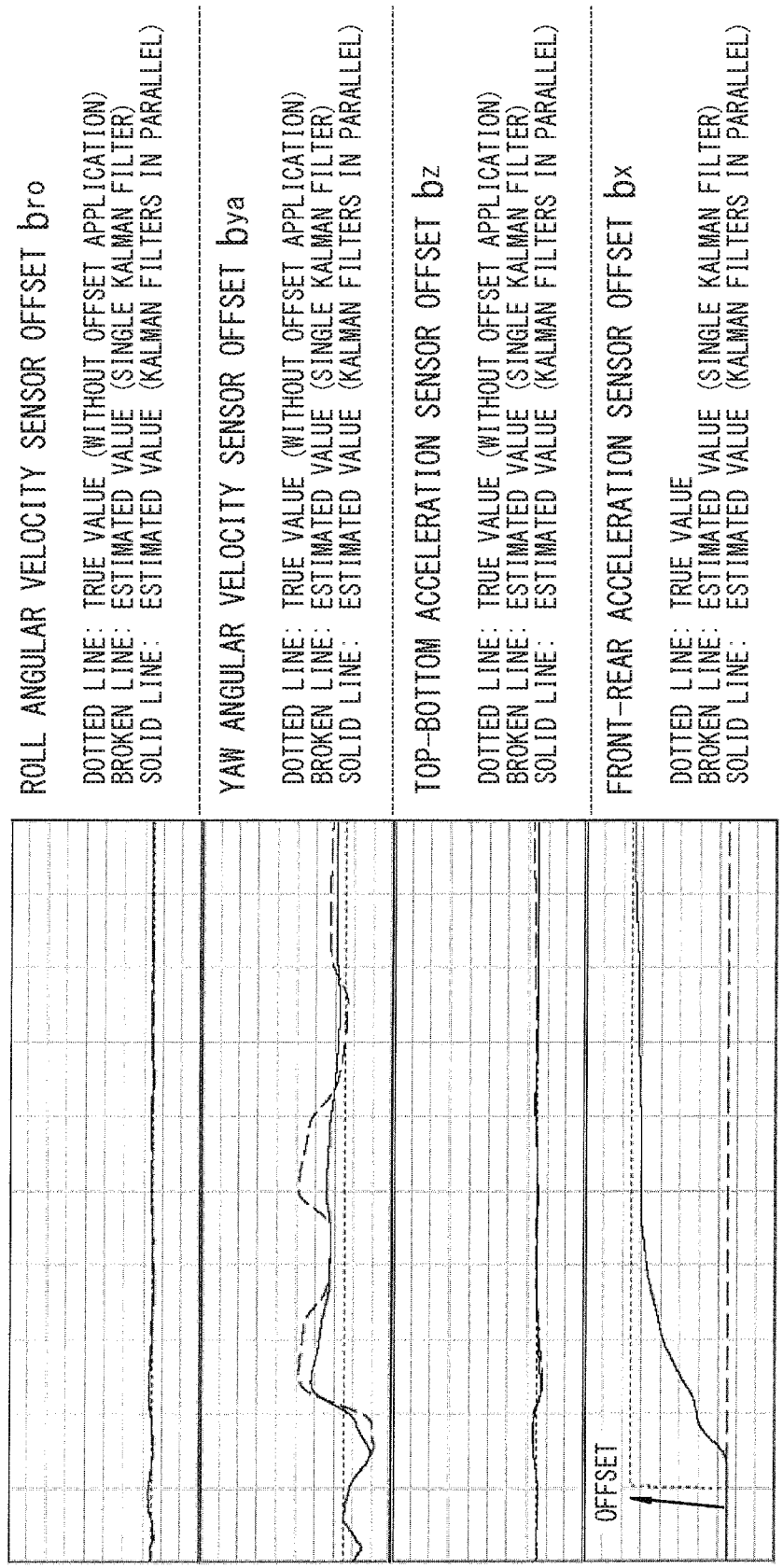
FIG. 9G illustrates how the estimated values of various parameters change over time.

FIGS. 9G and 9H are graphs showing the estimated values resulting when an offset error of 100 mG was superimposed in the front-rear acceleration sensor 25 at a predetermined moment. In FIGS. 9G and 9H, a dotted line represents a true value, a broken line represents a value estimated using one Kalman filter 50, and a solid line represents a value estimated using a plurality of Kalman filters 50.

FIG. 9G demonstrates that the estimated value of the front-rear acceleration sensor offset $b_x$ increased after a predetermined moment and an estimation close to the true value was achieved. Further, the estimated values of the other sensor offsets were zero, again demonstrating that an estimation close to the true value was achieved.

FIG. 9H demonstrates that the solid line achieves estimation results closer to the true value than the broken line. This shows that arranging a plurality of Kalman filters 50 in parallel and additionally estimating an offset error based on a likelihood improves estimation accuracy.

FIGS. 9I to 9L are graphs showing the estimation results found when an offset error was generated in sensors other than the front-rear acceleration sensor 26. In FIGS. 9I to 9L, a dotted line represents a true value, and a solid line represents a value estimated using a plurality of Kalman filters 50.

Figure 9I:
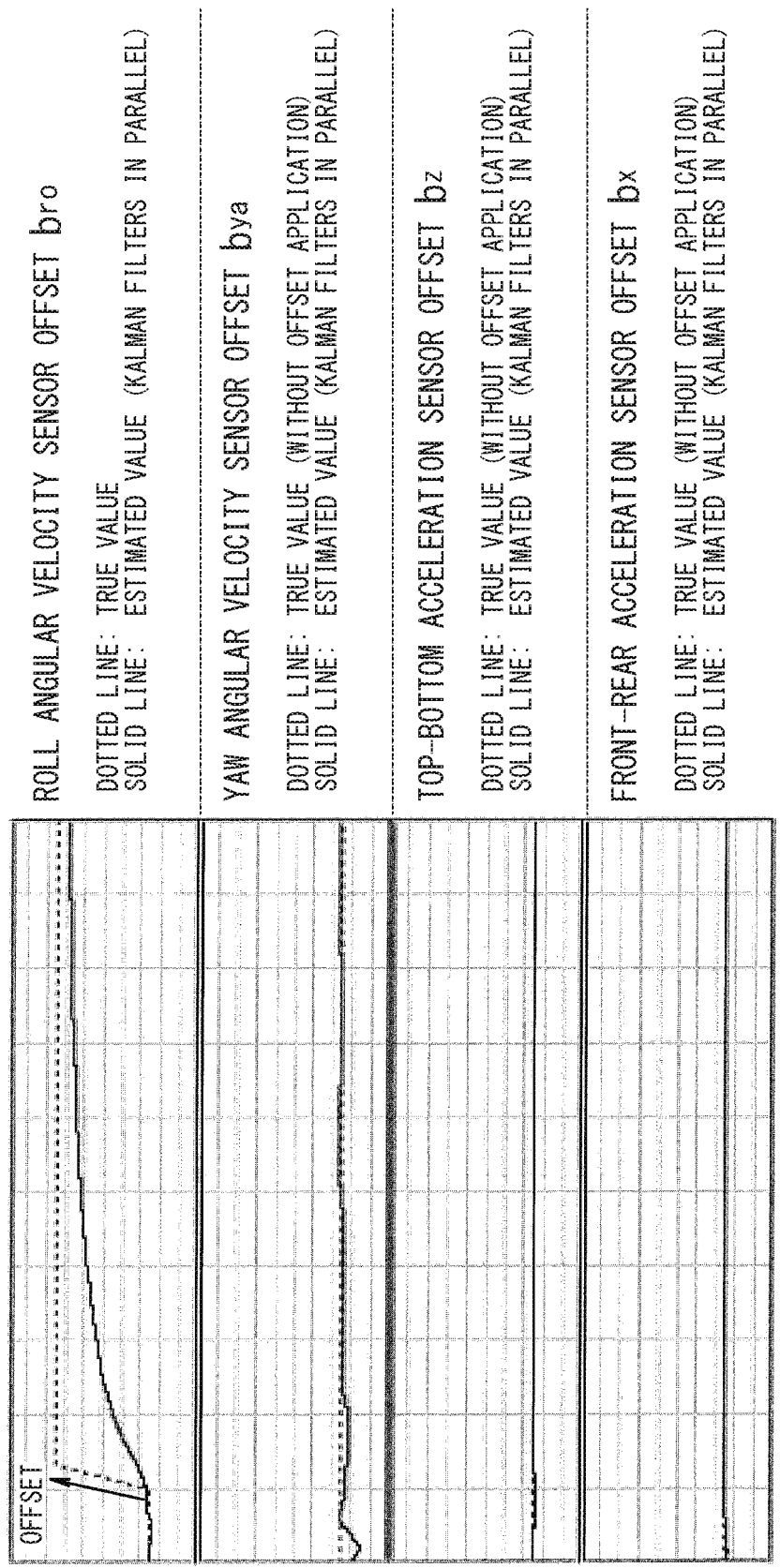
FIG. 9I illustrates how the estimated values of various parameters change over time.
Figure 9J:
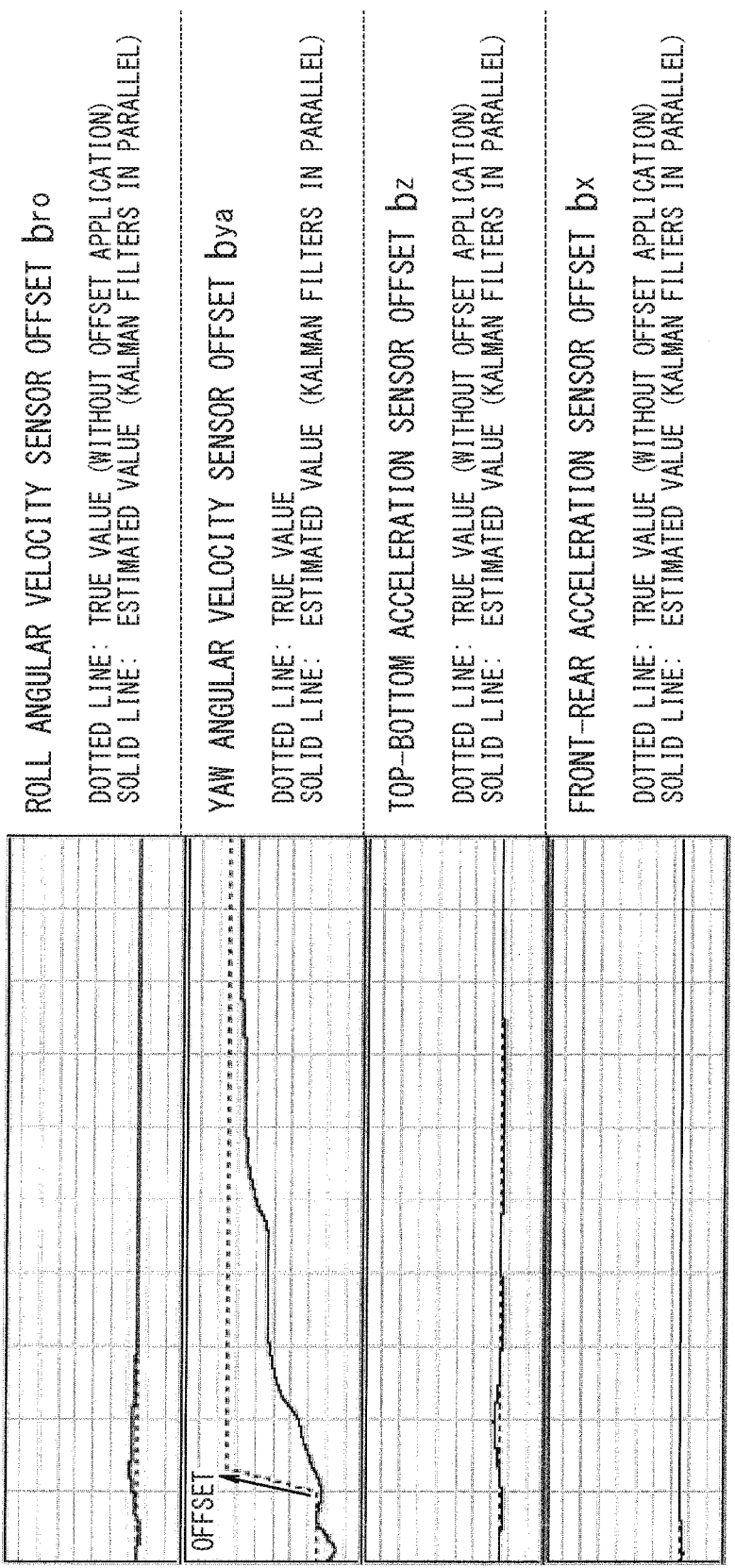
FIG. 9J illustrates how the estimated values of various parameters change over time.
Figure 9K:
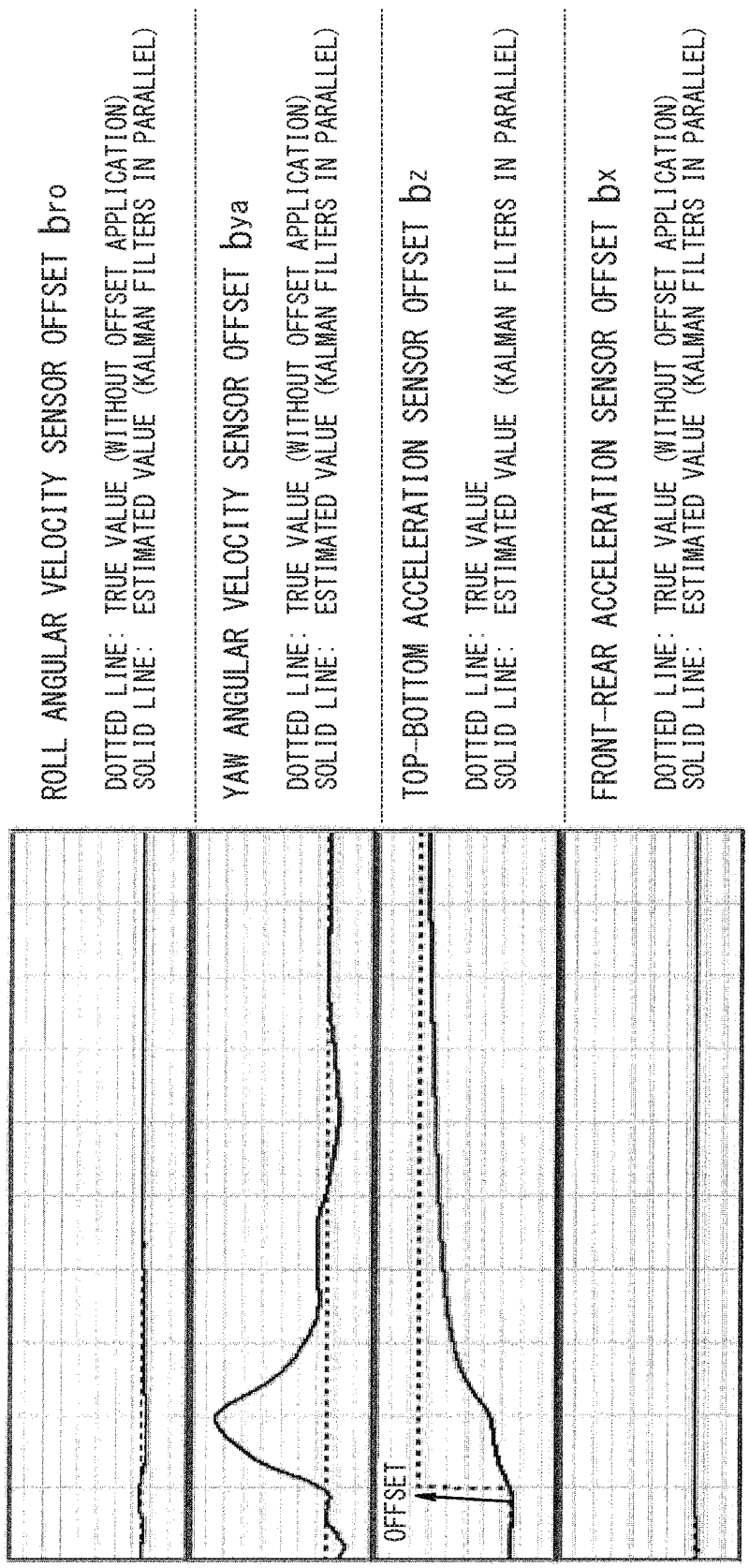
FIG. 9K illustrates how the estimated values of various parameters change over time.

FIG. 9I shows the estimated values found when an offset of 1 deg/sec was superimposed in the roll angle velocity sensor 21 after a predetermined period of time. FIG. 9J shows the estimated values found when an offset of 1 deg/sec was superimposed in the yaw angular velocity sensor 22 after a predetermined period of time. FIG. 9K shows the estimated values found when an offset of 100 mG was superimposed in the top-bottom acceleration sensor 24 after a predetermined period of time.

Figure 9L:
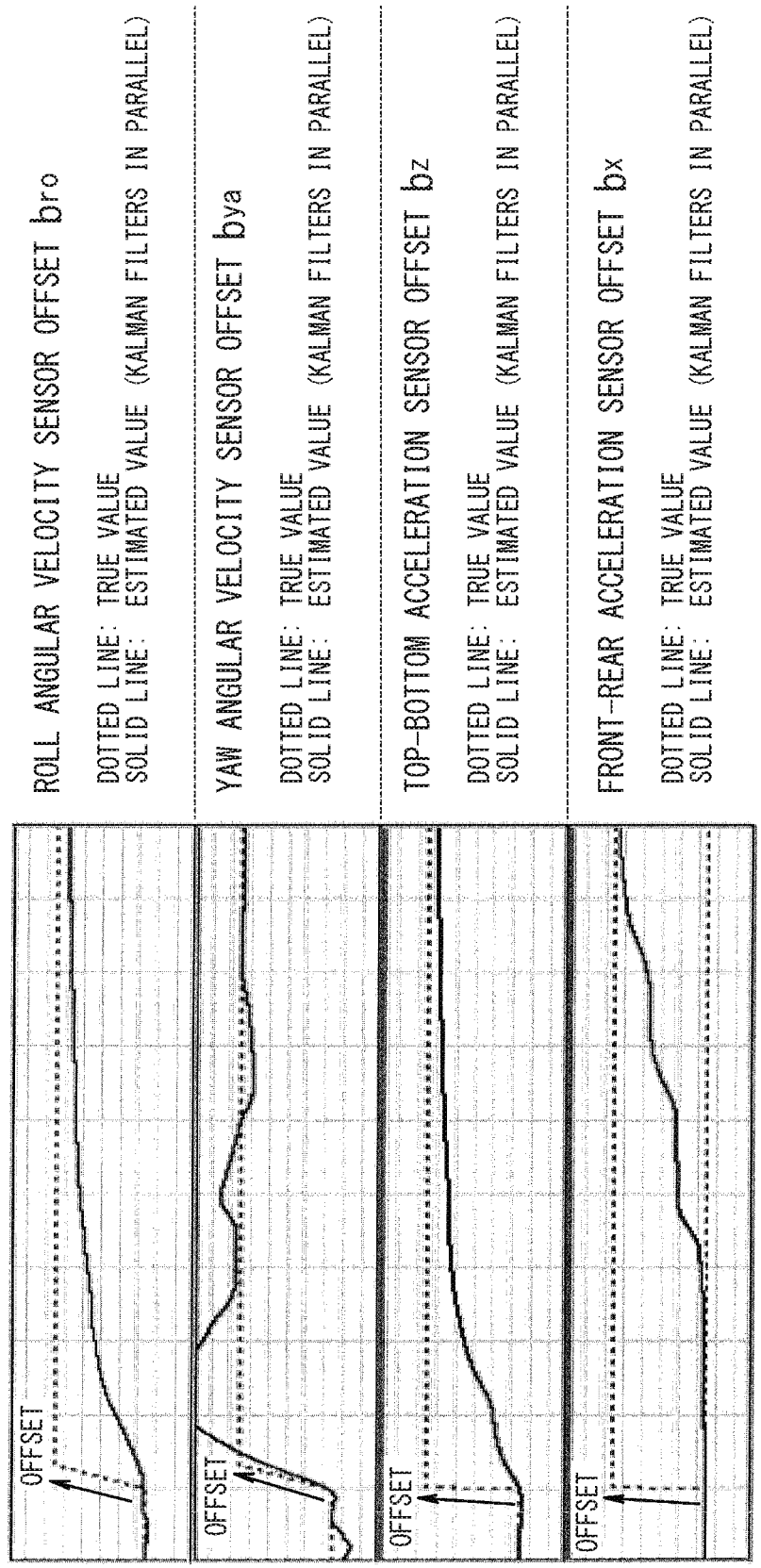
FIG. 9L illustrates how the estimated values of various parameters change over time.

Further, FIG. 9L shows the estimated values found when offsets were superimposed in all the sensors in a combined manner. Specifically, an offset of 1 deg/sec was superimposed in the roll angle velocity sensor 21, an offset of 1 deg/sec was superimposed in the yaw angle velocity sensor 22, an offset of 100 mG was superimposed in the top-bottom acceleration sensor 24, and an offset of 100 mG was superimposed in the front-rear acceleration sensor 25.

FIGS. 9I to 9L demonstrate that, immediately after an offset was superimposed, the estimated values of some other sensor offsets temporarily fluctuated, but converged over time. This verifies that, in each case, the values of the sensor offsets were estimated with high accuracy without being interfered with by other offsets.

Second Embodiment

A second embodiment of the present invention will be described. The vehicle body 100 is the same as in the first embodiment and will not be described again.

<Configuration of Attitude Estimation Apparatus>

Figure 10:
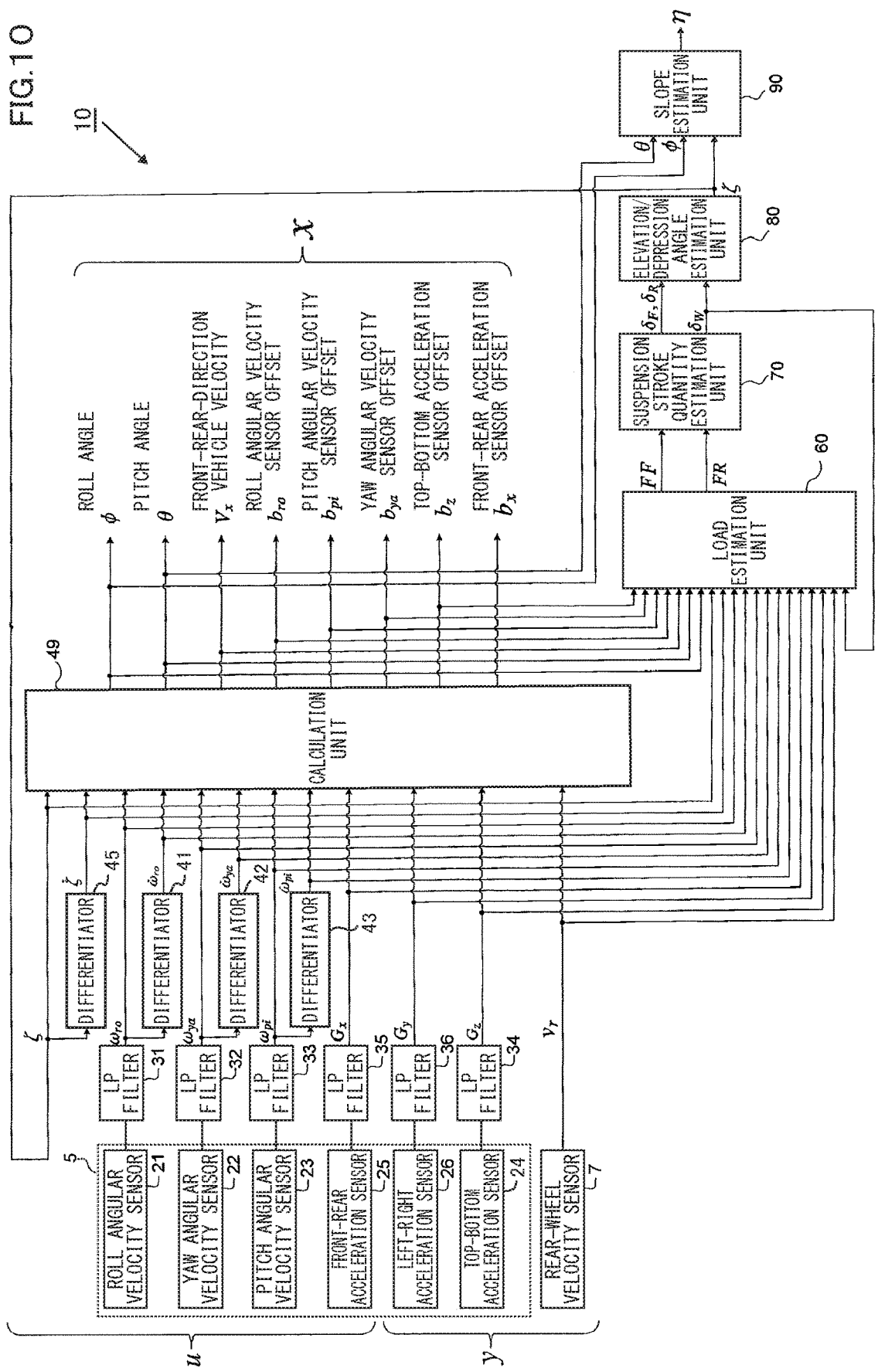
FIG. 10 is a schematic block diagram of an exemplary configuration of the attitude estimation apparatus.

FIG. 10 is a schematic block diagram of an exemplary configuration of the attitude estimation apparatus according to the present embodiment. The attitude estimation apparatus 10 shown in FIG. 10 includes a group of sensors 5, a rear-wheel velocity sensor 7, low-pass filters 31, 32, 33, 34, 35 and 36, differentiators 41, 42, 43 and 45, a calculation unit 49, a load estimation unit 60, a suspension stroke quantity estimation unit 70, an elevation/depression angle estimation unit 80, and a slope estimation unit 90. The functionality of the calculation unit 49, load estimation unit 60, suspension stroke quantity estimation unit 70, elevation/depression angle estimation unit 80 and slope estimation unit 90 is implemented by the ECU 20 shown in FIG. 2 operating in accordance with a program. The calculation unit 49 corresponds to the "attitude estimation unit".

According to the present embodiment, the group of sensors 5 includes a roll angular velocity sensor 21, a yaw angular velocity sensor 22, a pitch angular velocity sensor 23, a top-bottom acceleration sensor 24, a front-rear acceleration sensor 25, and a left-right acceleration sensor 26. That is, the present embodiment is different from the first embodiment in that the group of sensors 5 further includes a pitch angular velocity sensor 23. The pitch angular velocity sensor 23 is provided on the vehicle body 1 so as to detect the pitch angular velocity of the vehicle body 1, and corresponds to the "third angular velocity detection unit".

The output signal from the pitch angular velocity sensor 23 is passed through the low-pass filter 33 and is fed into the calculation unit 49 and differentiator 43 as the pitch angular velocity. The low-pass filter 33 removes noise from the output signal from the pitch angular velocity sensor 23. The differentiator 43 provides, as a pitch angular acceleration, the differential value of the pitch angular velocity to the calculation unit 49.

The frequency characteristics of the low-pass filter 33 are decided depending on the output characteristics of the pitch angular velocity sensor 23. More specifically, the frequency characteristics of the noise components contained in the output signal from the pitch angular velocity sensor 23 can be identified in advance, at the stage of apparatus design. The low-pass filter 33 may be designed to block these noise components and pass the detection signal of the pitch angular velocity sensor 23.

In the present embodiment, the calculation unit 49 receives detected values relating to the roll angular velocity, roll angular acceleration, yaw acceleration, yaw angular acceleration, pitch angular velocity, pitch angular acceleration, top-bottom acceleration, front-rear acceleration, left-right acceleration, and rear-wheel velocity. Then, based on these values, the calculation unit 49 estimates the roll angle, pitch angle, front-rear direction vehicle velocity, roll angular velocity sensor offset, yaw angular velocity sensor offset, pitch angular velocity sensor offset, top-bottom acceleration sensor offset, and front-rear acceleration sensor offset, and output them. The pitch angular velocity sensor offset is the offset error for the pitch angular velocity sensor 23.

The attitude estimation apparatus 10 according to the present embodiment includes an elevation/depression angle estimation unit 80, and is configured such that the calculation unit 49 also receives an estimated value of the elevation/depression angle from the elevation/depression angle estimation unit 80.

The pitch angular velocity sensor offset estimated by the calculation unit 49, the elevation/depression angle estimated by the elevation/depression angle estimation unit 80, and the first-order differential value of the elevation/depression angle will be denoted by the following characters.

TABLE 6

| Parameter | Meaning |
| --- | --- |
| $b_{pi}$ | pitch angular velocity sensor offset |
| $\zeta$ | elevation/depression angle |
| $\dot{\zeta}$ | differential value of elevation/depression angle |

Figure 11:
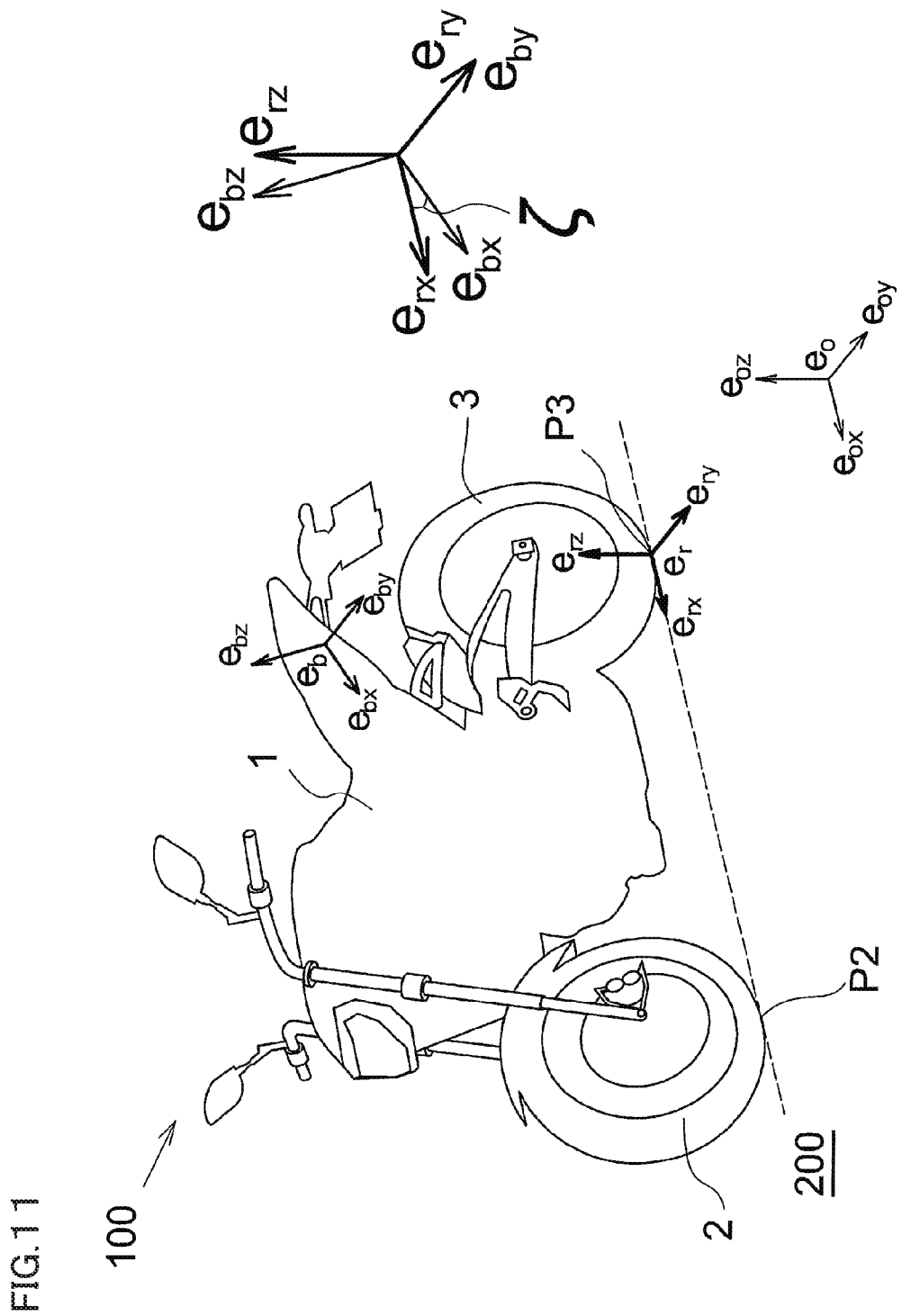
FIG. 11 illustrates an elevation/depression angle.

FIG. 11 illustrates the elevation/depression angle $\zeta$. The elevation/depression angle $\zeta$ is defined as the angle formed by the road-surface coordinate system $e_r$ and vehicle coordinate system $e_b$ found when a stroke quantity of the suspension of the vehicle 100 is present. In the following description, the elevation/depression angle $\zeta$ is the angle formed by the x-axis $e_{bx}$ of the vehicle coordinate system $e_b$ and the x-axis $e_{rx}$ of the road-surface coordinate system.

<Configuration of Kalman Filters>

Figure 12:
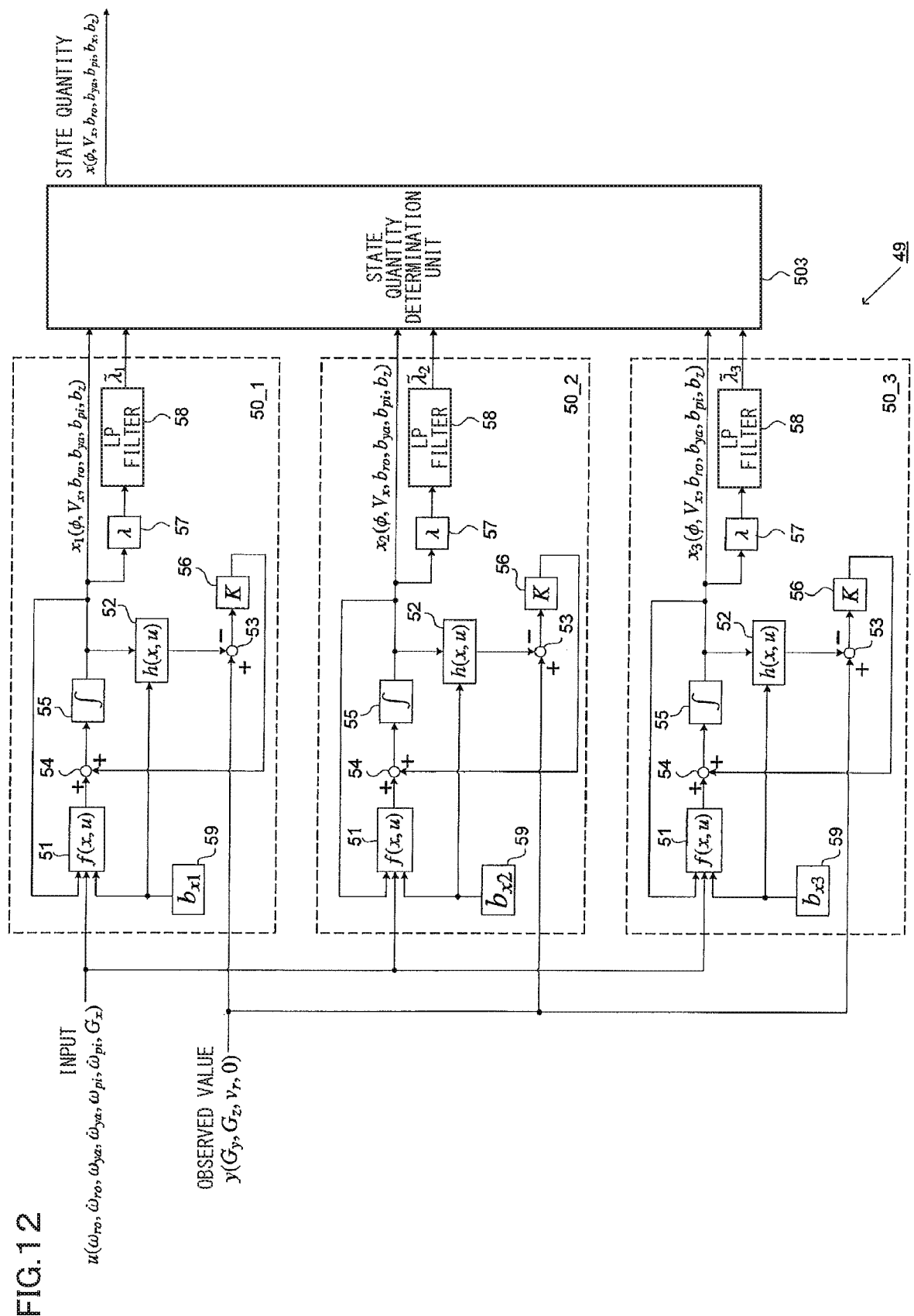
FIG. 12 is a schematic block diagram of an exemplary configuration of the calculation unit.

FIG. 12 is a schematic block diagram of an exemplary configuration of the calculation unit 49 according to the present embodiment. According to the present embodiment, similar to the first embodiment described with reference to FIG. 4, the calculation unit 49 includes a plurality of Kalman filters 50_1, 50_2 and 50_3 and a state quantity determination unit 503. FIG. 12 shows an implementation where the calculation unit 49 includes three Kalman filters 50; however, this number is merely an example. The calculation unit 49 may include two Kalman filters 50, or four or more Kalman filters 50.

The Kalman filters 50 (50_1, 50_2 and 50_3) use a kinematic model for the vehicle 100, described below. Similar to FIG. 4, in FIG. 12, the Kalman filters 50 (50_1, 50_2 and 50_3) each include a system equation calculation unit 51, an observation equation calculation unit 52, a subtractor 53, an adder 54, an integrator 55, a Kalman gain calculation unit 56, a likelihood calculation unit 57, a low-pass filter 58, and an imaginary offset input unit 59.

The system equation that is an equation used for the calculation at the system equation calculation unit 51 includes the function f(x,u). The observation equation that is an equation used for the calculation at the observation equation calculation unit 52 includes the function h(x,u). The Kalman gain calculation unit 56 includes a seventh-degree Kalman gain K.

The imaginary offset input unit 59 provides, as an offset value for a predetermined one of the sensors of the group 5, a predetermined value for each of the Kalman filters 50 (50_1, 50_2 and 50_3) to the system equation calculation unit 51 and observation equation calculation unit 52. According to the present embodiment, the imaginary offset input unit 59 is configured to provide the offset value $b_x$ for the front-rear acceleration sensor 52 to the system equation calculation unit 51 and observation equation calculation unit 52. In this implementation, the front-rear acceleration sensor 25 corresponds to the "detection unit of interest", or in other words, in this example the front-rear acceleration sensor 25 is a detection unit associated with the offset error whose imaginary offset quantity is provided in each of the Kalman filters 50 (50_1, 50_2 and 50_3).

In FIG. 12, the offset value for the front-rear acceleration sensor 25 provided by the imaginary offset input unit 59 of the Kalman filter 50_1 to the system equation calculation unit 51 and observation equation calculation unit 52 is denoted by $b_{x1}$. Similarly, the offset value for the front-rear acceleration sensor 25 provided by the imaginary offset input unit 59 of the Kalman filter 50_2 to the system equation calculation unit 51 and observation equation calculation unit 52 is denoted by $b_{x2}$. The offset value for the front-rear acceleration sensor 25 provided by the imaginary offset input unit 59 of the Kalman filter 50_3 to the system equation calculation unit 51 and observation equation calculation unit 52 is denoted by $b_{x3}$.

The likelihood calculation unit 57 determines a likelihood using calculation, the likelihood being indicative of the reliability of the result from the estimation by the Kalman filter 50 (50_1, 50_2 or 50_3). The low-pass filter 58 is a calculation unit for filtering the value calculated by the likelihood calculation unit 57. The low-pass filter 58 may be replaced by any other calculation unit that can implement the same functionality. It is optional whether the low-pass filter 58 is included. The calculation performed by the likelihood calculation unit 57 will be described further below.

The calculation units 51, 52, 53, 54, 55, 56, 57 and 58 constituting a Kalman filter 50 may be implemented by, for example, a program that has been prepared in advance being performed by the ECU 20. Alternatively, some or all of the calculation units 51, 52, 53, 54, 55, 56, 57 and 58 may be implemented by independent hardware mounted.

According to the present embodiment, in the current estimation operation, the following values are provided as the input parameter u of the function f(x,u) included in the system equation: the detected value of the roll angular velocity $\omega_{ro}$, the detected value of the roll angular acceleration (differential value of the roll angular velocity $\omega_{ro}$), the detected value of the yaw angular velocity $\omega_{ya}$, the yaw angular acceleration (differential value of the yaw angular velocity $\omega_{ya}$), the detected value of the pitch angular velocity $\omega_{pi}$, the detected value of the pitch angular acceleration (differential value of the pitch angular velocity $\omega_{pi}$) and the detected value of the front-rear acceleration $G_x$.

Further, the following values are provided as the input parameter x of the function f(x,u) included in the system equation: the estimated value of the roll angle $\varphi$, the estimated value of the pitch angle $\theta$, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$ from the previous estimation operation. Further, as discussed above, the offset value for the front-rear acceleration sensor 25 provided by the imaginary offset input unit 59 is provided as the input parameter u of the function f (x,u) included in the system equation.

The output from the system equation calculation unit 51 is the predicted differential value of the roll angle $\varphi$, the predicted differential value of the pitch angle $\theta$, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$.

The adder 54 adds the seventh-degree Kalman gain K obtained by the previous estimation operation to the predicted differential value of the roll angle $\varphi$, the predicted differential value of the pitch angle $\theta$, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$.

The predicted differential value of the roll angle $\varphi$, the predicted differential value of the pitch angle $\theta$, the predicted differential value of the vehicle velocity $V_x$, the predicted differential value of the roll angular velocity sensor offset $b_{ro}$, the predicted differential value of the yaw angular velocity sensor offset $b_{ya}$, the predicted differential value of the pitch angular velocity sensor offset $b_{pi}$, and the predicted differential value of the top-bottom acceleration sensor offset $b_z$ to which the Kalman gain K has been added are integrated by the integrator 55. This provides the estimated value of the roll angle $\varphi$, the estimated value of the pitch angle $\theta$, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$ from the current estimation operation.

The following values are provided as the input parameter x of the function h(x,u) included in the observation equation: the estimated value of the roll angle $\varphi$, the estimated value of the pitch angle $\theta$, the estimated value of the vehicle velocity $V_x$, the estimated value of the roll angular velocity sensor offset $b_{ro}$, the estimated value of the yaw angular velocity sensor offset $b_{ya}$, the estimated value of the pitch angular velocity sensor offset $b_{pi}$, and the estimated value of the top-bottom acceleration sensor offset $b_z$. Further, as discussed above, the offset value for front-rear acceleration sensor 25 provided by the imaginary offset input unit 59 is provided as the input parameter x of the function h(x,u) included in the observation equation.

The output from the observation equation calculation unit 52 is the calculated value of the top-bottom acceleration $G_z$, the calculated value of the left-right acceleration $G_y$, the calculated value of the rear-wheel velocity $v_r$, and the calculated value of the characteristic equation discussed below.

The Kalman filters 50 each receive, as the input parameter y, the detected value of the top-bottom acceleration $G_z$, the detected value of the left-right acceleration $G_y$, the detected value of the rear-wheel velocity $v_r$, and a constant that serves as the detected value of the characteristic equation. The Kalman gain calculation unit 56 calculates the Kalman gain K based on the difference between the detected values of the top-bottom acceleration $G_z$, left-right acceleration $G_y$, rear-wheel velocity $v_r$, and the detected value of the characteristic equation, and the calculated values. In the description further below, the detected value of the characteristic equation is zero; however, it is not limited to zero and may be any constant that does not change over time.

Finding this kinematic model's system equation f(x,u) and observation equation h(x,u) gives the relational expression for the input parameters u and y and the output parameter x.

<Finding of System Equation and Observation Equation>

The present embodiment supposes the following points to simplify the kinematic model.

(a) There is no rotational slide between the rear wheel 3 and road surface.

(b) The side-skid velocity of the rear wheel 3 is zero.

(c) The road surface is flat. "Flat" as used herein means a plane without irregularities, and may be inclined.

Based on suppositions (a) to (c), the kinematic model equation is found in the following manner. That is, it is different from the first embodiment in that the finding of the kinematic model does not incorporate supposition (d).

Based on Equation (7) provided above, the second-order differential vector of the vector ρ is determined by the equation provided below. It is different from Equation (8) in that the second-order differential vector of the vector ρ takes account of the pitch angular velocity $\omega_{pi}$ and its first-order differential value.

[Formula 32]

$$\ddot{p} = [e_b] \begin{bmatrix} a_x(\omega_{ro}, \omega_{ya}, \omega_{pi}, \dot{\omega}_{ro}, \dot{\omega}_{ya}, \dot{\omega}_{pi}, \phi, L, h, R_{cr}) \\ a_y(\omega_{ro}, \omega_{ya}, \omega_{pi}, \dot{\omega}_{ro}, \dot{\omega}_{ya}, \dot{\omega}_{pi}, \phi, L, h, R_{cr}) \\ a_z(\omega_{ro}, \omega_{ya}, \omega_{pi}, \dot{\omega}_{ro}, \dot{\omega}_{ya}, \dot{\omega}_{pi}, \phi, L, h, R_{cr}) \end{bmatrix} \quad (31)$$

In Equation (31), $a_x$, $a_y$ and $a_z$ are functions. The functions $a_x$, $a_y$ and $a_z$ may be determined by calculating Equations (6) and (7) provided above. Using Equation (1) to rearrange Equation (6) into Equation (7) removes the differential value of the roll angle φ, the differential value of the yaw angle ψ and the differential value of the pitch angle θ.

Next, the side-skid velocity of the vehicle 100 is denoted by $V_y$. The first-order differential vector of the positional vector $r_0$ in FIG. 7 is expressed by the equation below using the vehicle velocity $V_x$ and side-skid velocity $V_y$. As discussed above, the vector $e_b$ is the basis vector of the vehicle coordinate system. According to the present embodiment, the elevation/depression angle caused by the slope of the road surface 200 and the stroke of the suspension is also taken into consideration for estimation, and thus the velocity $V_z$ for the z-direction of the vehicle 100 is generated. That is, the first-order differential vector of the positional vector $r_0$ in FIG. 7 is expressed by the following equation using $V_x$, $V_y$ and $V_z$.

[Formula 33]

$$\dot{r}_0 = [e_b] \begin{bmatrix} V_x \\ V_y \\ V_z \end{bmatrix} \quad (32)$$

From Supposition (b), $V_y=0$; when Equation (32) is first-order differentiated, the second-order differential vector of the positional vector r is expressed by the equation provided below. The present embodiment is different from the first embodiment in that the pitching of the vehicle 100 is taken into consideration, and thus the equation is different from Equation (10) provided above.

[Formula 34]

$$\ddot{r}_0 = [e_b] \begin{bmatrix} \dot{V}_x + V_z \omega_{pi} \\ V_x \omega_{ya} - V_z \omega_{ro} \\ \dot{V}_z - V_x \omega_{pi} \end{bmatrix} \quad (33)$$

As discussed above, the elevation/depression angle ζ is the angle formed by the x-axis of the vehicle coordinate system $e_b$ and the x-axis of the road-surface coordinate system $e_r$. This definition gives the following equation.

[Formula 35]

$$V_z = V_x \tan \zeta \quad (34)$$

Thus, Equation (33) may be rewritten into the following equation, Equation (35).

[Formula 36]

$$\ddot{r}_0 = [e_b] \begin{bmatrix} \dot{V}_x + V_x \omega_{pi} \tan \zeta \\ V_x(\omega_{ya} - \omega_{ro} \tan \zeta) \\ \dot{V}_x \tan \zeta + V_x(\dot{\zeta} \sec^2 \zeta - \omega_{pi}) \end{bmatrix} \quad (35)$$

Next, the gravity acceleration vector may be expressed by the equation below. g in the right side of Equation (36) below indicates the magnitude of the gravity acceleration.

[Formula 37]

$$g = [e_b] \begin{bmatrix} -g \sin \theta \\ g \cos \theta \sin \phi \\ g \cos \theta \cos \phi \end{bmatrix} \quad (36)$$

Based on Equations (5), (31), (35) and (36), the acceleration vector G detected at the mounting position PS may be expressed by the following equation.

[Formula 38]

$$G = \ddot{r} + g =$$

$$\ddot{r}_0 + \ddot{p} + g = [e_b] \begin{bmatrix} \dot{V}_x + V_x \omega_{pi} \tan\zeta + \\ a_x(\omega_{ro}, \omega_{ya}, \omega_{pi}, \dot{\omega}_{ro}, \dot{\omega}_{ya}, \dot{\omega}_{pi}, \phi, L, h, R_{cr}) - \\ g \sin\theta \\ V_x(\omega_{ya} - \omega_{ro} \tan\zeta) + \\ a_y(\omega_{ro}, \omega_{ya}, \omega_{pi}, \dot{\omega}_{ro}, \dot{\omega}_{ya}, \dot{\omega}_{pi}, \phi, L, h, R_{cr}) + \\ g \cos\theta \sin\phi \\ \dot{V}_x \tan\zeta + V_x(\dot{\zeta} \sec^2\zeta - \omega_{pi}) + \\ a_z(\omega_{ro}, \omega_{ya}, \omega_{pi}, \dot{\omega}_{ro}, \dot{\omega}_{ya}, \dot{\omega}_{pi}, \phi, L, h, R_{cr}) + \\ g \cos\theta \cos\phi \end{bmatrix} \quad (37)$$

The acceleration vector G detected at the mounting position PS may be expressed by Equation (13) provided above using the front-rear acceleration $G_x$ detected by the front-rear acceleration sensor 25, the left-right acceleration $G_y$ detected by the left-right acceleration sensor 26, and the top-bottom acceleration $G_z$ detected by the top-bottom acceleration sensor 24. Thus, based on Equations (13) and (37), the front-rear acceleration $G_x$, left-right acceleration $G_y$ and top-bottom acceleration $G_z$ may be expressed by the following equation.

[Formula 39]

$$\begin{bmatrix} G_x \\ G_y \\ G_z \end{bmatrix} = \begin{bmatrix} \dot{V}_x + V_x \omega_{pi} \tan\zeta + \\ a_x(\omega_{ro}, \omega_{ya}, \omega_{pi}, \dot{\omega}_{ro}, \dot{\omega}_{ya}, \dot{\omega}_{pi}, \phi, L, h, R_{cr}) - \\ g \sin\theta \\ V_x(\omega_{ya} - \omega_{ro} \tan\zeta) + \\ a_y(\omega_{ro}, \omega_{ya}, \omega_{pi}, \dot{\omega}_{ro}, \dot{\omega}_{ya}, \dot{\omega}_{pi}, \phi, L, h, R_{cr}) + \\ g \cos\theta \sin\phi \\ \dot{V}_x \tan\zeta + V_x(\dot{\zeta} \sec^2\zeta - \omega_{pi}) + \\ a_z(\omega_{ro}, \omega_{ya}, \omega_{pi}, \dot{\omega}_{ro}, \dot{\omega}_{ya}, \dot{\omega}_{pi}, \phi, L, h, R_{cr}) + \\ g \cos\theta \cos\phi \end{bmatrix} \quad (38)$$

Next, the relationship between the rear-wheel velocity $v_r$ and vehicle velocity $V_x$ is determined. Supposition (a) means that there is no slide between the rear wheel 3 and road surface 200, and thus the relationship expressed by the following equation can be established between the rear-wheel velocity $v_r$ and vehicle velocity $V_x$.

[Formula 40]

$$\frac{V_x \sec\zeta}{R_e - R_{cr}(1 - \cos\phi)} = \frac{v_r}{R_e} \quad (39)$$

Equation (39) gives the following equation.

[Formula 41]

$$v_r = \frac{R_e \sec\zeta}{R_e - R_{cr}(1 - \cos\phi)} V_x = \frac{\sec\zeta}{1 - R_{cr}/R_e(1 - \cos\phi)} V_x \quad (40)$$

Equations (1), (38) and (40) give the following equation.

[Formula 42]

$$\frac{d}{dt}\begin{bmatrix} \phi \\ \theta \\ V_x \end{bmatrix} = \begin{bmatrix} \omega_{pi} \cos\phi - \omega_{ya} \sin\phi \\ \omega_{ro} + \omega_{pi} \tan\theta \sin\phi + \omega_{ya} \tan\theta \cos\phi \\ G_x - V_x \omega_{pi} \tan\zeta - \\ a_x(\omega_{ro}, \omega_{ya}, \omega_{pi}, \dot{\omega}_{ro}, \dot{\omega}_{ya}, \dot{\omega}_{pi}, \phi, L, h, R_{cr}) + g \sin\theta \end{bmatrix} \quad (41)$$

As shown in FIG. 7, the vector from the mounting position PS for the group of sensors 5 to the gravity point MP of the main body of the vehicle body 1 is denoted by W. The gravity point MP does not take account of the weight of those portions of the vehicle body 1 that are located below the spring. The weight of the portions of the vehicle body 1 that are located below the spring are the total weight of those parts of the vehicle body 1 that are closer to the road surface than the suspension as determined along the routes of transfer of forces from the road surface. The parts closer to the road surface than the suspension include, for example, the tires 2 and 3, the wheels, the brakes etc. The vector W is expressed by the following equation.

[Formula 43]

$$W = [e_b] \begin{bmatrix} W_x \\ W_y \\ W_z \end{bmatrix} \quad (42)$$

Since the weight of the vehicle body 1 is generally distributed symmetrically with respect to the vertical centerline, $W_y = 0$. If the mass of the main body of the vehicle body 1 is denoted by M and the inertia moment tensor is denoted by I, the angular momentum vector L of the vehicle 100 as viewed from the reference point O is calculated in the manner described below. In the following vector calculation equation, "●" means an inner product and "×" means an outer product.

[Formula 44]

$$L = M(r+W) \times \frac{d}{dt}(r+W) + I \cdot \omega \quad (43)$$
$$= M(r+W) \times \left(\frac{d}{dt}r + \frac{d}{dt}W\right) + I \cdot \omega$$

In Equation (43), the angular velocity vector ω and tensor I are defined by the following equations.

[Formula 45]

$$\omega = [e_b] \begin{bmatrix} \omega_{ro} \\ \omega_{pi} \\ \omega_{ya} \end{bmatrix} \quad (44)$$

[Formula 46]

$$I = I_{xx}(e_{bx} \otimes e_{bx}) + I_{xy}(e_{bx} \otimes e_{by}) + I_{xz}(e_{bx} \otimes e_{bz}) \quad (45)$$
$$I_{xy}(e_{by} \otimes e_{bx}) + I_{yy}(e_{by} \otimes e_{by}) + I_{yz}(e_{by} \otimes e_{bz})$$
$$I_{xz}(e_{bz} \otimes e_{bx}) + I_{yz}(e_{bz} \otimes e_{by}) + I_{zz}(e_{bz} \otimes e_{bz})$$

In Equation (45), an operator with a circle including a cross means a "tensor product".

Temporally differentiating both sides of Equation (43) gives the following equation.

[Formula 47]

$$\dot{L} = M(\dot{r} + \dot{W}) \times (\dot{r} + \dot{W}) + M(r + W) \times (\ddot{r} + \ddot{W}) + I \cdot \dot{\omega} \quad (46)$$
$$= M(r + W) \times (\ddot{r} + \ddot{W}) + I \cdot \dot{\omega}$$
$$= M(r_0 + \rho + W) \times (\ddot{r}_0 + \ddot{\rho} + \ddot{W}) + I \cdot \dot{\omega}$$
$$= r_0 \times M(\ddot{r}_0 + \ddot{\rho} + \ddot{W}) + M(\rho + W) \times (\ddot{r}_0 + \ddot{\rho} + \ddot{W}) + I \cdot \dot{\omega}$$

If it is rearranged in a manner similar to that for the rearrangement of Equation (7) into Equation (31), the second-order differential vector of the vector W and the inner product of the tensor I and angular acceleration vector ω dot (first-order differential vector of the angular velocity vector ω) are expressed by the following equations.

[Formula 48]

$$\ddot{W} = [e_b] \begin{bmatrix} w_x(\omega_{ro}, \omega_{ya}, \omega_{pi}, \dot{\omega}_{ro}, \dot{\omega}_{ya}, \dot{\omega}_{pi}, W_x, W_z) \\ w_y(\omega_{ro}, \omega_{ya}, \omega_{pi}, \dot{\omega}_{ro}, \dot{\omega}_{ya}, \dot{\omega}_{pi}, W_x, W_z) \\ w_z(\omega_{ro}, \omega_{ya}, \omega_{pi}, \dot{\omega}_{ro}, \dot{\omega}_{ya}, \dot{\omega}_{pi}, W_x, W_z) \end{bmatrix} \quad (47)$$

[Formula 49]

$$I \cdot \dot{\omega} = [e_b] \begin{bmatrix} q_x(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \\ q_y(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \\ q_z(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) \end{bmatrix} \quad (48)$$

$w_x$, $w_y$, and $w_z$ in Equation (47) and $q_x$, $q_y$, and $q_z$ in Equation (48) are functions. These functions may be calculated by a rearrangement similar to the rearrangement of Equation (7) to Equation (31).

Figure 13:
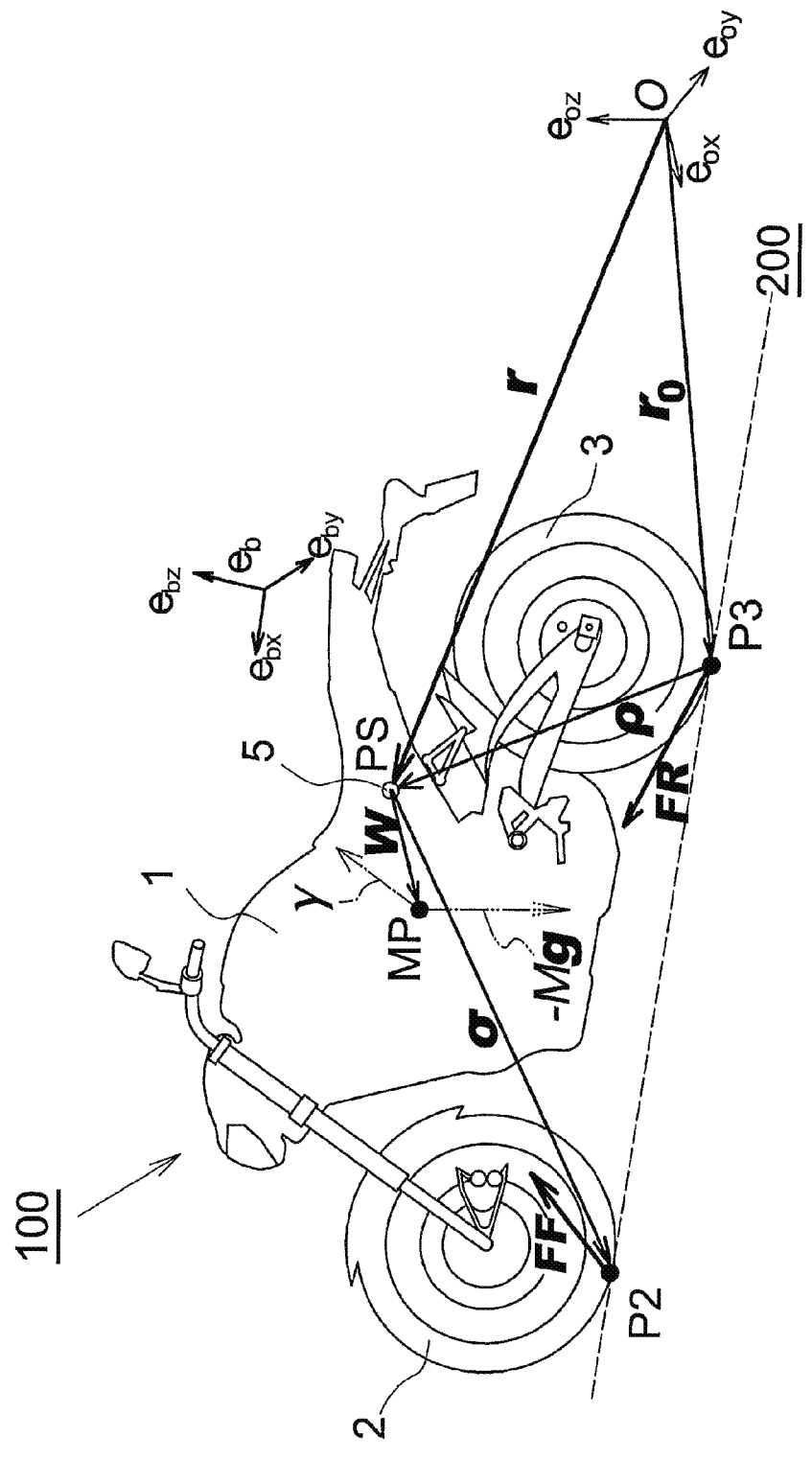
FIG. 13 illustrates the vectors of forces acting on the road-surface grounding points for the front and rear wheels.

Next, the moments of forces acting on the vehicle 100 as viewed from the reference point O are calculated. FIG. 13 shows the vectors of forces acting on the road-surface grounding points of the front and rear wheels in a manner similar to that of FIG. 7. As shown in FIG. 13, forces acting on the vehicle 100 include the gravity vector −Mg, the aerodynamic vector γ composed of the air resistance, lift force etc., the force vector FF acting on the road-surface grounding point P2 for the front wheel 2, and the force vector FR acting on the road-surface grounding point P3 for the rear wheel 3. The force vector FF acting on the road-surface grounding point P2 for the front wheel 2 and the force vector FR acting on the road-surface grounding point P3 for the rear wheel 3 are expressed by the following equations.

[Formula 50]

$$FF = [e_b] \begin{bmatrix} FF_x \\ FF_y \\ FF_z \end{bmatrix} \quad FR = [e_b] \begin{bmatrix} FR_x \\ FR_y \\ FR_z \end{bmatrix} \quad (49)$$

The force of gravity and the aerodynamic force act on the gravity point MP of the vehicle 100. The aerodynamic vector γ is expressed by the following equation.

[Formula 51]

$$\gamma = [e_b] \begin{bmatrix} \gamma_x \\ \gamma_y \\ \gamma_z \end{bmatrix} \quad (50)$$

The aerodynamic force depends on the velocity V and angular velocity ω of the vehicle 100, and thus may be expressed by the following equation.

[Formula 52]

$$\begin{bmatrix} \gamma_x \\ \gamma_y \\ \gamma_z \end{bmatrix} = \begin{bmatrix} \gamma_x(V_x, V_y, V_z, \omega_{ro}, \omega_{ya}, \omega_{pi}) \\ \gamma_y(V_x, V_y, V_z, \omega_{ro}, \omega_{ya}, \omega_{pi}) \\ \gamma_z(V_x, V_y, V_z, \omega_{ro}, \omega_{ya}, \omega_{pi}) \end{bmatrix} = \begin{bmatrix} \gamma_x(\omega_{ro}, \omega_{ya}, \omega_{pi}, \zeta, V_x) \\ \gamma_y(\omega_{ro}, \omega_{ya}, \omega_{pi}, \zeta, V_x) \\ \gamma_z(\omega_{ro}, \omega_{ya}, \omega_{pi}, \zeta, V_x) \end{bmatrix} \quad (51)$$

In Equation (51), the rearrangement is done using $V_y = 0$, which is based on Supposition (b), and Equation (34).

As shown in FIG. 13, if the vector from the mounting position PS for the group of sensors 5 to the road-surface grounding point P2 for the front wheel 2 is denoted by σ, the vector σ is expressed by the equation provided below. In the following equation, the horizontal distance from the mounting position PS to the center of the front wheel 2 is denoted by L'.

[Formula 53]

$$\sigma = [e_b] \begin{bmatrix} L' \\ -R_{cr} \sin\phi \\ -h + R_{cr}(1 - \cos\phi) \end{bmatrix} \quad (52)$$

The moment vector N of the force acting on the vehicle 100 as viewed from the reference point O is expressed by the following equation.

[Formula 54]

$$N = (r + W) \times (-Mg + \gamma) + (\gamma + \sigma) \times FF + r_0 \times FR \quad (53)$$
$$= (r_0 + \rho + W) \times (-Mg + \gamma) + (r_0 + \rho + W) \times FF + r_0 \times FR$$
$$= r_0 \times (-Mg + \gamma + FF + FR) + (\rho + W) \times (-Mg + \gamma) + (\rho + \sigma) \times FF$$

The quantity of the first-order differential of the angular momentum vector L of the vehicle 100 as viewed from the reference point O is the same as the moment vector N of the force acting on the vehicle 100 as viewed from the reference point O. That is, the following equation is established.

[Formula 55]

$$\dot{L} \equiv \frac{dL}{dt} = N \quad (54)$$

Equation (54) should be true regardless of where the reference point is located. That is, Equation (54) should be true for any positional vector r. Thus, if Equations (46) and (53) are identical equations, the following two equations are established.

[Formula 56]

$$M(\ddot{r}_0+\ddot{\rho}+\ddot{W})=-Mg+\gamma+FF+FR \quad (55)$$

[Formula 57]

$$M(\rho+W)\times(\ddot{r}_0+\ddot{\rho}+\ddot{W})+I\cdot\dot{\omega}=(\rho+W)\times(-Mg+\gamma)+(\rho+\sigma)\times FF \quad (56)$$

Equation (55) may be rearranged into Equation (57) below.

[Formula 58]

$$FF+FR=M(\ddot{r}_0+\ddot{\rho}+g+\ddot{W})-\gamma \quad (57)$$

Expressing Equation (57) using entries gives Equation (58) below.

[Formula 59]

$$FF+FR=M[e_b]\begin{bmatrix} \dot{V}_x + V_x\omega_{pi}\tan\zeta + \\ a_x(\omega_{ro}, \omega_{ya}, \omega_{pi}, \dot{\omega}_{ro}, \\ \dot{\omega}_{ya}, \dot{\omega}_{pi}, \phi, L, h, R_{cr}) - g\sin\theta \\ V_x(\omega_{ya} - \omega_{ro}\tan\zeta) + \\ a_y(\omega_{ro}, \omega_{ya}, \omega_{pi}, \dot{\omega}_{ro}, \\ \dot{\omega}_{ya}, \dot{\omega}_{pi}, \phi, L, h, R_{cr}) + g\cos\theta\sin\phi \\ \dot{V}_x\tan\zeta + V_x(\dot{\zeta}\sec^2\zeta - \omega_{pi}) + \\ a_z(\omega_{ro}, \omega_{ya}, \omega_{pi}, \dot{\omega}_{ro}, \\ \dot{\omega}_{ya}, \dot{\omega}_{pi}, \phi, L, h, R_{cr}) + g\cos\theta\cos\phi \end{bmatrix}$$

$$+ [e_b]\begin{bmatrix} Mw_x(\omega_{ro}, \omega_{ya}, \omega_{pi}, \dot{\omega}_{ro}, \dot{\omega}_{ya}, \dot{\omega}_{pi}, W_x, W_z) \\ Mw_y(\omega_{ro}, \omega_{ya}, \omega_{pi}, \dot{\omega}_{ro}, \dot{\omega}_{ya}, \dot{\omega}_{pi}, W_x, W_z) \\ Mw_z(\omega_{ro}, \omega_{ya}, \omega_{pi}, \dot{\omega}_{ro}, \dot{\omega}_{ya}, \dot{\omega}_{pi}, W_x, W_z) \end{bmatrix} -$$

$$[e_b]\begin{bmatrix} \gamma_x(\omega_{ro}, \omega_{ya}, \omega_{pi}, \zeta, V_x) \\ \gamma_y(\omega_{ro}, \omega_{ya}, \omega_{pi}, \zeta, V_x) \\ \gamma_z(\omega_{ro}, \omega_{ya}, \omega_{pi}, \zeta, V_x) \end{bmatrix} \quad (58)$$

Based on the relational expression for the first entry of Equation (38) provided above, the following equation may be found.

[Formula 60]

$$\dot{V}_x = A_x(\omega_{ro}, \omega_{ya}, \omega_{pi}, \dot{\omega}_{ro}, \dot{\omega}_{ya}, \dot{\omega}_{pi}, G_x, \theta, \phi, V_x, \zeta, L, h, R_{cr}, g) \quad (50)$$

Using Equation (59), Equation (58) may be rewritten into the following equation.

[Formula 61]

$$FF+FR=[e_b]\begin{bmatrix} F_x(\omega_{ro}, \omega_{ya}, \omega_{pi}, \dot{\omega}_{ro}, \dot{\omega}_{ya}, \dot{\omega}_{pi}, \\ G_x, \zeta, \theta, \phi, V_x, L, h, R_{cr}, g, W_x, W_z) \\ F_y(\omega_{ro}, \omega_{ya}, \omega_{pi}, \dot{\omega}_{ro}, \dot{\omega}_{ya}, \dot{\omega}_{pi}, \\ \zeta, \theta, \phi, V_x, L, h, R_{cr}, g, W_x, W_z) \\ F_z(\omega_{ro}, \omega_{ya}, \omega_{pi}, \dot{\omega}_{ro}, \dot{\omega}_{ya}, \dot{\omega}_{pi}, G_x, \\ \zeta, \dot{\zeta}, \theta, \phi, V_x, L, h, R_{cr}, g, W_x, W_z) \end{bmatrix} \quad (60)$$

Using Equation (55), Equation (56) may be rearranged into the following equation.

[Formula 62]

$$I\cdot\dot{\omega} = -(\rho+W)\times(FF+FR)+(\rho+\sigma)\times FF \quad (61)$$
$$= (\sigma - W)\times FF - (\rho+W)\times FR$$

$$\sigma - W = [e_b]\begin{bmatrix} L' - W_x \\ -R_{cr}\sin\phi \\ -h + R_{cr}(1-\cos\phi) - W_z \end{bmatrix} \quad (62)$$

$$-(\rho+W) = [e_b]\begin{bmatrix} -L - W_x \\ -R_{cr}\sin\phi \\ -h + R_{cr}(1-\cos\phi) - W_z \end{bmatrix} \quad (63)$$

Expressing Equation (61) using entries gives the following equation, Equation (64).

[Formula 63]

$$I\cdot\dot{\omega} = [e_b]\begin{bmatrix} -(FF_y+FR_y)\{R_{cr}(1-\cos\phi) - h - W_z\} - \\ (FF_z+FR_z)R_{cr}\sin\phi \\ (FF_x+FR_x)\{R_{cr}(1-\cos\phi) - h - W_z\} + \\ (FF_z+FR_z)W_x - L'FF_z + LFR_z \\ (FF_x+FR_x)R_{cr}\sin\phi - \\ (FF_y+FR_y)W_x + L'FF_y - LFR_y \end{bmatrix} \quad (64)$$

Substituting the second and third entries of Equation (60) for the first entry of Equation (64) removes $FF_y$, $FR_y$, $FF_z$ and $FR_z$. That is, Equation (65) below is given.

[Formula 64]

$$q_x(\omega_{ro}, \omega_{ya}, \omega_{pi}, \dot{\omega}_{ro}, \dot{\omega}_{ya}, \dot{\omega}_{pi}, I_{xx}, I_{yy}, I_{zz}, I_{xz}) = \quad (65)$$
$$-F_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g, W_x, W_z)$$
$$\{R_{cr}(1-\cos\phi) - h - W_z\} - F_z(\omega_{ro}, \omega_{ya}, \omega_{pi}, \dot{\omega}_{ro}, \dot{\omega}_{ya},$$
$$\dot{\omega}_{pi}, G_x, \zeta, \dot{\zeta}, \theta, \phi, V_x, L, h, R_{cr}, g, W_x, W_z)R_{cr}\sin\phi$$

Equation (65) may be described by the following equation.

[Formula 65]

$$0 = Q_x(\omega_{ro}, \omega_{ya}, \omega_{pi}, \dot{\omega}_{ro}, \dot{\omega}_{ya}, \dot{\omega}pi, G_x, \zeta, \dot{\zeta}, \theta, \phi, V_x,$$
$$L, h, R_{cr}, g, W_x, W_z, I_{xx}, I_{yy}, I_{zz}, I_{xz}) \quad (66)$$

The factors of the function $Q_x$ of Equation (66) are all numbers that can be uniquely derived from the vehicle data, for example, except the values provided by the group of sensors 5 and the values estimated by the attitude estimation apparatus 10. That is, Equation (66) means that the function $Q_x$, indicating a constant, necessarily exists regardless of time. An equation satisfying this function "$Q_x$=constant" corresponds to the "characteristic equation".

Based on Equation (59), Equation (41) may be rewritten into the following equation.

[Formula 66]

$$\frac{d}{dt}\begin{bmatrix} \phi \\ \theta \\ V_x \end{bmatrix} = \begin{bmatrix} \dot{\theta}(\omega_{pi}, \omega_{ya}, \phi) \\ \dot{\phi}(\omega_{ro}, \omega_{pi}, \omega_{ya}, \theta, \phi) \\ A_x(\omega_{ro}, \omega_{ya}, \omega_{pi}, \dot{\omega}_{ro}, \dot{\omega}_{ya}, \dot{\omega}_{pi}, G_x, \theta, \phi, V_x, \zeta, L, h, R_{cr}, g) \end{bmatrix} \quad (67)$$

Further, from Equations (38), (40) and (66), the following equation may be derived.

[Formula 67]

$$\begin{bmatrix} G_y \\ G_z \\ v_r \\ 0 \end{bmatrix} = \begin{bmatrix} A_y(\omega_{ro}, \omega_{ya}, \omega_{pi}, \dot{\omega}_{ro}, \dot{\omega}_{ya}, \dot{\omega}_{pi}, \zeta, \theta, \phi, V_x, L, h, R_{cr}, g) \\ A_z(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, h, R_{cr}, g) \\ \frac{\sec\zeta}{1 - R_{cr}/R_e(1-\cos\phi)} V_x \\ Q_x(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \\ \theta, \phi, V_x, L, h, R_{cr}, g, W_x, W_z, I_{xx}, I_{yy}, I_{zz}, I_{xz}) \end{bmatrix} \quad (68)$$

Each of the Kalman filters 50 (50_1, 50_2 and 50_3), at the system equation calculation unit 51, uses Equation (67) as the system equation to perform calculation, and, at the observation equation calculation unit 52, uses Equation (68) as the observation equation to perform calculation.

Even if the roll angular velocity offset $b_{ro}$, yaw angular velocity offset $b_{ya}$, pitch angular velocity offset $b_{pi}$ and top-bottom acceleration offset $b_z$ vary, such variances are small compared with movements of the vehicle 100. Thus, the differential value of the roll angular velocity offset $b_{ro}$, the differential value of the yaw angular velocity offset $b_{ya}$, the differential value of the pitch angular velocity offset $b_{pi}$, and the differential value of the top-bottom acceleration offset $b_z$ can be considered to be zero.

Further, replacing some values in Equations (67) and (68) with values reflecting offset errors gives the following equations.

[Formula 68]

$$\frac{d}{dt}\begin{bmatrix} \phi \\ \theta \\ V_x \\ b_{ro} \\ b_{pi} \\ b_{ya} \\ b_z \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \\ \dot{\omega}_{ya}, \dot{\omega}_{pi}, G_x, \theta, \phi, V_x, \zeta, L, h, R_{cr}, g) \\ 0 \\ 0 \\ 0 \\ 0 \end{bmatrix} \quad (69)$$

[Formula 69]

$$\begin{bmatrix} G_y \\ G_z \\ v_r \\ 0 \end{bmatrix} = \begin{bmatrix} A_y(\omega_{ro} - b_{ro}, \omega_{ya} - b_{ya}, \omega_{pi} - b_{pi}, \\ \dot{\omega}_{ro}, \dot{\omega}_{ya}, \dot{\omega}_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \dot{\omega}_{ro}, \dot{\omega}_{ya}, \\ \dot{\omega}_{pi}, G_x, \zeta, \dot{\zeta}, \theta, \phi, V_x, L, h, R_{cr}, g) + b_z \\ \frac{\sec\zeta}{1 - R_{cr}/R_e(1-\cos\phi)} V_x \\ Q_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x, \zeta, \dot{\zeta}, \\ \theta, \phi, V_x, L, h, R_{cr}, g, W_x, W_z, I_{xx}, I_{yy}, I_{zz}, I_{xz}) \end{bmatrix} \quad (70)$$

According to the present embodiment, as discussed above with reference to FIG. 12, the system equation calculation unit 51 and observation equation calculation unit 52 of each of the Kalman filters 50 (50_1, 50_2 and 50_3) receive the front-rear acceleration sensor offset $b_x(b_{x1}, b_{x2}, b_{x3})$ from the imaginary offset input unit 59. That is, the system equation calculation unit 51 according to the present embodiment performs calculation using Equation (69a) provided below, instead of Equation (69), as the system equation, and the observation equation calculation unit 52 performs calculation using Equation (70a) provided below, instead of Equation (70), as the observation equation.

[Formula 70]

$$\frac{d}{dt}\begin{bmatrix} \phi \\ \theta \\ V_x \\ b_{ro} \\ b_{pi} \\ b_{ya} \\ b_z \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \dot{\omega}_{ro}, \\ \dot{\omega}_{ya}, \dot{\omega}_{pi}, G_x - b_x, \theta, \phi, V_x, \zeta, L, h, R_{cr}, g) \\ 0 \\ 0 \\ 0 \\ 0 \end{bmatrix} \quad (69a)$$

[Formula 71]

$$\begin{bmatrix} G_y \\ G_z \\ v_r \\ 0 \end{bmatrix} = \begin{bmatrix} A_y(\omega_{ro} - b_{ro}, \omega_{ya} - b_{ya}, \omega_{pi} - b_{pi}, \\ \dot{\omega}_{ro}, \dot{\omega}_{ya}, \dot{\omega}_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \dot{\omega}_{ro}, \dot{\omega}_{ya}, \\ \dot{\omega}_{pi}, G_x - b_x, \zeta, \dot{\zeta}, \theta, \phi, V_x, L, h, R_{cr}, g) + b_z \\ \frac{\sec\zeta}{1 - R_{cr}/R_e(1-\cos\phi)} V_x \\ Q_x(\omega_{ro} - b_{ro}, \omega_{ya} - b_{ya}, \omega_{pi} - b_{pi}, \dot{\omega}_{ro}, \dot{\omega}_{ya}, \dot{\omega}_{pi}, G_x - b_x, \zeta, \dot{\zeta}, \\ \theta, \phi, V_x, L, h, R_{cr}, g, W_x, W_z, I_{xx}, I_{yy}, I_{zz}, I_{xz}) \end{bmatrix} \quad (70a)$$

That is, each of the Kalman filters 50 according to the present embodiment, at the system equation calculation unit 51, uses Equation (69a) as the system equation to perform calculation, and, at the observation equation calculation unit 52, uses Equation (70a) as the observation equation to perform calculation.

The value of $b_x$ in Equations (69a) and (70a) is the value of the front-rear acceleration sensor offset $b_x(b_{x1}, b_{x2}, b_{x3})$ provided by the imaginary offset input unit 59 of each of the Kalman filters 50 (50_1, 50_2 and 50_3).

Based on the system equation including the front-rear acceleration sensor offset $b_x(b_{x1}, b_{x2}, b_{x3})$ provided by the imaginary offset input unit 59, the system equation calculation unit 51 calculates the estimated values of the roll angle, pitch angle θ, vehicle velocity $V_x$, roll angular velocity sensor offset $b_{ro}$, yaw angular velocity sensor offset $b_{ya}$, pitch angular velocity sensor offset $b_{pi}$, and top-bottom acceleration sensor offset $b_z$. Similarly, based on the observation equation including the front-rear acceleration sensor offset $b_x(b_{x1}, b_{x2}, b_{x3})$ provided by the imaginary offset input unit 59, and using also the estimation results from the system equation calculation unit 51, the observation equation calculation unit 52 calculates the estimated values of the top-bottom acceleration $G_z$, left-right acceleration $G_y$, and rear-wheel velocity $v_r$. These estimated values are provided to the likelihood calculation unit 57 to calculate the value relating to the likelihood indicative of the reliability of the estimation results of the Kalman filters 50 (50_1, 50_2 and 50_3).

Preferably, the largest one of the values of the front-rear acceleration sensor offset $b_x(b_{x1}, b_{x2}, b_{x3})$ provided by the imaginary offset input unit 59 is larger than the maximum value of the zero-point offset that can be provided by the front-rear acceleration sensor 25, and the smallest value is smaller than the minimum value of the zero-point offset that can be provided by the front-rear acceleration sensor 25.

Thus, the observation equation calculation unit 52 can calculate the estimated values of the top-bottom acceleration $G_z$, left-right acceleration $G_y$ and rear-wheel velocity $v_r$ taking account of situations where the value of the zero-point offset of the front-rear acceleration sensor 25 is the largest.

As discussed above, the above-described embodiment describes an implementation where the calculation unit 49 includes three Kalman filters 50 (50_1, 50_2 and 50_3); alternatively, the value of the front-rear acceleration sensor offset $b_x$ may be set in a similar way if the calculation unit 49 includes two Kalman filters 50 or four or more Kalman filters 50.

Next, the likelihood λ calculated by the likelihood calculation unit 57 will be described. If the detection error in the top-bottom acceleration $G_z$ detected by the top-bottom acceleration sensor 24 is denoted by $\delta G_z$, the detection error in the left-right acceleration $G_y$ detected by the left-right acceleration sensor 26 is denoted by $\delta G_y$, the detection error in the rear-wheel velocity $v_r$ detected by the rear-wheel velocity sensor 7 is denoted by $\delta v_r$, and the model equation error in the rotational-motion equation about the roll axis is denoted by $\delta Q_x$, then, the variance-covariance matrix R of these detection errors can be expressed by the equation below. As discussed above, the motion-equation model is created by supposing the weight of the rider and treating the rider as a rigid body, and this causes errors derived from these suppositions. This error is represented by $\delta Q_x$.

[Formula 72]

$$R = \begin{bmatrix} E(\delta G_y \delta G_y) & E(\delta G_y \delta G_z) & E(\delta G_y \delta v_r) & E(\delta G_y \delta Q_x) \\ E(\delta G_z \delta G_y) & E(\delta G_z \delta G_z) & E(\delta G_z \delta v_r) & E(\delta G_z \delta Q_x) \\ E(\delta v_r \delta G_y) & E(\delta v_r \delta G_z) & E(\delta v_r \delta v_r) & E(\delta v_r \delta Q_x) \\ E(\delta Q_x \delta G_y) & E(\delta Q_x \delta G_z) & E(\delta Q_x \delta v_r) & E(\delta Q_x \delta Q_x) \end{bmatrix} \quad (72)$$

Further, if the estimation error in the roll angle φ is denoted by δφ, the estimation error in the pitch angle θ is denoted by δθ, the estimation error in the vehicle velocity $V_x$ is denoted by $\delta V_x$, the estimation error in the roll angular velocity sensor offset $b_{ro}$ is denoted by $\delta b_{ro}$, the estimation error in the yaw angular velocity sensor offset $b_{ya}$ is denoted by $\delta b_{ya}$, the estimation error in the pitch angular velocity sensor offset $b_{pi}$ is denoted by $\delta b_{pi}$, and the estimation error in the top-bottom acceleration sensor offset $b_z$ is denoted by $\delta b_z$, then, the variance-covariance matrix P of these detection errors can be expressed by the following equation.

[Formula 73]

$$P = \begin{bmatrix} E(\delta\phi\delta\phi) & E(\delta\phi\delta\theta) & E(\delta\phi\delta V_x) & E(\delta\phi\delta b_{ro}) & E(\delta\phi\delta b_{ya}) & E(\delta\phi\delta b_{pi}) & E(\delta\phi\delta b_z) \\ E(\delta\theta\delta\phi) & E(\delta\theta\delta\theta) & E(\delta\theta\delta V_x) & E(\delta\theta\delta b_{ro}) & E(\delta\theta\delta b_{ya}) & E(\delta\theta\delta b_{pi}) & E(\delta\theta\delta b_z) \\ E(\delta V_x\delta\phi) & E(\delta V_x\delta\theta) & E(\delta V_x\delta V_x) & E(\delta V_x\delta b_{ro}) & E(\delta V_x\delta b_{ya}) & E(\delta V_x\delta b_{pi}) & E(\delta V_x\delta b_z) \\ E(\delta b_{ro}\delta\phi) & E(\delta b_{ro}\delta\theta) & E(\delta b_{ro}\delta V_x) & E(\delta b_{ro}\delta b_{ro}) & E(\delta b_{ro}\delta b_{ya}) & E(\delta b_{ro}\delta b_{pi}) & E(\delta b_{ro}\delta b_z) \\ E(\delta b_{ya}\delta\phi) & E(\delta b_{ya}\delta\theta) & E(\delta b_{ya}\delta V_x) & E(\delta b_{ya}\delta b_{ro}) & E(\delta b_{ya}\delta b_{ya}) & E(\delta b_{ya}\delta b_{pi}) & E(\delta b_{ya}\delta b_z) \\ E(\delta b_{pi}\delta\phi) & E(\delta b_{pi}\delta\theta) & E(\delta b_{pi}\delta V_x) & E(\delta b_{pi}\delta b_{ro}) & E(\delta b_{pi}\delta b_{ya}) & E(\delta b_{pi}\delta b_{pi}) & E(\delta b_{pi}\delta b_z) \\ E(\delta b_z\delta\phi) & E(\delta b_z\delta\theta) & E(\delta b_z\delta V_x) & E(\delta b_z\delta b_{ro}) & E(\delta b_z\delta b_{ya}) & E(\delta b_z\delta b_{pi}) & E(\delta b_z\delta b_z) \end{bmatrix} \quad (73)$$

The Kalman filters 50 (50_1, 50_2 and 50_3) successively calculate the matrix P and matrix R.

The variance-covariance matrix S for the error contained in the observation/prediction error e is expressed by Equation (25) provided above. The following equation is the same as provided above.

[Formula 74]

$$S = R + HPH^t \quad (25)$$

In Equation (25), H is the Jacobian matrix of h(x), defined by the following equation.

[Formula 75]

$$H = \begin{bmatrix} \dfrac{\partial h(x)}{\partial \theta} & \dfrac{\partial h(x)}{\partial \phi} & \dfrac{\partial h(x)}{\partial V_x} & \dfrac{\partial h(x)}{\partial b_{ro}} & \dfrac{\partial h(x)}{\partial b_{ya}} & \dfrac{\partial h(x)}{\partial b_{pi}} & \dfrac{\partial h(x)}{\partial b_z} \end{bmatrix} \quad (74)$$

Based on the matrix H defined by Equation (74), the likelihood calculation unit 57 calculates the likelihood λ based on, for example, Equation (27), as in the first embodiment. Based on the likelihood λ provided by each of the Kalman filters 50 (50_1, 50_2 and 50_3), the state quantity determination unit 503 weights the value of the front-rear acceleration sensor offset $b_x$ to calculate the estimated value of the front-rear acceleration sensor offset $b_x$. Based on the same reasoning, $x(\varphi, \theta, V_x, b_{ro}, b_{ya}, b_z)$ estimated by each Kalman filter 50 is weighted depending on the likelihood $\lambda(\lambda_1, \lambda_2, \lambda_3)$, which indicates how reliable the estimation results of the Kalman filters 50 (50_1, 50_2 and 50_3) are, thereby providing the estimation results taking account of the front-rear acceleration sensor offset $b_x$.

<Configuration of Load Estimation Unit>

Based on the results of the calculation at the calculation unit 49, the load estimation unit 60 performs processing to estimate the load applied to at least one of the front wheel 2 and rear wheel 3 of the vehicle 100. Substituting the entries of Equation (60) for the second and third entries of Equation (64) gives the following equation.

[Formula 76]

$$L'FF_y - LFR_y = E_y(\omega_{ro}, \omega_{ya}, \omega_{pi}, \dot{\omega}_{ro}, \dot{\omega}_{ya}, \dot{\omega}_{pi}, G_x, \zeta, \theta, \phi, V_x, L, h, R_{cr}, g, W_x, W_z, I_{xx}, I_{yy}, I_{zz}, I_{xz}) \quad (75)$$

$$L'FF_z - LFR_z = E_z(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, h, R_{cr}, g, W_x, W_z, I_{xx}, I_{yy}, I_{zz}, I_{xz}) \quad (76)$$

According to the present embodiment, the vehicle 100 is a motorcycle, and thus $L+L' \neq 0$. Then, based on the second and third entries of Equation (60) and Equations (75) and (76), a solution may be reached for $FF_y$, $FR_y$, $FF_z$ and $FR_z$. The force $FF_z$ of the front wheel 2 in the z-direction and the force $FR_z$ of the rear wheel 3 in the z-direction are calculated by the equations provided below. In the following equations, $J_F$ and $J_R$ are functions.

[Formula 77]

$$FF_z = J_F(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}) \quad (77)$$

$$FR_z = J_R(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi, V_x, L, L', h, R_{cr}, g, W_x, W_z, I_{xx}, I_{yy}, I_{zz}, I_{xz}) \quad (78)$$

The load estimation unit 60 performs the calculation described above based on the result of the calculation at the calculation unit 49 to calculate the force FP acting on the front wheel 2 and the force FR acting on the rear wheel 3.

<Configuration of Suspension Stroke Quantity Estimation Unit>

The suspension stroke quantity estimation unit 70 performs calculation based on the estimation results from the load estimation unit 60 to estimate the stroke quantity of the suspension provided on at least one of the front wheel 2 and rear wheel 3.

If the caster angle is denoted by $\varepsilon_F$, the force $F_f$ acting on the front fork 16 is calculated by $FF_z \cos \varepsilon_F - FF_x \sin \varepsilon_F$. The caster angle is the angle formed by the direction extending vertically upward from the grounding point P2 of the front wheel 3 and the front fork 16.

Figure 14:
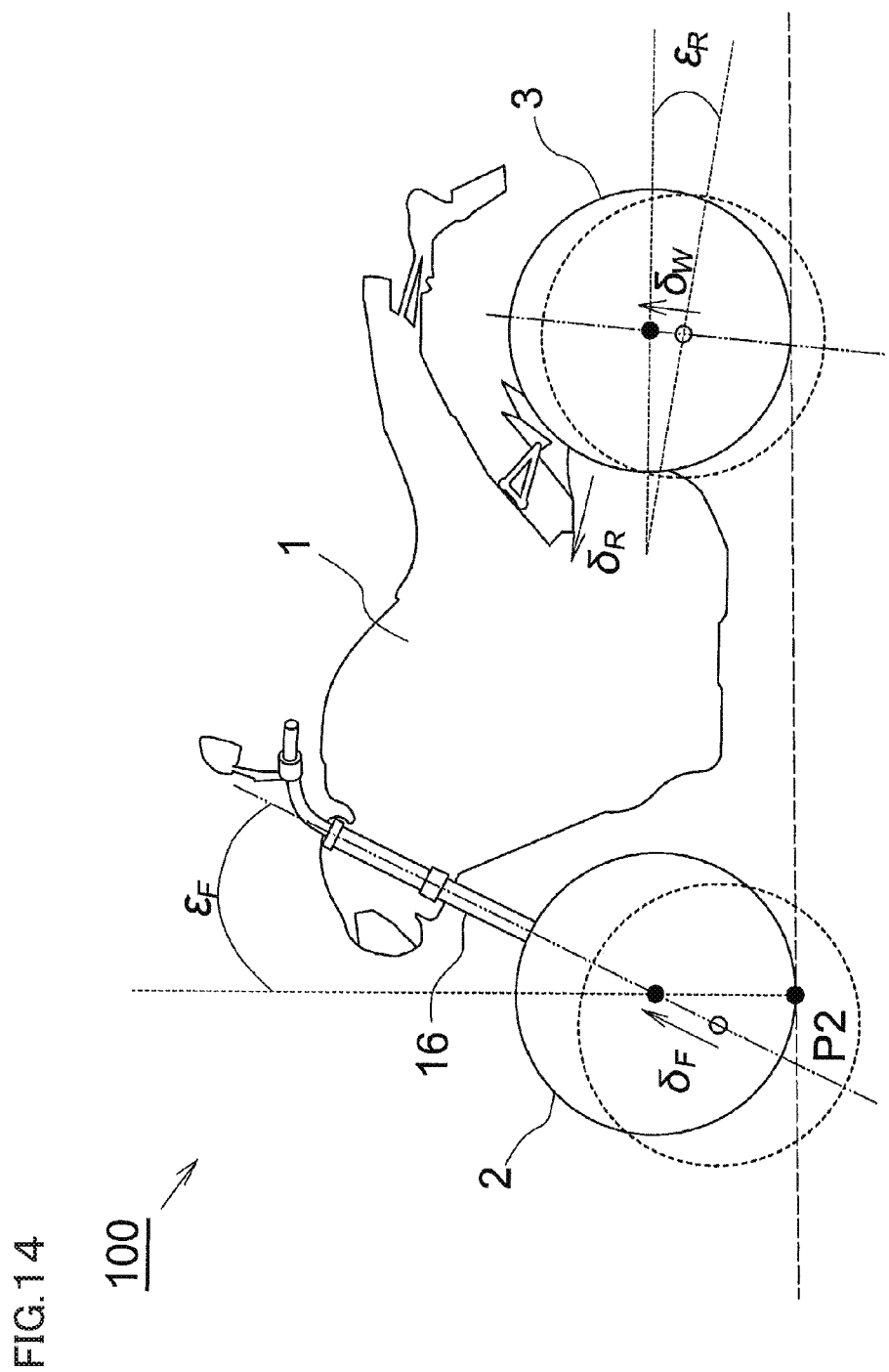
FIG. 14 illustrates the caster angle and the rear arm angle.

The stroke quantity of the shock absorber of the rear suspension is denoted by $\delta_R$, and the displacement of the center of the rear wheel 3 is denoted by $\delta_W$. The hang angle of the rear arm relative to the horizontal direction found when the stroke quantity of the shock absorber of the rear suspension is $\delta_R$ is denoted by $\varepsilon_R(\delta_R)$. The caster angle $\varepsilon_F$ and the rear arm angle $\varepsilon_R(\delta_W)$ are shown in FIG. 14.

Then, the force $F_1$ acting on the suspension is expressed by the following equation.

[Formula 78]

$$F_1 = (FR_z \cos \epsilon_R - FR_x \sin \epsilon_R) \frac{d\delta_W}{d\delta_R} \quad (79)$$
$$\equiv (FR_z \cos \epsilon_R - FR_x \sin \epsilon_R) \kappa(\delta_R)$$

Figure 15:
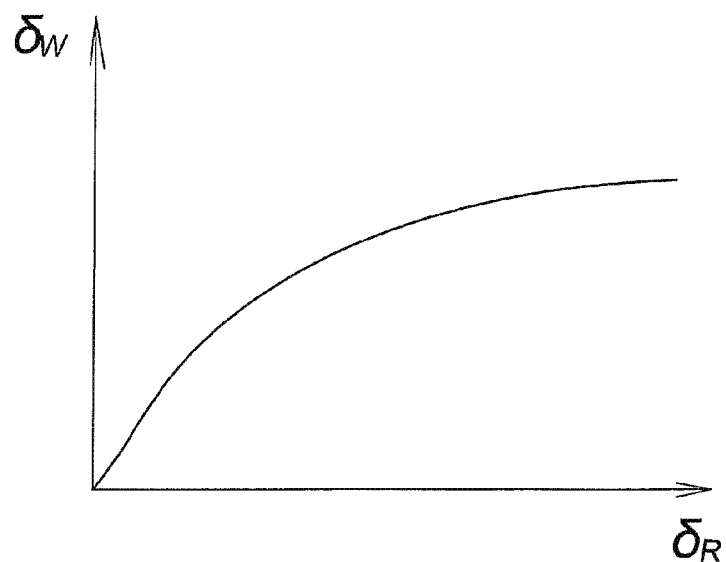
FIG. 15 is a graph illustrating an exemplary relationship between $\delta_R$ and $\delta_W$.

In Equation (79), κ is data called lever ratio which may be calculated from design drawings. FIG. 15 shows an example of the relationship between $\delta_R$ and $\delta_W$.

The suspension stroke quantity estimation unit 70 performs the following estimation processing.

[Formula 79]

For FFx+FRx≥0 (during acceleration)

$$FF_x \rightarrow FF'_x = 0$$

$$FR_x \rightarrow FR'_x = FF_x + FR_x \quad (80)$$

For FFx+FRx<0 (during deceleration)

$$FF_x \rightarrow FF'_x = \frac{FF_z}{FF_z + FR_z}(FF_x + FR_x) \quad (81)$$

$$FR_x \rightarrow FR'_x = \frac{FR_z}{FF_z + FR_z}(FF_x + FR_x)$$

Then, the force $F_f$ acting on the front fork and the force $F_1$ acting on the suspension may be calculated by the following Equations (82) and (83).

[Formula 80]

$$F_f = FF_z \cos \epsilon_F - FF'_x \sin \epsilon_F = D_F(\omega_{ro}, \omega_{ya}, \omega_{pi}, \dot{\omega}_{ro}, \dot{\omega}_{ya}, \dot{\omega}_{pi}, G_x, \quad (82)$$
$$\zeta, \dot{\zeta}, \theta, \phi, V_x, L, L', h, R_{cr}, g, W_x, W_z, I_{xx}, I_{yy}, I_{zz}, I_{xz}, \epsilon_F)$$

$$F_1 = (FR_z \cos \epsilon_R - FR'_x \sin \epsilon_R) \kappa(\delta_R) = \quad (83)$$
$$D_R(\omega_{ro}, \omega_{ya}, \omega_{pi}, \dot{\omega}_{ro}, \dot{\omega}_{ya}, \dot{\omega}_{pi}, G_x, \zeta, \dot{\zeta}, \theta, \phi,$$
$$V_x, L, L', h, R_{cr}, g, W_x, W_z, I_{xx}, I_{yy}, I_{zz}, I_{xz}, \epsilon_R)$$

Figure 16:
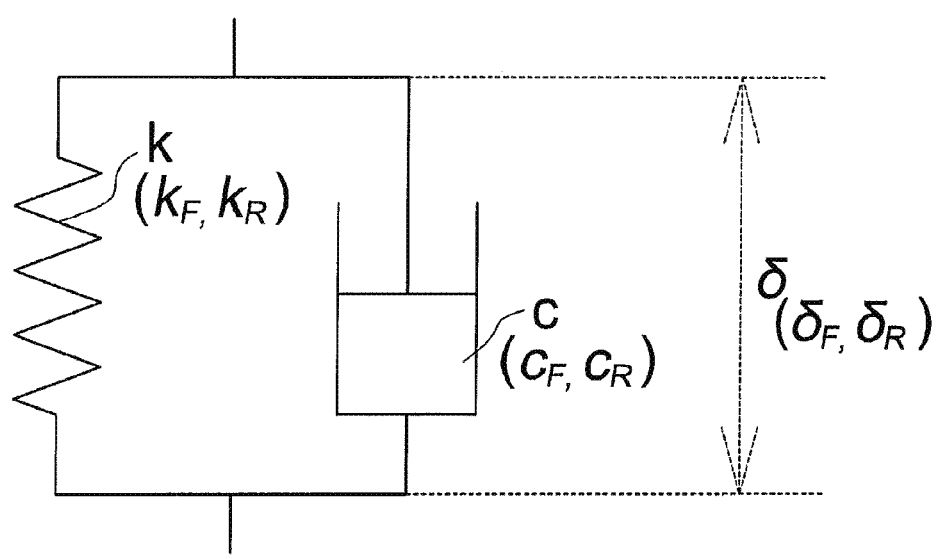
FIG. 16 shows an equivalent circuit modelling the shock absorber of the suspension.

FIG. 16 is an equivalent circuit modelling the shock absorber of the suspension. The suspension may be represented by a parallel model with a spring k and a damper c as shown in FIG. 16 in an equivalent manner. Creating a motion equation based on this equivalent circuit gives the equation provided below. The stroke quantity of the shock absorber of each suspension, the spring constant of each shock absorber, the damper coefficient of each shock absorber, and the preset load applied to each spring will be denoted by the characters shown in the following table.

TABLE 7

| Parameter | Meaning |
|---|---|
| $\delta_F$ | stroke quantity of shock absorber of front-wheel suspension |
| $\delta_R$ | stroke quantity of shock absorber of rear-wheel suspension |
| $k_F$ | spring coefficient of shock absorber of front-wheel suspension |
| $k_R$ | spring coefficient of shock absorber of rear-wheel suspension |

TABLE 7-continued

| Parameter | Meaning |
|---|---|
| $c_F$ | attenuation coefficient of shock absorber of front-wheel suspension |
| $c_R$ | attenuation coefficient of shock absorber of rear-wheel suspension |
| $l_F$ | preset load applied to shock absorber of front-wheel suspension |
| $l_R$ | preset load applied to shock absorber of rear-wheel suspension |

[Formula 81]

$$c_F \dot\delta_F + k_F \delta_F = FF_z \cos\epsilon_F + FF'_x \sin\epsilon_F - l_F \quad (84)$$
$$= D_F(\ldots) - l_F$$

$$c_R \dot\delta_R + k_R \delta_R = (FR_z \cos\epsilon_R - FR'_x \sin\epsilon_R)\kappa(\epsilon_R) - l_R \quad (85)$$
$$= D_R(\ldots) - l_R$$

In Equations (84) and (85), the parameters in the function $D_F$ in Equation (82) and the function $D_R$ in Equation (83) are omitted.

Solving the differential equation of Equations (84) and (85) gives the following equation.

[Formula 82]

$$\delta_F = \exp\left(-\frac{k_F}{c_F}t\right)\int_0^t \frac{D_F(\ldots)-l_F}{c_F}\exp\left(\frac{k_F}{c_F}\tau\right)d\tau \quad (86)$$

$$\delta_R = \exp\left(-\frac{k_R}{c_R}t\right)\int_0^t \frac{D_R(\ldots)-l_R}{c_R}\exp\left(\frac{k_R}{c_R}\tau\right)d\tau$$

As discussed above, the suspension stroke quantity estimation unit 70 may calculate the stroke quantity of the shock absorber of the suspension by solving the differential equations in Equations (84) and (85), or calculate the stroke quantity of the shock absorber of the suspension by performing a discretization process over time.

Further, the suspension stroke quantity estimation unit 70 may calculate the amount of sink $\delta_W$ of the rear suspension by performing calculation based on the following equation.

[Formula 83]

$$\delta_W = \int_0^{\delta_R} \kappa(\delta) d\delta \quad (87)$$

<Configuration of Elevation/Depression Angle Estimation Unit>

The elevation/depression angle estimation unit 80 calculates the elevation/depression angle $\zeta$ based on the estimation results from the load estimation unit 60 and suspension stroke quantity estimation unit 70.

If the suspension of the front wheel sinks by the amount of sink $\delta_F$ and the suspension of the rear wheel sinks by the amount of sink $\delta_W$, the positional vector $F_o$ of the center of the front wheel and the positional vector $R_o$ of the center of the rear wheel may be expressed by the following equations.

[Formula 84]

$$F_o = [e_b]\begin{bmatrix} -\delta_F \sin\epsilon_F \\ 0 \\ \delta_F \cos\epsilon_F \end{bmatrix} \quad (88)$$

$$R_o = [e_b]\begin{bmatrix} -\int_0^{\delta_W}\sin\epsilon_R(\delta)d\delta \\ 0 \\ \int_0^{\delta_W}\cos\epsilon_R(\delta)d\delta \end{bmatrix}$$

Based on Equations (87) and (88), the elevation/depression angle $\zeta$ may be calculated by the following equation.

[Formula 85]

$$\tan\zeta = \frac{\delta_F \cos\epsilon_F - \int_0^{\delta_W}\cos\epsilon_R(\delta)d\delta}{L' - \delta_F \sin\epsilon_F + L + \int_0^{\delta_W}\sin\epsilon_R(\delta)d\delta} + \zeta_0 \quad (89)$$

In Equation (89), $\zeta_0$ is the angle formed by the basis vector $e_b$ of the vehicle coordinate system and the basis vector $e_r$ of the road-surface coordinate system found when the stroke quantity of the suspension is zero.

<Configuration of Slope Estimation Unit>

Based on the estimation results from the elevation/depression angle estimation unit 80 and the estimation results from the calculation unit 49, the slope estimation unit 90 calculates the longitudinal slope $\eta$ of the road surface.

The longitudinal slope $\eta$ of the road surface is expressed by the following equation using the pitch angle $\theta$, roll angle $\varphi$ and elevation/depression angle $\zeta$ of the vehicle 100.

[Formula 86]

$$\sin\eta = \sin\theta \cos\zeta - \cos\theta \cos\varphi \sin\zeta \quad (90)$$

Thus, the longitudinal slope $\eta$ of the road surface may be calculated by the following equation.

[Formula 87]

$$\eta = \sin^{-1}(\sin\theta \cos\zeta - \cos\theta \cos\varphi \sin\zeta) \quad (91)$$

<Alternative Configurations>

The attitude estimation apparatus 10 according to the present embodiment may use one or more of the following variations.

(1) As in the first embodiment, according to the present embodiment, a Kalman filter 50 that is most likely to be reliable may be selected based on the likelihood $\lambda$ calculated by the Kalman filters 50, the left-right acceleration sensor offset $b_y$ provided to this Kalman filter 50 may be treated as the estimated value of the left-right acceleration sensor offset and the estimation results of this Kalman filter 50 may be treated as the estimation results of the calculation unit 49. This will simplify the calculation process by the state quantity determination unit 503.

(2) According to the present embodiment, each Kalman filter 50 estimates the roll angle $\varphi$, pitch angle $\theta$, vehicle velocity $V_x$, roll angular velocity sensor offset $b_{ro}$, yaw angle velocity sensor offset $b_{ya}$, pitch angular velocity sensor offset $b_{pi}$, and top-bottom acceleration sensor offset $b_z$, and the front-rear acceleration sensor offset $b_x$ is estimated taking account of the likelihood obtained based on the estimate results of the Kalman filters 50. Alternatively, each Kalman filter 50 may estimate the roll angle φ, vehicle velocity $V_x$, roll angular velocity sensor offset $b_{ro}$, yaw angle velocity sensor offset $b_{ya}$, pitch angular velocity sensor offset $b_{pi}$, and front-rear acceleration sensor offset $b_x$, and the top-bottom acceleration sensor offset $b_z$ may be estimated taking account of the likelihood obtained based on the estimation results of the Kalman filters 50. In this case, the top-bottom acceleration sensor 24 corresponds to the "detection unit of interest", or in other words, in this example the top-bottom acceleration sensor 24 is a detection unit associated with the offset error which is estimated by using the likelihood.

In this case, each of the Kalman filters 50 included in the calculation unit 49 according to the present embodiment, at the system equation calculation unit 51, performs calculation using Equation (92) provided below, instead of Equation (69a), as the system equation. Further, each of the Kalman filters 50, at the observation equation calculation unit 52, performs calculation using Equation (93) provided below, instead of Equation (70a), as the observation equation.

[Formula 88]

$$\frac{d}{dt}\begin{bmatrix} \phi \\ \theta \\ V_x \\ b_{ro} \\ b_{pi} \\ b_{ya} \\ b_x \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \omega_{ro}, \\ \omega_{ya}, \omega_{pi}, G_x - b_x, \theta, \phi, V_x, \zeta, L, h, R_{cr}, g) \\ 0 \\ 0 \\ 0 \\ 0 \end{bmatrix} \quad (92)$$

[Formula 89]

$$\begin{bmatrix} G_y \\ G_z \\ v_r \\ 0 \end{bmatrix} = \quad (93)$$

$$\begin{bmatrix} A_y(\omega_{ro} - b_{ro}, \omega_{ya} - b_{ya}, \omega_{pi} - b_{pi}, \\ \omega_{ro}, \omega_{ya}, \omega_{pi}, \zeta, \theta, \phi, V_x, L, h, R_{cr}, g) \\ A_z(\omega_{ro} - b_{ro}, \omega_{ya} - b_{ya}, \omega_{pi} - b_{pi}, \omega_{ro}, \omega_{ya}, \\ \omega_{pi}, G_x - b_x, \zeta, \dot{\zeta}, \theta, \phi, V_x, L, h, R_{cr}, g) + b_z \\ \dfrac{\sec \zeta}{1 - R_{cr}/R_e(1 - \cos \phi)} V_x \\ Q_x(\omega_{ro} - b_{ro}, \omega_{ya} - b_{ya}, \omega_{pi} - b_{pi}, \omega_{ro}, \omega_{ya}, \omega_{pi}, G_x - b_x, \zeta, \dot{\zeta}, \\ \theta, \phi, V_x, L, h, R_{cr}, g, W_x, W_z, I_{xx}, I_{yy}, I_{zz}, I_{xz}) \end{bmatrix}$$

The value of $b_z$ in Equation (93) is the value of the top-bottom acceleration sensor offset $b_z(b_{z1}, b_{z2}, b_{z3})$ provided by the imaginary offset input unit 59 of each of the Kalman filters 50 (50_1, 50_2 and 50_3).

Alternatively, the left-right acceleration sensor offset $b_y$ may be estimated taking account of the likelihood obtained based on the estimation results from the Kalman filters 50. In this case, each of the Kalman filters 50, at the system equation calculation unit 51, performs calculation using Equation (94) provided below, instead of Equation (69a), as the system equation, and, at the observation equation calculation unit 52, performs calculation using Equation (95) provided below, instead of Equation (70a), as the observation equation.

[Formula 90]

$$\frac{d}{dt}\begin{bmatrix} \phi \\ \theta \\ V_x \\ b_{ro} \\ b_{pi} \\ b_{ya} \\ b_x \end{bmatrix} = \begin{bmatrix} \dot{\theta}(\omega_{pi} - b_{pi}, \omega_{ya} - b_{ya}, \phi) \\ \dot{\phi}(\omega_{ro} - b_{ro}, \omega_{pi} - b_{pi}, \omega_{ya} - b_{ya}, \theta, \phi) \\ A_x(\omega_{ro} - b_{ro}, \omega_{ya} - b_{ya}, \omega_{pi} - b_{pi}, \omega_{ro}, \\ \omega_{ya}, \omega_{pi}, G_x - b_x, \theta, \phi, V_x, \zeta, L, h, R_{cr}, g) \\ 0 \\ 0 \\ 0 \\ 0 \end{bmatrix} \quad (94)$$

[Formula 91]

$$\begin{bmatrix} G_y \\ G_z \\ v_r \\ 0 \end{bmatrix} = \quad (95)$$

$$\begin{bmatrix} A_y(\omega_{ro} - b_{ro}, \omega_{ya} - b_{ya}, \omega_{pi} - b_{pi}, \\ \omega_{ro}, \omega_{ya}, \omega_{pi}, \zeta, \theta, \phi, V_x, L, h, R_{cr}, g) + b_y \\ A_z(\omega_{ro} - b_{ro}, \omega_{ya} - b_{ya}, \omega_{pi} - b_{pi}, \omega_{ro}, \omega_{ya}, \\ \omega_{pi}, G_x - b_x, \zeta, \dot{\zeta}, \theta, \phi, V_x, L, h, R_{cr}, g) \\ \dfrac{\sec \zeta}{1 - R_{cr}/R_e(1 - \cos \phi)} V_x \\ Q_x(\omega_{ro} - b_{ro}, \omega_{ya} - b_{ya}, \omega_{pi} - b_{pi}, \omega_{ro}, \omega_{ya}, \omega_{pi}, G_x - b_x, \zeta, \dot{\zeta}, \\ \theta, \phi, V_x, L, h, R_{cr}, g, W_x, W_z, I_{xx}, I_{yy}, I_{zz}, I_{xz}) \end{bmatrix}$$

Similarly, the value of $b_y$ in Equation (95) may be the value of the left-right acceleration sensor offset $b_y(b_{y1}, b_{y2}, b_{y3})$ provided by the imaginary offset input unit 59 of each of the Kalman filters 50 (50_1, 50_2 and 50_3).

(3) According to the present embodiment, the attitude estimation apparatus 10 includes the load estimation unit 60, suspension stroke quantity estimation unit 70, elevation/depression angle estimation unit 80, and slope estimation unit 90. Alternatively, the attitude estimation apparatus 10 may include none of these calculation functionalities. That is, as shown in FIG. 17, the attitude estimation apparatus 10 may include the group of sensors 5, rear-wheel velocity sensor 7, low-pass filters 31, 32, 33, 34, 35 and 36, and differentiators 41, 42 and 43, and calculation unit 49.

In this case, unlike the arrangement of FIG. 10, the attitude estimation apparatus 10 does not include the functionality for estimating the elevation/depression angle ζ, and thus the calculation unit 49 does not receive the elevation/depression angle ζ and the first-order differential value of the elevation/depression angle ζ. Accordingly, the calculation unit 49 may perform calculation where ζ=0 in the equations provided above. In this arrangement, the vehicle 100 is capable of estimating the attitude of the vehicle body 1 without taking account of movements of the suspension.

<Calculation of Estimated Values of Parameters>

Now, the ability of the attitude estimation apparatus according to the present embodiment to estimate the attitude of the vehicle 100 with high accuracy will be proven with reference to examples. For the examples provided below, similar to the first embodiment, the attitude of the vehicle 100 was estimated by the attitude estimation apparatus according to the present embodiment while the value 100 traveled on a predetermined road surface. During this, an offset errors was intentionally generated in a predetermined sensor at a predetermined moment.

EXAMPLE 1

The calculation unit 49 presupposed for FIGS. 18A to 18G is configured such that each Kalman filter 50 estimates the roll angle φ, vehicle velocity $V_x$, roll angular velocity sensor offset $b_{ro}$, yaw angular velocity sensor offset $b_{ya}$, pitch angular velocity sensor offset $b_{pi}$, and top-bottom acceleration sensor offset $b_z$, and the front-rear acceleration sensor offset $b_x$ is estimated taking account of the likelihood obtained based on the estimation results by the Kalman filters 50.

Figure 18A:
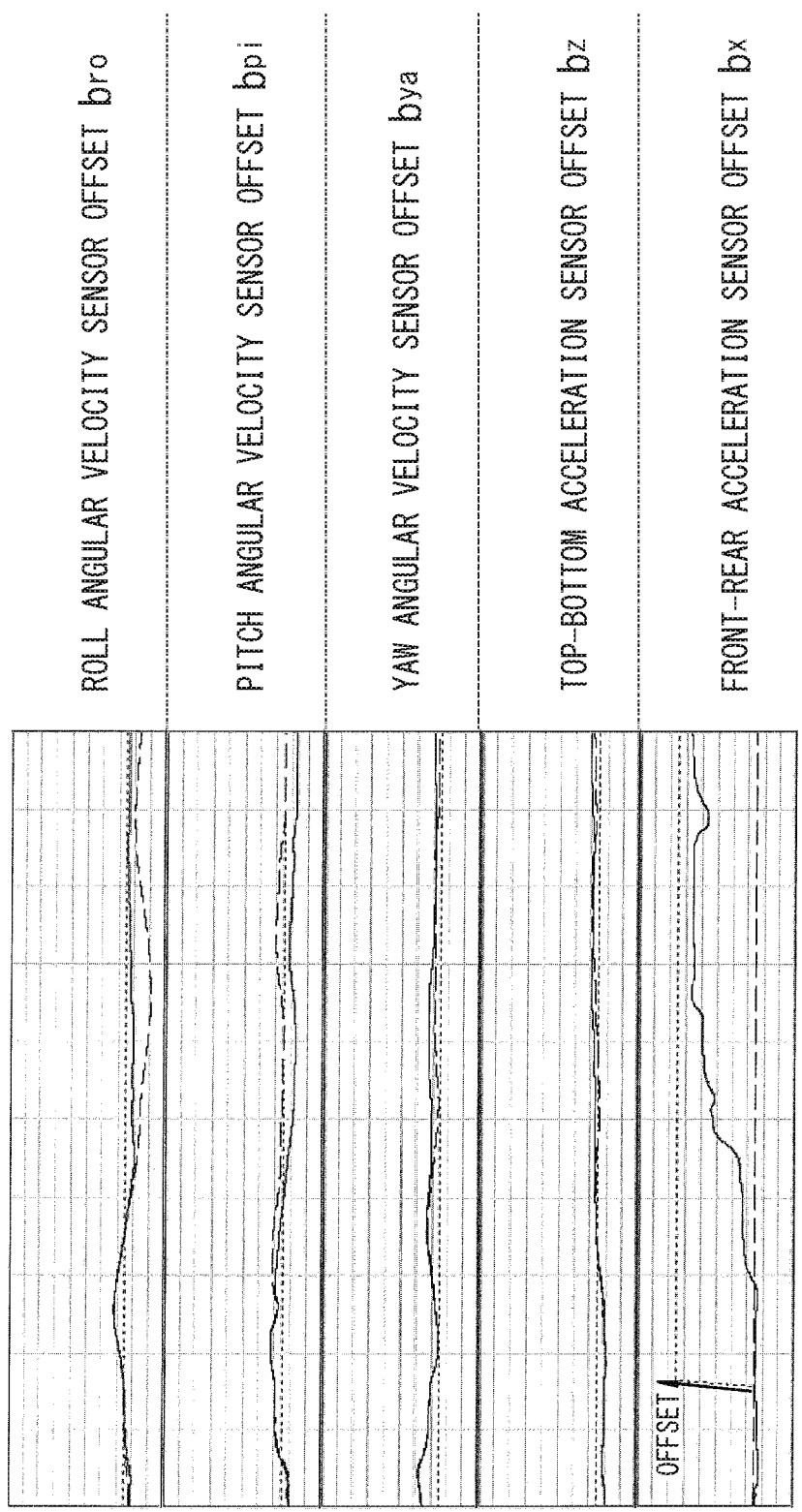
FIG. 18A illustrates how the estimated values of various parameters change over time.

FIGS. 18A and 18B are graphs showing the estimated values resulting when an offset error with 100 mG was superimposed in the front-rear acceleration sensor 25 at a predetermined moment. In FIGS. 18A and 18B, a dotted line represents a true value, a broken line represents a value estimated using one Kalman filter 50, and a solid line represents a value estimated using a plurality of Kalman filters 50. The data represented by the broken line is data obtained when the value of one sensor offset was additionally estimated using the characteristic equation, as discussed in the present embodiment.

In FIG. 18A, the estimated value of the front-rear acceleration sensor offset $b_x$ increases after a predetermined moment, indicating that an estimation close to the true value was achieved. The estimated values of the other sensor offsets are zero, again indicating that an estimation close to the true value was achieved. For FIG. 18A, the data represented by the broken line was not obtained through an estimation process using a likelihood, and this arrangement does not allow the front-rear acceleration sensor offset $b_x$ to be estimated.

FIG. 18B demonstrates that the solid line achieves estimation results closer to the true value than the broken line. This shows that arranging a plurality of Kalman filters 50 in parallel and additionally estimating an offset error based on a likelihood improves estimation accuracy.

FIGS. 18C to 18G are graphs showing the estimated values resulting when an offset error was generated in sensors other than the front-rear acceleration sensor 25. In FIGS. 18C to 18G, a dotted line represents a true value, and a solid line represents a value estimated using a plurality of Kalman filters 50.

Figure 18C:
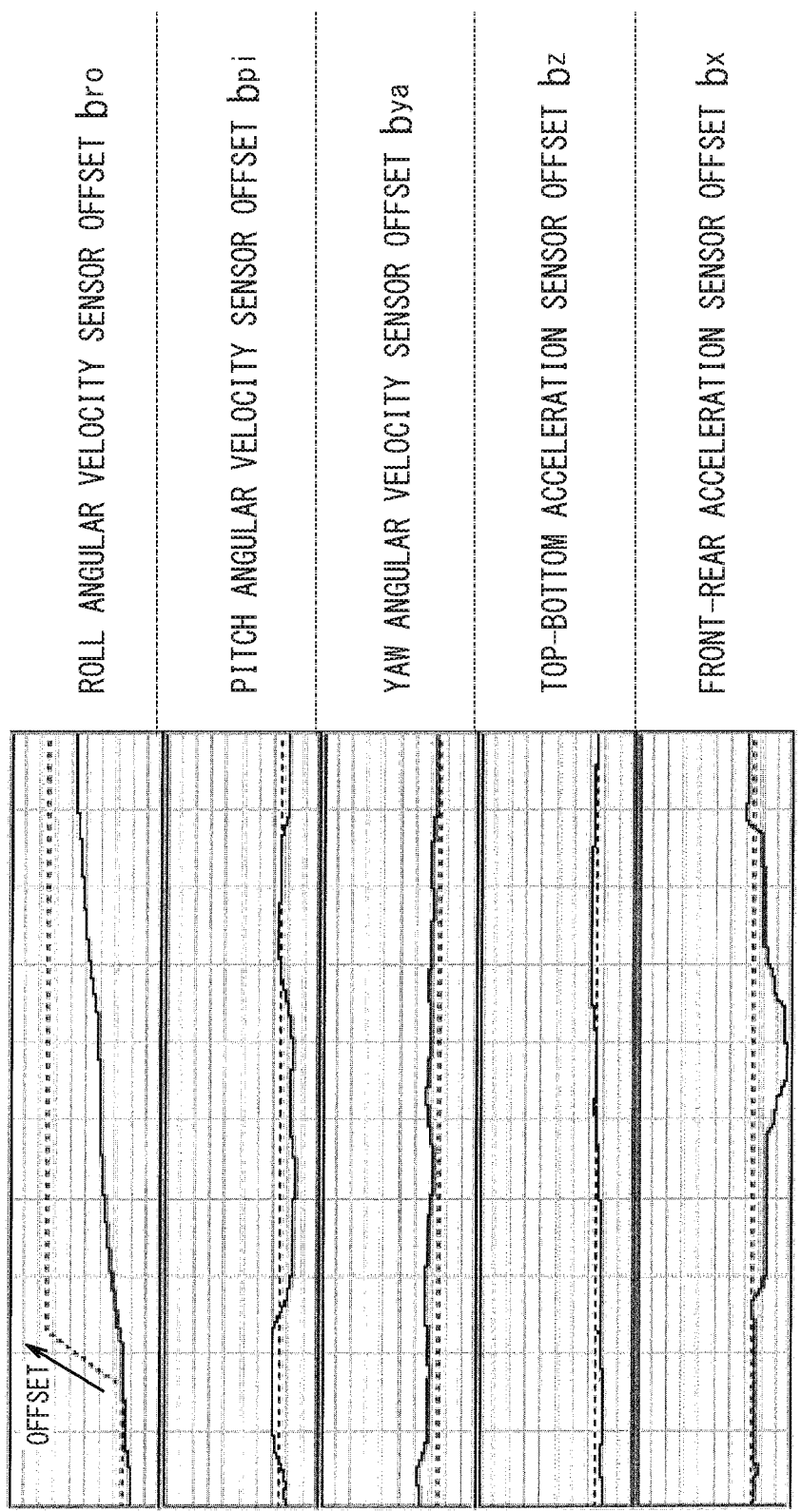
FIG. 18C illustrates how the estimated values of various parameters change over time.
Figure 18D:
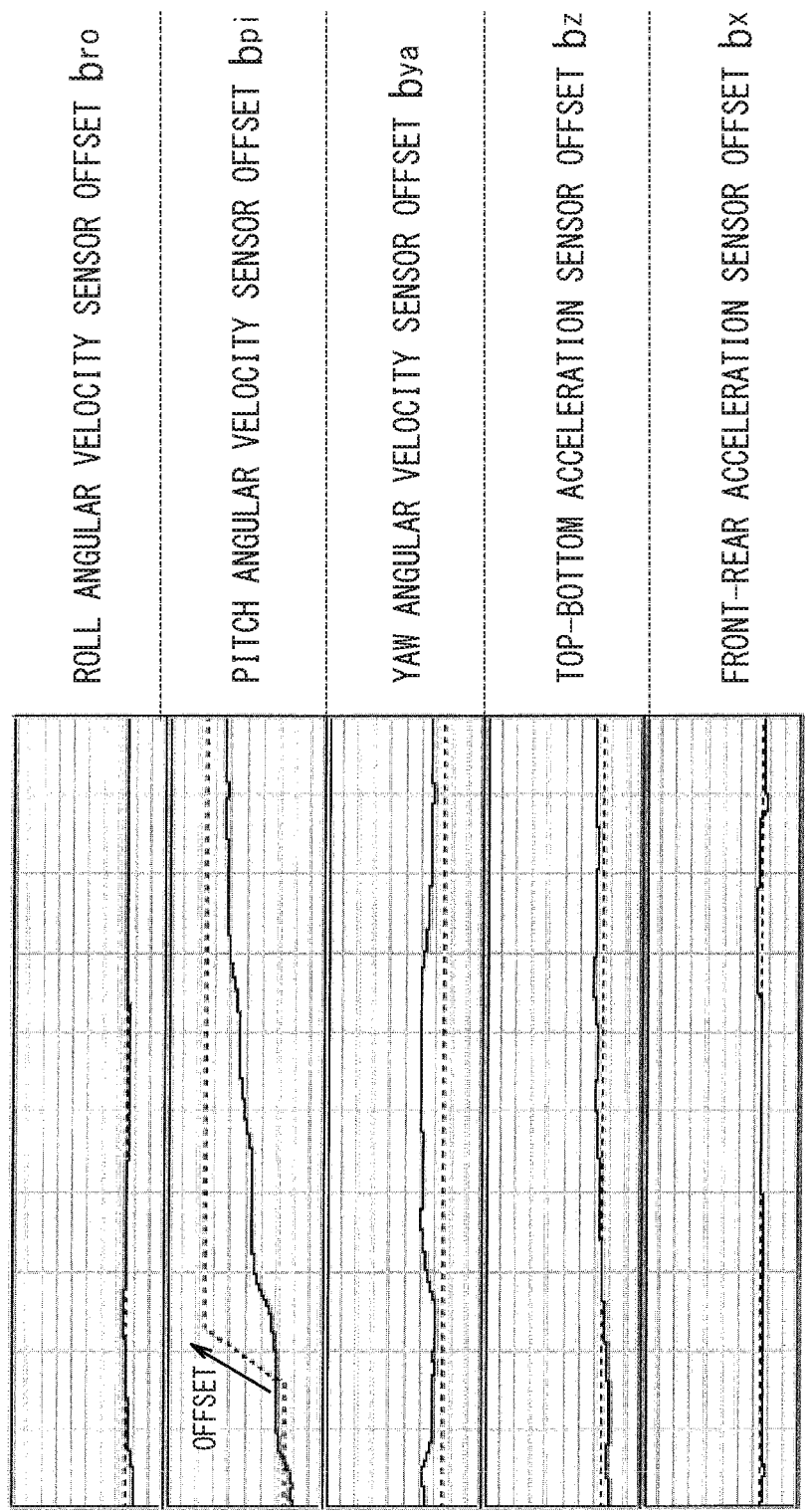
FIG. 18D illustrates how the estimated values of various parameters change over time.
Figure 18E:
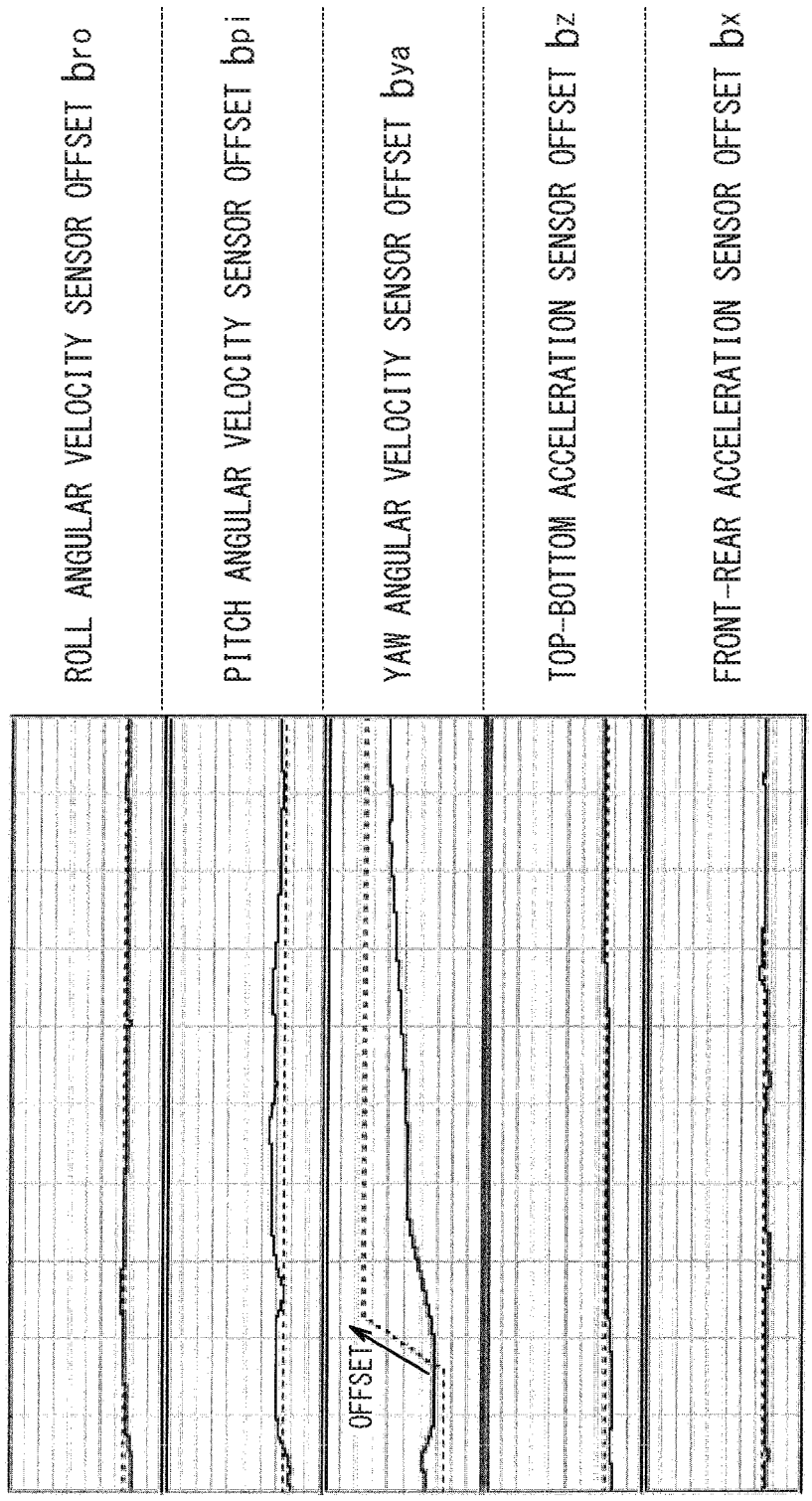
FIG. 18E illustrates how the estimated values of various parameters change over time.
Figure 18F:
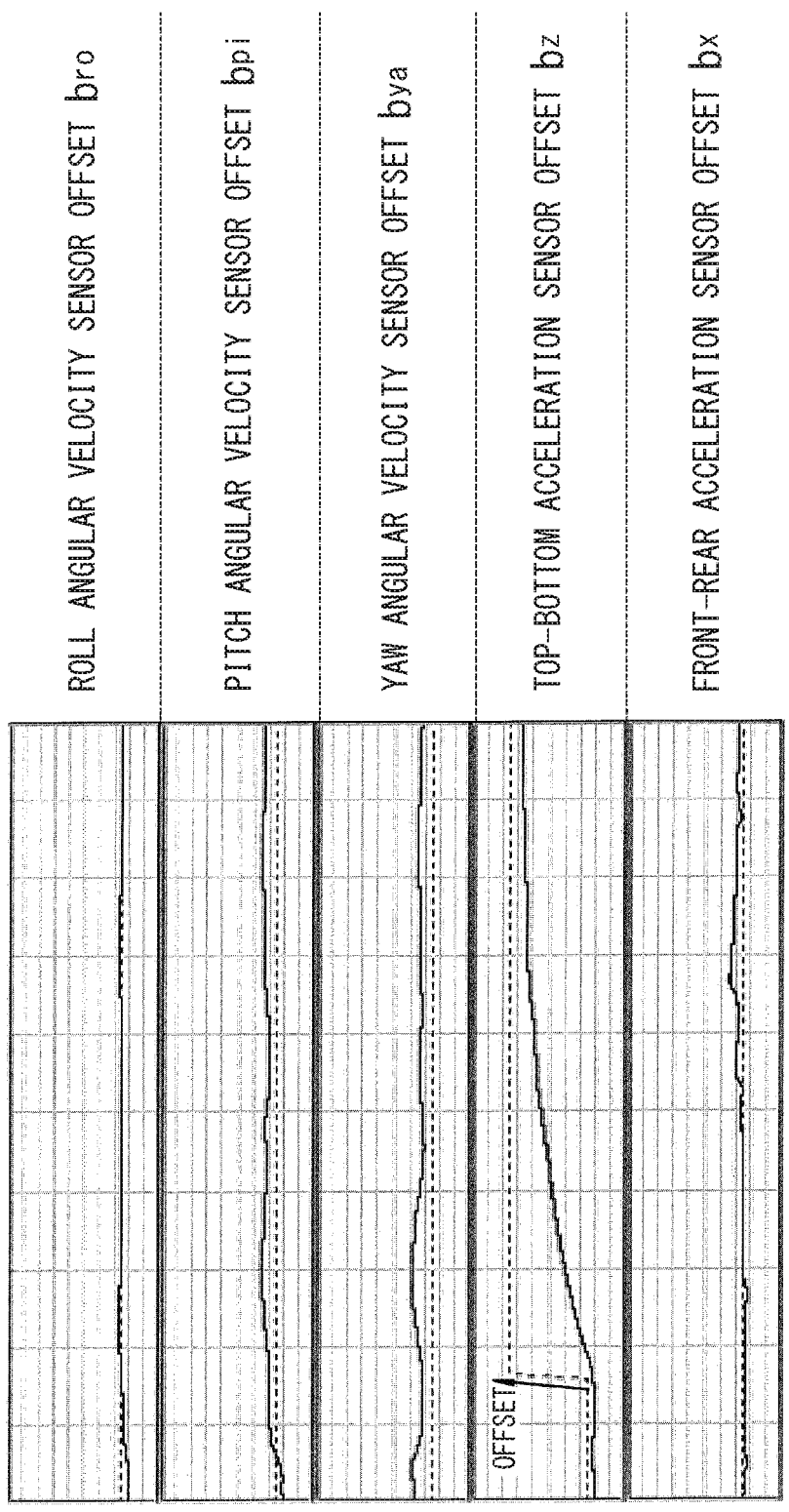
FIG. 18F illustrates how the estimated values of various parameters change over time.

FIG. 18C shows the estimated values found when an offset of 1 deg/sec was superimposed in the roll angular velocity sensor 21 after a predetermined period of time. FIG. 18D shows the estimated values found when an offset of 1 deg/sec was superimposed in the pitch angular velocity sensor 23 after a predetermined period of time. FIG. 18E shows the estimated values found when an offset of 1 deg/sec was superimposed in the yaw angular velocity sensor 22 after a predetermined period of time. FIG. 18F shows the estimated values found when an offset of 100 mG was superimposed in the top-bottom acceleration sensor 24 after a predetermined period of time.

Figure 18G:
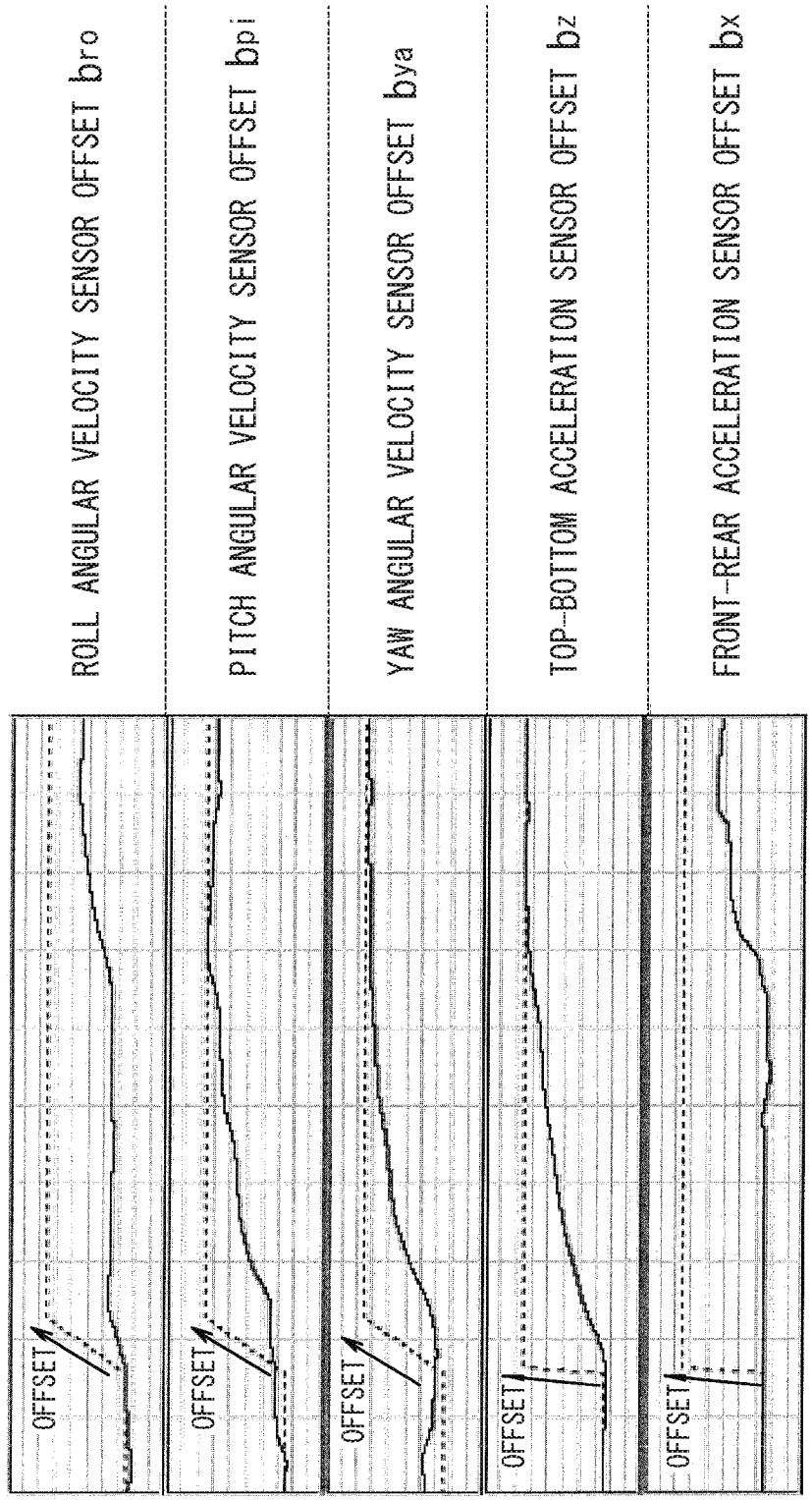
FIG. 18G illustrates how the estimated values of various parameters change over time.

FIG. 18G shows the estimated values found when offsets were superimposed in all the sensors in a combined manner. Specifically, an offset of 1 deg/sec was superimposed in the roll angular velocity sensor 21, an offset of 1 deg/sec was superimposed in the pitch angular velocity sensor 23, an offset of 1 deg/sec was superimposed in the yaw angular velocity sensor 22, an offset of 100 mG was superimposed in the top-bottom acceleration sensor 24, and an offset of 100 mG was superimposed in the front-rear acceleration sensor 25.

FIGS. 18C to 18G demonstrate that, immediately after an offset was superimposed, the estimated values of some other sensor offsets temporarily fluctuated, but converged over time. This verifies that, in each case, the values of the sensor offsets were estimated with high accuracy without being interfered with by other offsets.

EXAMPLE 2

The calculation unit 49 presupposed for FIGS. 19A to 19G is configured such that each Kalman filter 50 estimates the roll angle φ, vehicle velocity $V_x$, roll angular velocity sensor offset $b_{ro}$, yaw angular velocity sensor offset $b_{ya}$, pitch angular velocity sensor offset $b_{pi}$, and front-rear acceleration sensor offset $b_x$, and the top-bottom acceleration sensor offset $b_z$ is estimated taking account of the likelihood obtained based on the estimation results by the Kalman filters 50.

Figure 19A:
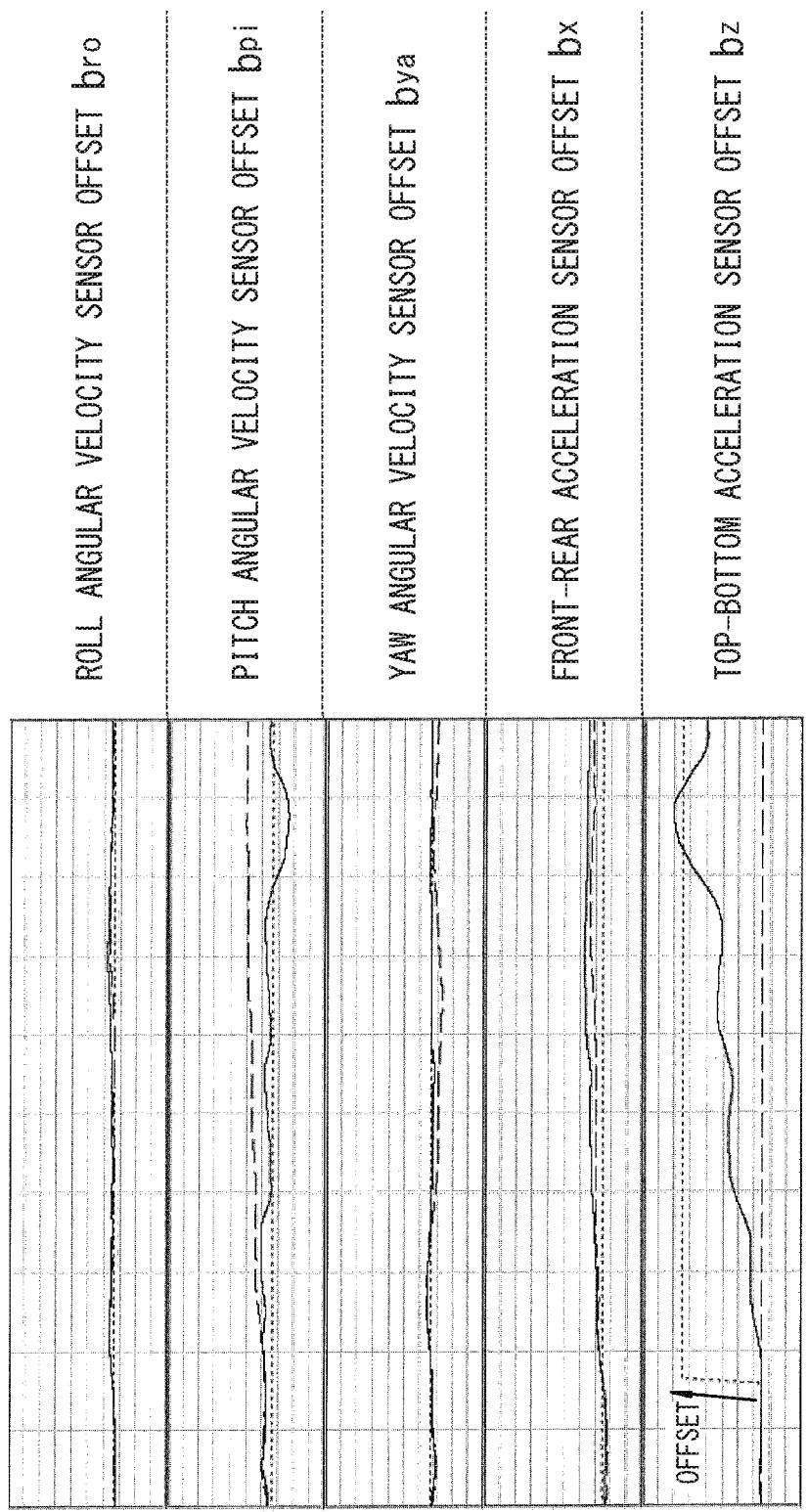
FIG. 19A illustrates how the estimated values of various parameters change over time.
Figure 19B:
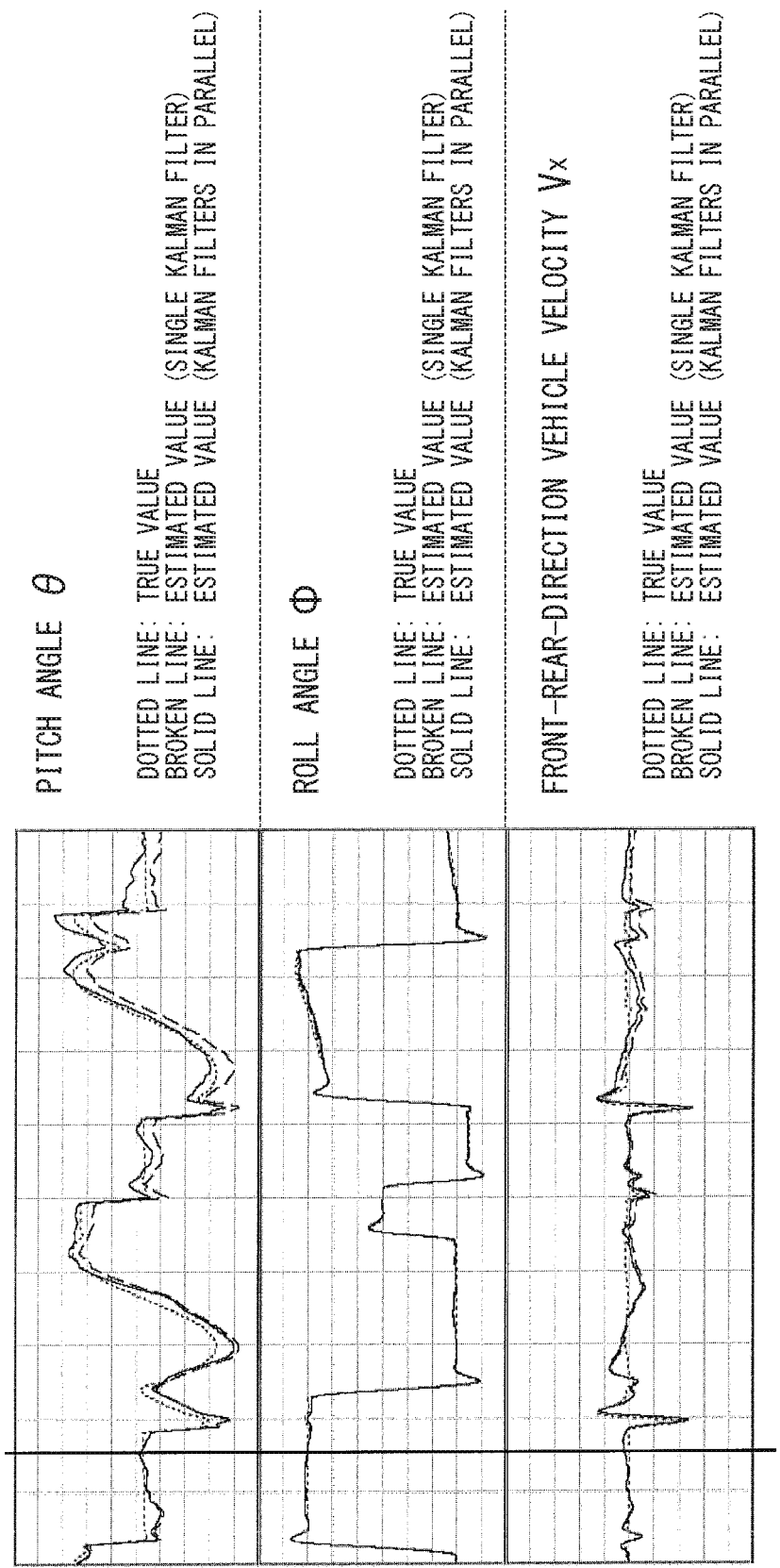
FIG. 19B illustrates how the estimated values of various parameters change over time.

FIGS. 19A and 19B are graphs showing the estimated values resulting when an offset error with 100 mG was superimposed in the front-rear acceleration sensor 24 at a predetermined moment. In FIGS. 19A and 19B, a dotted line represents a true value, a broken line represents a value estimated using one Kalman filter 50, and a solid line represents a value estimated using a plurality of Kalman filters 50. The data represented by the broken line is data obtained when the value of one sensor offset was additionally estimated using the characteristic equation, as discussed in the present embodiment.

In FIG. 19A, the estimated value of the top-bottom acceleration sensor offset $b_z$ increases after a predetermined moment, indicating that an estimation close to the true value was achieved. The estimated values of the other sensor offsets are zero, again indicating that an estimation close to the true value was achieved. For FIG. 19A, the data represented by the broken line was not obtained through an estimation process using a likelihood, and this arrangement does not allow the front-rear acceleration sensor offset $b_z$ to be estimated.

FIG. 19B demonstrates that the solid line achieves estimation results closer to the true value than the broken line. This shows that arranging a plurality of Kalman filters 50 in parallel and additionally estimating an offset error based on a likelihood improves estimation accuracy.

FIGS. 19C to 19G are graphs showing the estimated values resulting when an offset error was generated in sensors other than the front-rear acceleration sensor 24. In FIGS. 19C to 19G, a dotted line represents a true value, and a solid line represents a value estimated using a plurality of Kalman filters 50.

Figure 19C:
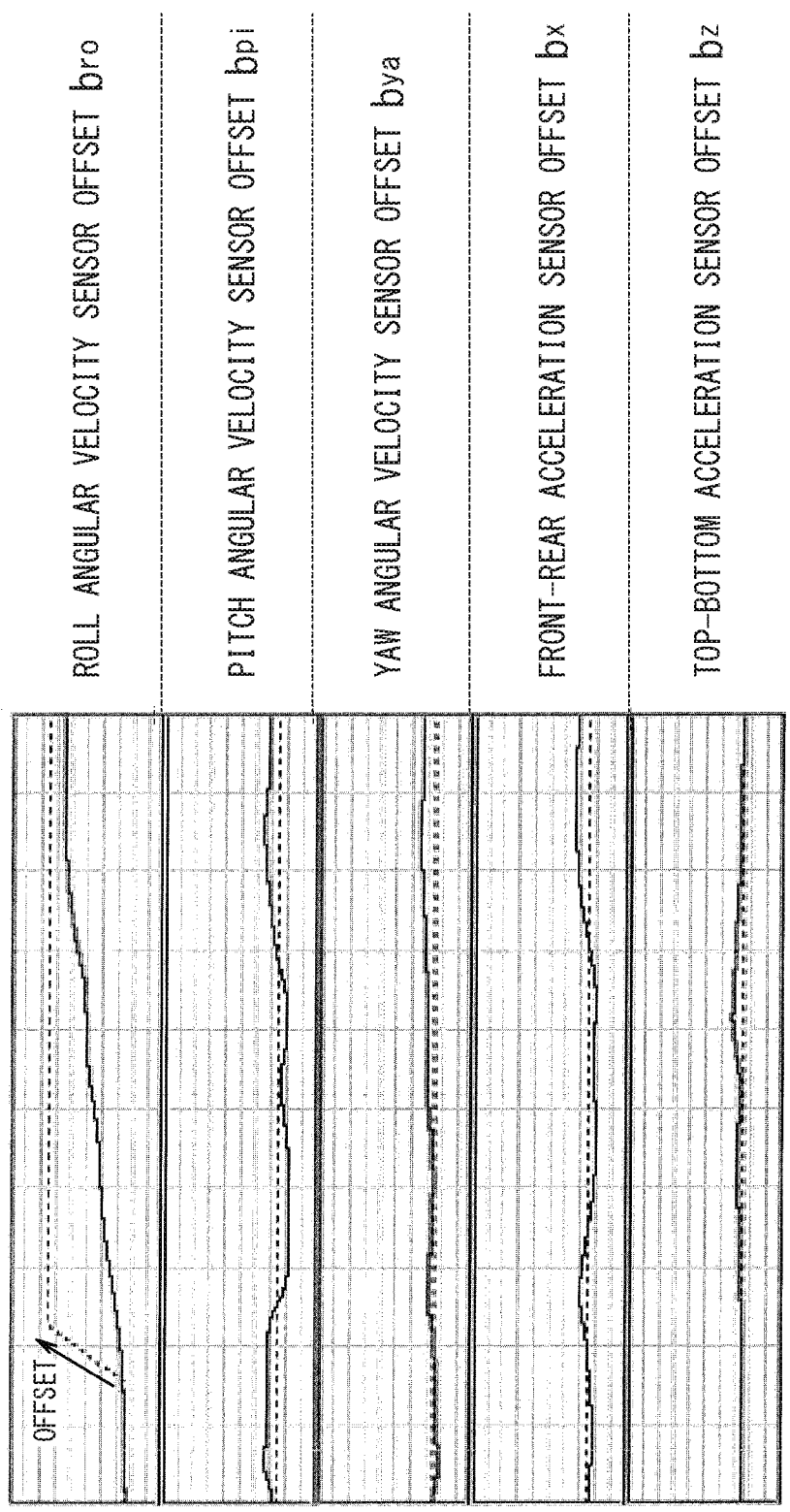
FIG. 19C illustrates how the estimated values of various parameters change over time.
Figure 19D:
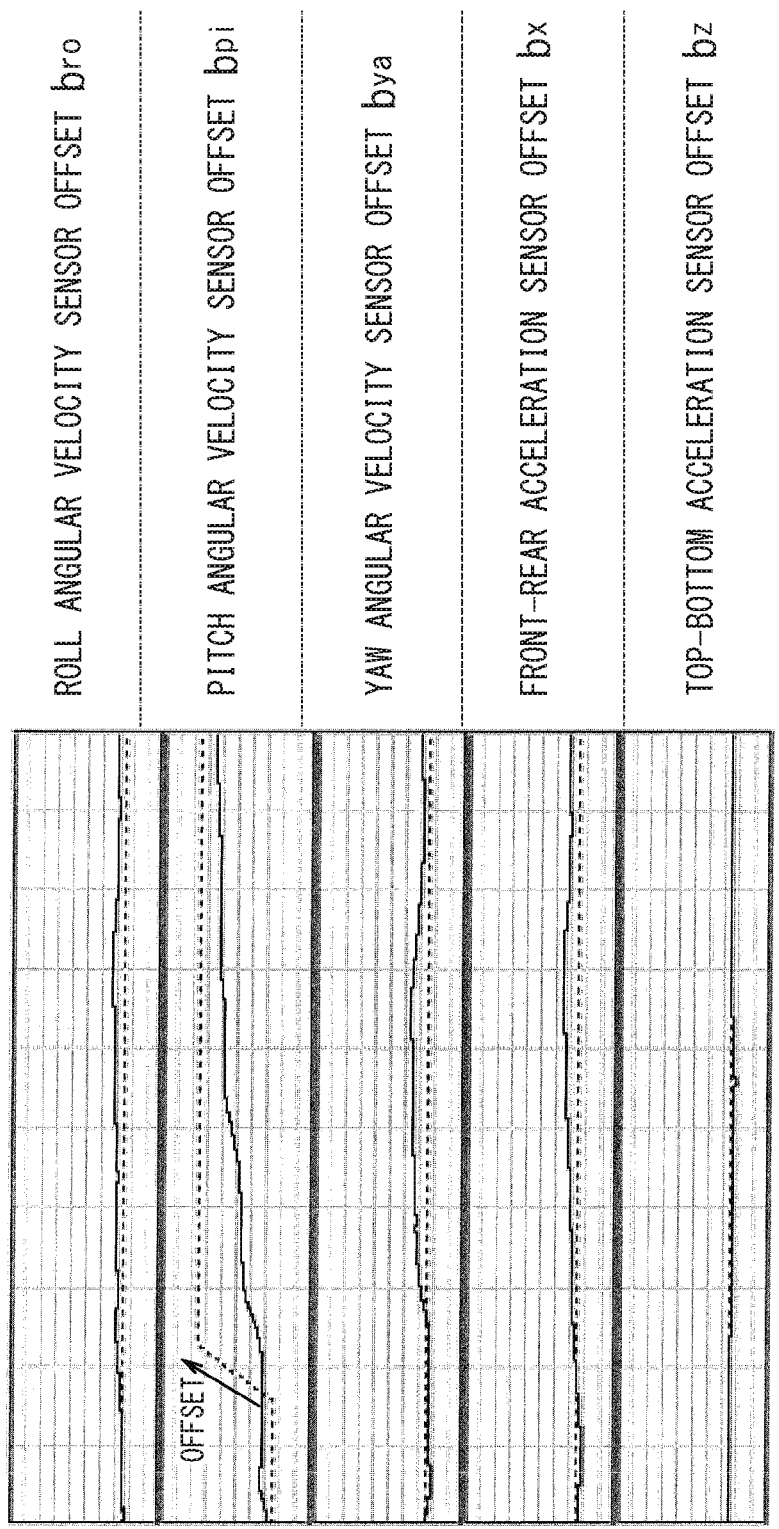
FIG. 19D illustrates how the estimated values of various parameters change over time.
Figure 19E:
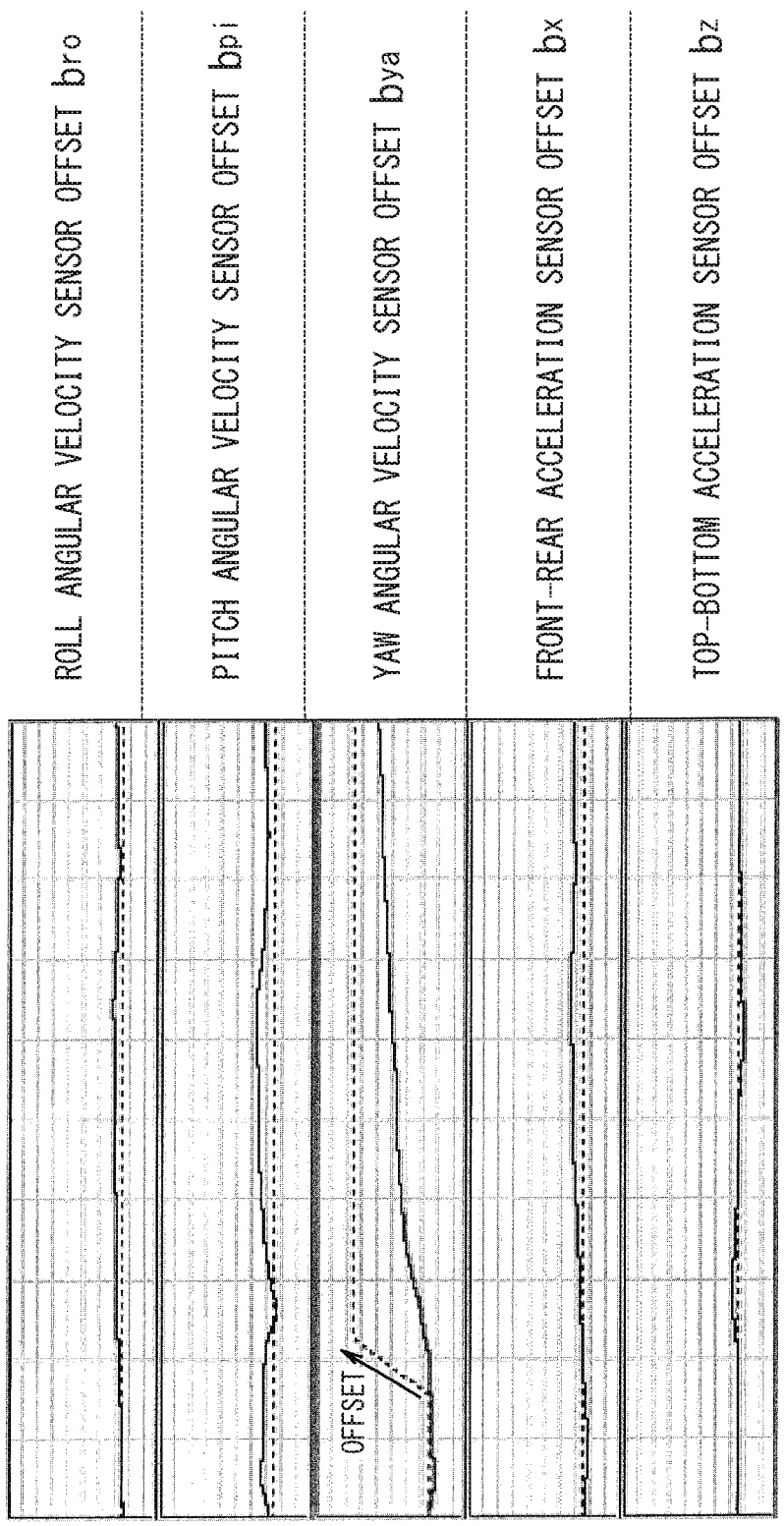
FIG. 19E illustrates how the estimated values of various parameters change over time.
Figure 19F:
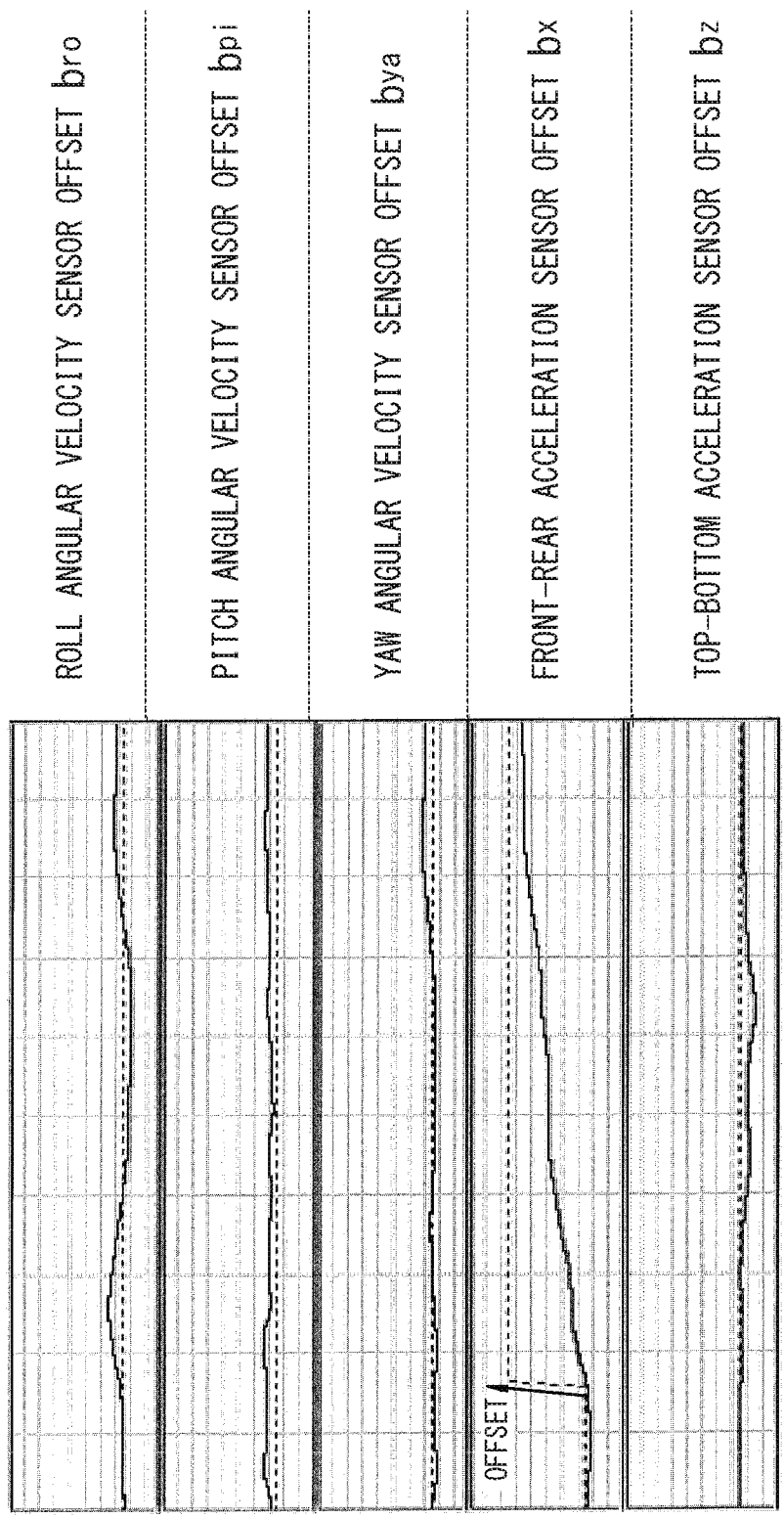
FIG. 19F illustrates how the estimated values of various parameters change over time.

FIG. 19C shows the estimated values found when an offset of 1 deg/sec was superimposed in the roll angular velocity sensor 21 after a predetermined period of time. FIG. 19D shows the estimated values found when an offset of 1 deg/sec was superimposed in the pitch angular velocity sensor 23 after a predetermined period of time. FIG. 19E shows the estimated values found when an offset of 1 deg/sec was superimposed in the yaw angular velocity sensor 22 after a predetermined period of time. FIG. 19F shows the estimated values found when an offset of 100 mG was superimposed in the front-rear acceleration sensor 25 after a predetermined period of time.

Figure 19G:
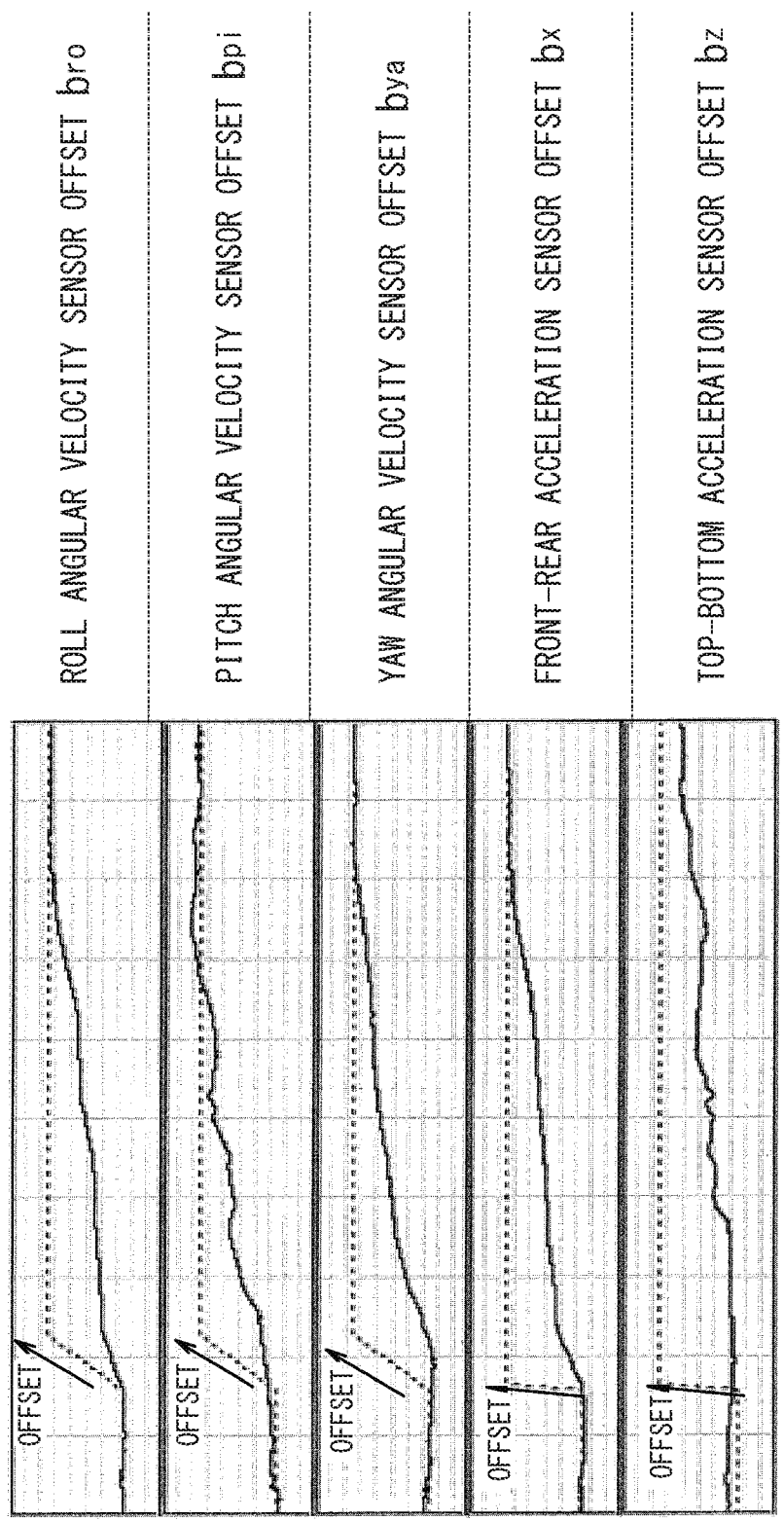
FIG. 19G illustrates how the estimated values of various parameters change over time.

FIG. 19G shows the estimated values found when offsets were superimposed in all the sensors in a combined manner. Specifically, an offset of 1 deg/sec was superimposed in the roll angular velocity sensor 21, an offset of 1 deg/sec was superimposed in the pitch angular velocity sensor 23, an offset of 1 deg/sec was superimposed in the yaw angular velocity sensor 22, an offset of 100 mG was superimposed in the top-bottom acceleration sensor 24, and an offset of 100 mG was superimposed in the front-rear acceleration sensor 25.

FIGS. 19C to 19G demonstrate that, immediately after an offset was superimposed, the estimated values of some other sensor offsets temporarily fluctuated, but converged over time. This verifies that, in each case, the values of the sensor offsets were estimated with high accuracy without being interfered with by other offsets.

EXAMPLE 3

The calculation unit 49 presupposed for FIGS. 20A to 20G is configured such that each Kalman filter 50 estimates the roll angle $\varphi$, vehicle velocity $V_x$, roll angular velocity sensor offset $b_{ro}$, yaw angular velocity sensor offset $b_{ya}$, pitch angular velocity sensor offset $b_{pi}$, and front-rear acceleration sensor offset $b_x$, and the left-right acceleration sensor offset $b_y$ is estimated taking account of the likelihood obtained based on the estimation results by the Kalman filters 50.

Figure 20A:
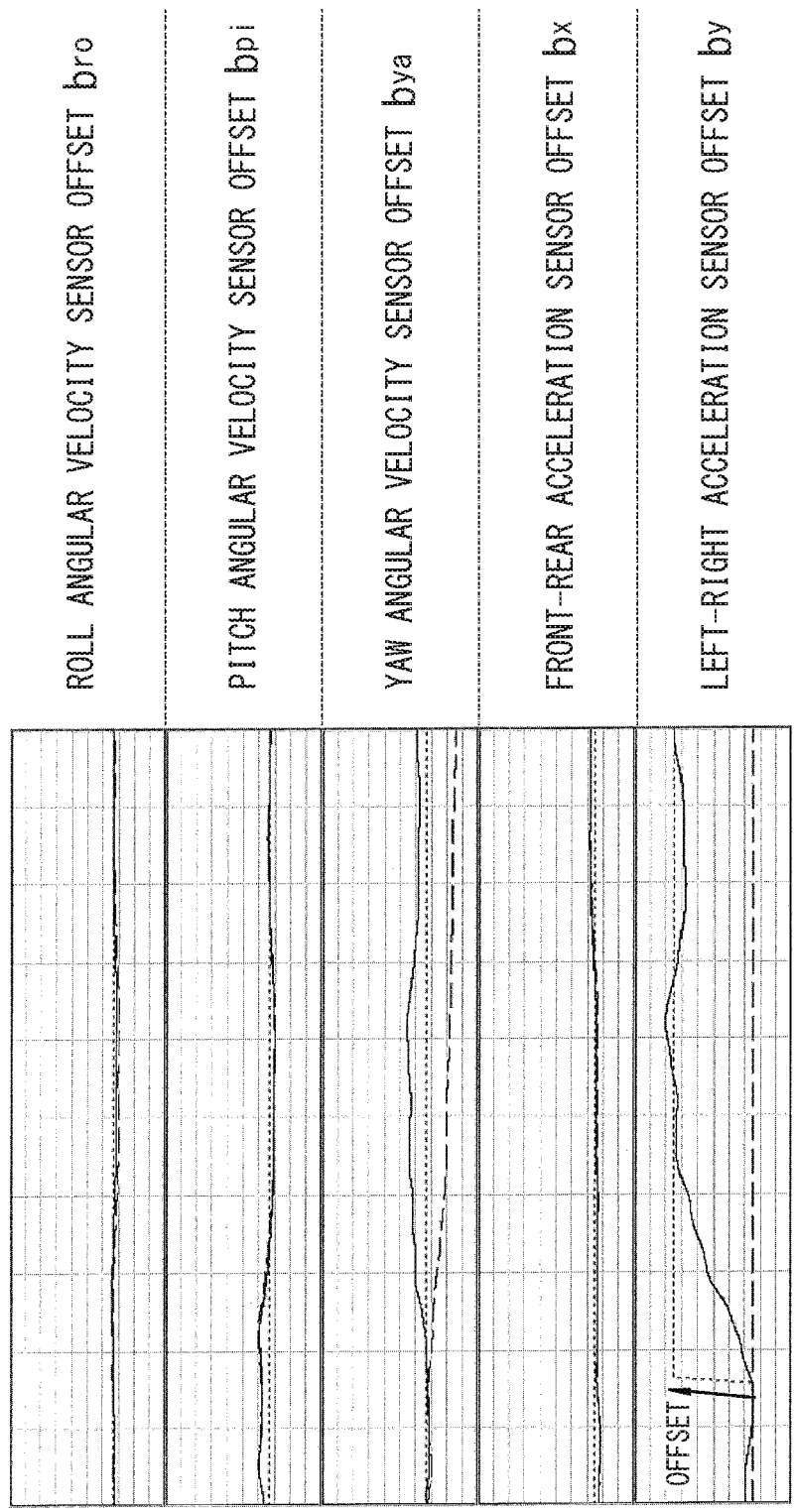
FIG. 20A illustrates how the estimated values of various parameters change over time.

FIGS. 20A and 20B are graphs showing the estimated values resulting when an offset error with 100 mG was superimposed in the left-right acceleration sensor 26 at a predetermined moment. In FIGS. 20A and 20B, a dotted line represents a true value, a broken line represents a value estimated using one Kalman filter 50, and a solid line represents a value estimated using a plurality of Kalman filters 50. The data represented by the broken line is data obtained when the value of one sensor offset was additionally estimated using the characteristic equation, as discussed in the present embodiment.

In FIG. 20A, the estimated value of the left-right acceleration sensor offset $b_y$ increases after a predetermined moment, indicating that an estimation close to the true value was achieved. The estimated values of the other sensor offsets are zero, again indicating that an estimation close to the true value was achieved. For FIG. 20A, the data represented by the broken line was not obtained through an estimation process using a likelihood, and this arrangement does not allow the left-right acceleration sensor offset $b_y$ to be estimated.

FIG. 20B demonstrates that the solid line achieves estimation results closer to the true value than the broken line. This shows that arranging a plurality of Kalman filters 50 in parallel and additionally estimating an offset error based on a likelihood improves estimation accuracy.

FIGS. 20C to 20G are graphs showing the estimated values resulting when an offset error was generated in sensors other than the left-right acceleration sensor 26. In FIGS. 20C to 20G, a dotted line represents a true value, and a solid line represents a value estimated using a plurality of Kalman filters 50.

Figure 20C:
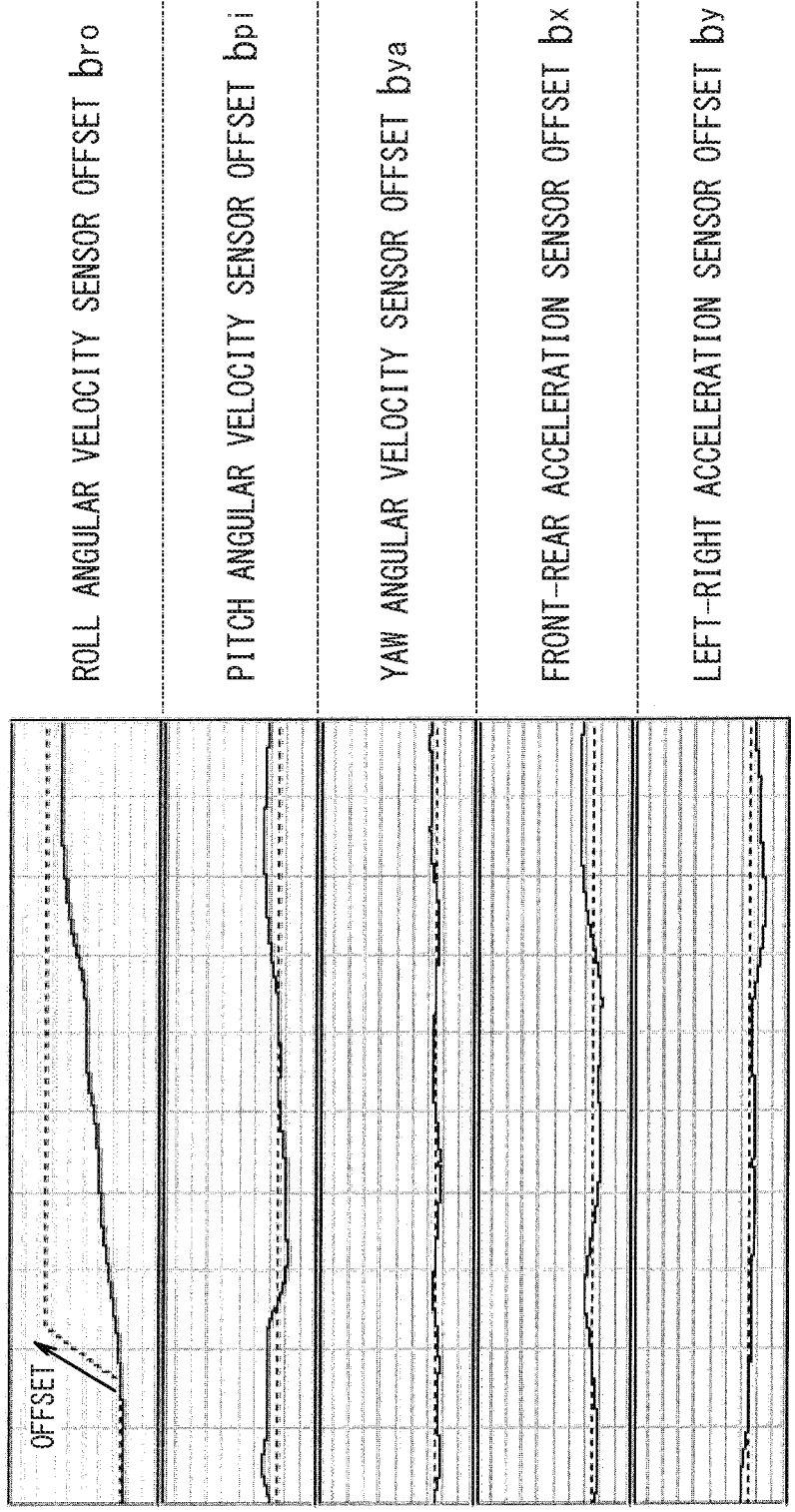
FIG. 20C illustrates how the estimated values of various parameters change over time.
Figure 20D:
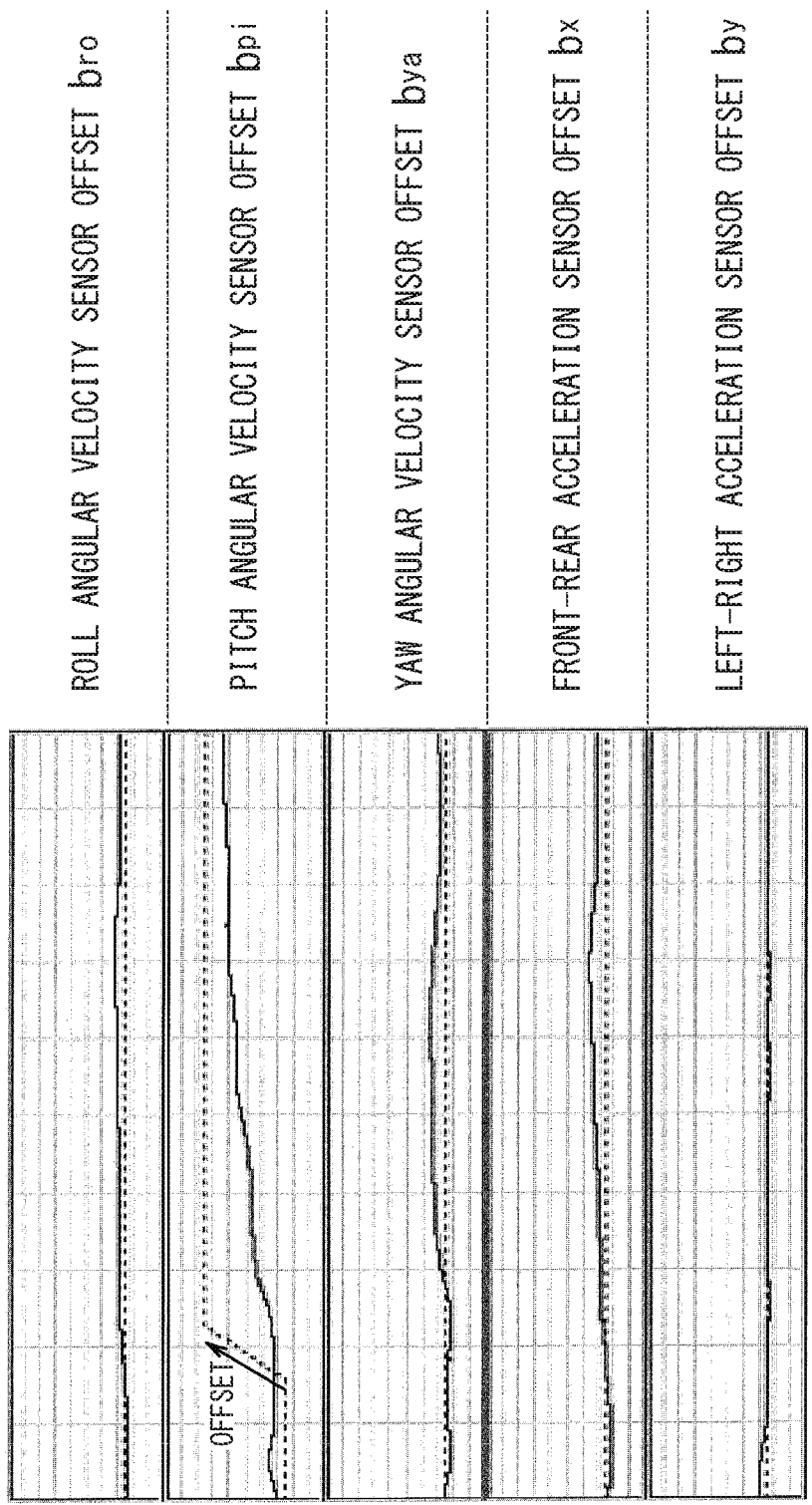
FIG. 20D illustrates how the estimated values of various parameters change over time.
Figure 20E:
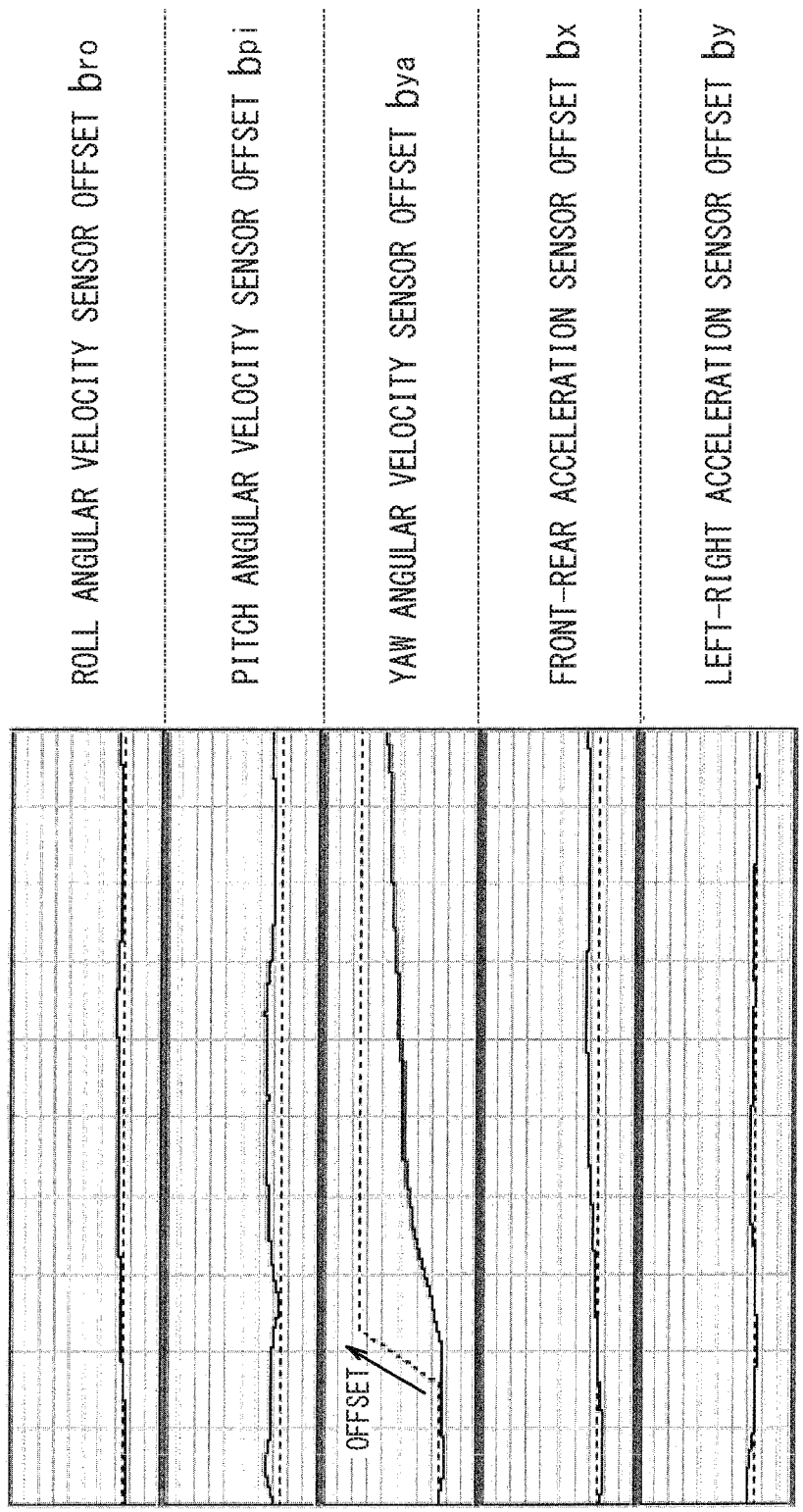
FIG. 20E illustrates how the estimated values of various parameters change over time.
Figure 20F:
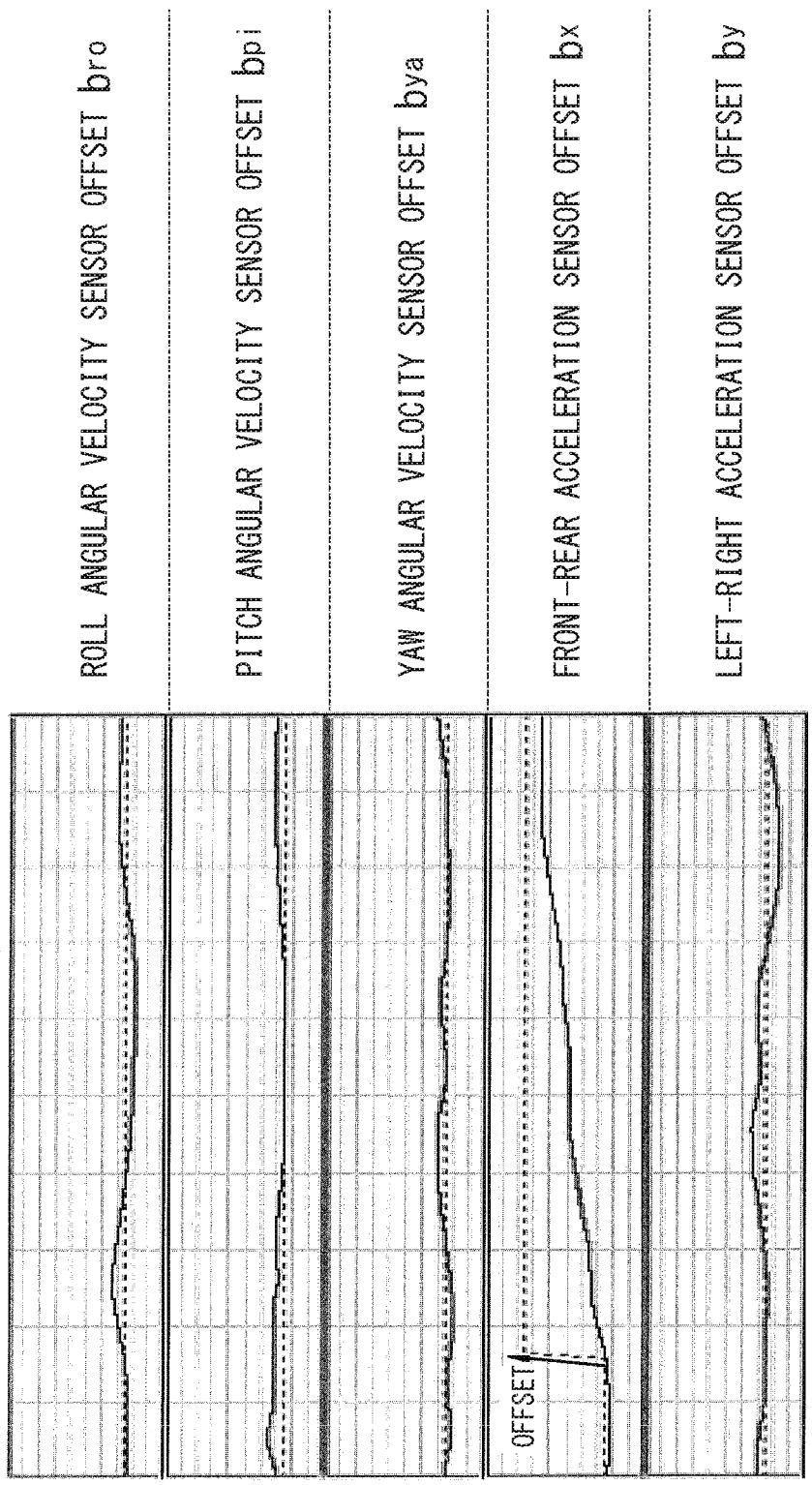
FIG. 20F illustrates how the estimated values of various parameters change over time.

FIG. 20C shows the estimated values found when an offset of 1 deg/sec was superimposed in the roll angular velocity sensor 21 after a predetermined period of time. FIG. 20D shows the estimated values found when an offset of 1 deg/sec was superimposed in the pitch angular velocity sensor 23 after a predetermined period of time. FIG. 20E shows the estimated values found when an offset of 1 deg/sec was superimposed in the yaw angular velocity sensor 22 after a predetermined period of time. FIG. 20F shows the estimated values found when an offset of 100 mG was superimposed in the front-rear acceleration sensor 25 after a predetermined period of time.

Figure 20G:
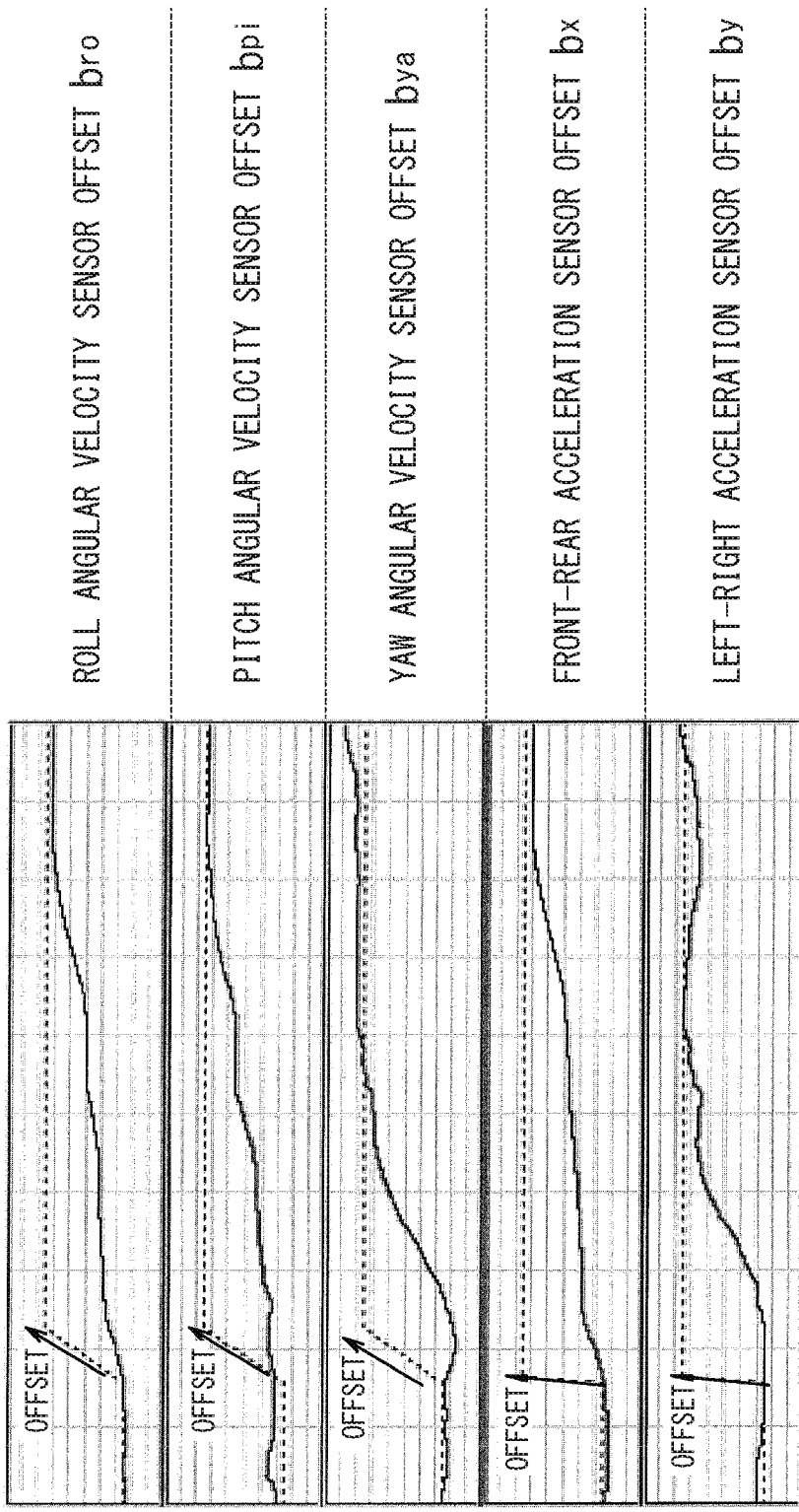
FIG. 20G illustrates how the estimated values of various parameters change over time.

FIG. 20G shows the estimated values found when offsets were superimposed in all the sensors in a combined manner. Specifically, an offset of 1 deg/sec was superimposed in the roll angular velocity sensor 21, an offset of 1 deg/sec was superimposed in the pitch angular velocity sensor 23, an offset of 1 deg/sec was superimposed in the yaw angular velocity sensor 22, an offset of 100 mG was superimposed in the front-rear acceleration sensor 25, and an offset of 100 mG was superimposed in the left-right acceleration sensor 26.

FIGS. 20C to 20G demonstrate that, immediately after an offset was superimposed, the estimated values of some other sensor offsets temporarily fluctuated, but converged over time. This verifies that, in each case, the values of the sensor offsets were estimated with high accuracy without being interfered with by other offsets.

Further, the results from Examples 1 to 3 prove that an estimation with high accuracy was achieved even when the unit associated with the offset quantity estimated in the Kalman filters 50 varies or even when the unit associated with the offset quantity estimated by using a likelihood varies.

EXAMPLE 4

FIGS. 21A and 21B compare the estimate accuracy of the attitude estimation apparatus according to the first embodiment with the estimation accuracy of the attitude estimation apparatus according to the second embodiment. FIGS. 21A and 21B are graphs showing the estimated values resulting when an offset was superimposed in the roll angular velocity sensor 21, pitch angular velocity sensor 23, yaw angular velocity sensor 22, front-rear acceleration sensor 25, and top-bottom acceleration sensor 24. FIG. 21B is a graph showing the difference values between the results shown in FIG. 21A and the true values.

In FIGS. 21A and 21B, a dotted line represents a true value. A two-dot-chain line represents the results from an attitude estimation apparatus configured as a reference example. The reference example represents an attitude estimation apparatus including a roll angular velocity sensor 21, a yaw angular velocity sensor 22, a top-bottom acceleration sensor 24, a front-rear acceleration sensor 25 and a left-right acceleration sensor 26 and including one Kalman filter 50. The attitude estimation apparatus of the reference example is configured to estimate the roll angular velocity sensor offset $b_{ro}$, yaw angular velocity sensor offset $b_{yo}$ and top-bottom acceleration sensor offset $b_z$.

In FIGS. 21A and 21B, a broken line represents the results from the attitude estimation apparatus according to the first embodiment. This attitude estimation apparatus is configured to estimate the roll angular velocity sensor offset $b_{ro}$, yaw angular velocity sensor offset $b_{yo}$, pitch angular velocity sensor offset $b_{pi}$, and top-bottom acceleration sensor offset $b_z$.

In FIGS. 21A and 21B, a solid line represents the results from the attitude estimation apparatus according to the second embodiment. This attitude estimation apparatus is configured to estimate the roll angular velocity sensor offset $b_{ro}$, yaw angular velocity sensor offset $b_{yo}$, pitch angular velocity sensor offset $b_{pi}$, top-bottom acceleration sensor offset $b_z$, and front-rear acceleration sensor offset $b_x$. In this arrangement, the roll angular velocity sensor offset $b_{ro}$, yaw angular velocity sensor offset $b_{yo}$, pitch angular velocity sensor offset $b_{pi}$, and front-rear acceleration sensor offset $b_x$ are estimated by the Kalman filters 50 and the top-bottom acceleration sensor offset $b_z$ is estimated using a likelihood.

From FIGS. 21A and 21B, it can be understood that the greater the number of offsets being estimated, the closer the estimated values are to true values.

Alternative Embodiments

Alternative embodiments will be described.

Figure 22:
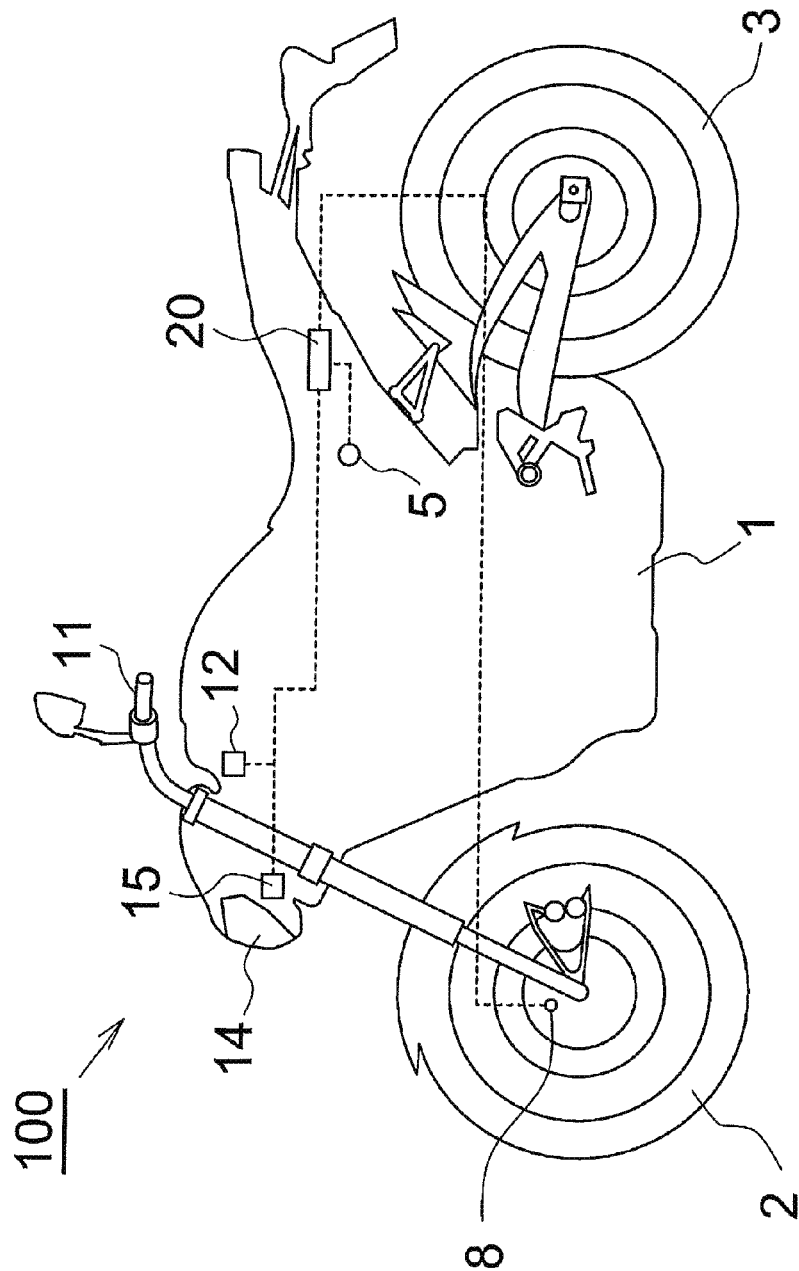
FIG. 22 is a schematic view of a vehicle including the attitude estimation apparatus according to an embodiment.

<1> According to the above-illustrated embodiments, information from the rear-wheel velocity sensor 7 provided on the rear wheel 3 is provided, as the rear-wheel velocity, to the calculation unit 49. Alternatively, as shown in FIG. 22, information from a front-wheel velocity sensor 8 provided on the front wheel 2 may be provided, as the front-wheel velocity, to the calculation unit 49. In such implementations, the above-provided equations may be calculated with the vector ρ replaced by the vector σ. For calculation, the force vector FP may be read as the force acting on the road-surface grounding point P3 of the rear wheel 3 and the force vector FR may be read as the force acting on the road-surface grounding point P2 of the front wheel 2 to enable the attitude estimation of the vehicle body 1 using the same method as described above.

<2> When the moment of the force acting on the vehicle 100 as viewed from the reference point O is calculated, the aerodynamic vector γ may be approximated, γ=0. In such implementations, the term with γ is not present in Equation (57); however, since the relational expression of Equation (51) is used during the process of rearranging Equation (57) to Equation (58) to replace γ with the function of another factor, the same equation as Equation (58) is found.

<3> The angular velocity sensors, i.e. roll angular velocity sensor 21, yaw angular velocity sensor 22 and pitch angular velocity sensor 23 may be replaced by sensors for detecting the angular velocities about three or more axes different from the top-bottom direction, left-right direction and front-rear direction of the vehicle 100. In such implementations, the detected values from the angular velocity sensors may be replaced by the roll angular velocity $\omega_{ro}$, pitch angular velocity $\omega_{pi}$ and yaw angular velocity $\omega_{ya}$ using a geometrical method. Then, based on the replacement values, the attitude estimation apparatus 10 may perform the calculation defined by the above-provided Equations.

Similarly, in the above-illustrated embodiments, the acceleration sensors, i.e. top-bottom acceleration sensor 24, front-rear acceleration sensor 25 and left-right acceleration sensor 26 may be replaced by three or more acceleration sensors for directions different from the top-bottom direction, left-right direction and front-rear direction of the vehicle 100. In such implementations, the detected values from the acceleration sensors may be replaced by the top-bottom acceleration $G_z$, front-rear acceleration $G_x$ and left-right acceleration $G_y$ using a geometrical method. Then, based on the replacement values, the attitude estimation apparatus 10 may perform the calculation defined by the above-provided equations.

<4> In the above-illustrated embodiments, one of the input parameters for the calculation unit 49 is the rear-wheel velocity $v_r$; alternatively, the vehicle velocity detected by a velocity sensor capable of measuring the travel speed (i.e. vehicle velocity) of the vehicle 100 may be an input parameter for the calculation unit 49. One example may be information from a GPS sensor.

In such implementations, the vehicle velocity Vx estimated by the calculation unit 49 may be replaced by information relating to the vehicle velocity detected by the sensor. That is, the calculation unit 49 may not estimate the vehicle velocity $V_x$.

<5> In the above-illustrated embodiments, the calculation unit 49 may be implemented by the ECU 20 and a program; alternatively, some or all of the functionalities of the calculation unit 49 may be implemented by hardware such as electronic circuitry.

<6> The filtering method for the Kalman filters of the present invention are not limited to the filtering for the Kalman filters 50 of the above-illustrated embodiments. The above example may be replaced by another adaptive filtering method. Exemplary Kalman filters may be the LMS (least mean square) adaptive filter or H∞ filtering, for example.

<9> In the above-illustrated embodiments, the attitude estimation apparatus 10 is applied to a motorcycle; alternatively, if similar modeling is possible, it may be applied to other vehicles such as a motor four-wheeler or motor three-wheeler or various transportation machines such as ships.

In the above-illustrated embodiments, an offset error is a value indicative of the difference between a detected value from each detection unit and an actual value, i.e. true value. Each Kalman filter receives detected values from a plurality of detection units. Further, each Kalman filter receives an imaginary offset quantity. An imaginary offset quantity is an imaginary value of an offset error for at least one of the detection units, i.e. of the first offset error. The detection unit with which the first offset error is associated is the detection unit of interest. An imaginary offset quantity is an imaginary value of the offset error for the detection unit of interest.

At least two of the imaginary offset quantities provided to the Kalman filters are different from each other. That is, at least two imaginary offset quantities that are different from each other are provided to at least two Kalman filters, respectively.

Each Kalman filter provides an estimated value of the roll angle and a likelihood. Further, each Kalman filter may provide, as an estimated value, an offset error for at least one of a plurality of detection units that is other than the detection unit of interest (i.e. second offset error). Each Kalman filter is configured to calculate the estimated value from the current estimation operation using a plurality of detected values input during the current estimation operation and an estimated value calculated during the previous estimation operation.

In the above-illustrated embodiments, each Kalman filter receives a detected value from the first angular velocity detection unit, a detected value from the second angular velocity detection unit, a detected value from the first acceleration detection unit, a detected value from the second acceleration detection unit, a detected value from the third acceleration detection unit, a detected value from the velocity information detection unit, and an imaginary offset quantity for the first offset error. The output of each Kalman filter includes at least the estimated value of the roll angle of the movable body and a likelihood.

For the current estimation operation, each Kalman filter uses at least one of the detected value from the first angular velocity detection unit, the detected value from the second angular velocity detection unit, the detected value from the first acceleration detection unit, the detected value from the second acceleration detection unit, the detection value from the third acceleration detection unit and the detected value from the velocity information detection unit, as well as the estimated value from the previous estimation operation, to calculate a current intermediate estimated value. The Kalman filter corrects the intermediate estimated value based on the result of a comparison between the previous estimated value and the observed value. The observed value may be at least one of the detected value from the first angular velocity detection unit, the detected value from the second angular velocity detection unit, the detected value from the first acceleration detection unit, the detected value from the second acceleration detection unit, the detected value from the third acceleration detection unit and the detected value from the velocity information detection unit. In the above-illustrated examples, each Kalman filter calculates a Kalman gain as an example of the value indicating the result of the comparison between the previous estimated value and observed value. The intermediate estimated value is corrected using the value indicating the result of the comparison between the previous estimated value and observed value, and the resulting value is provided as the estimated value of the current estimation operation.

In the above-illustrated embodiments, each Kalman filter calculates the likelihood based on an observation/prediction error which indicates how different the previous estimated value and observed value are. The observed value may be at least one of the detected value from the first angular velocity detection unit, the detected value from the second angular velocity detection unit, the detected value from the first acceleration detection unit, the detected value from the second acceleration detection unit, the detected value from the third acceleration detection unit and the detected value from the velocity information detection unit.

EXPLANATION OF REFERENCE CHARACTERS

1: vehicle body
2: front wheel
3: rear wheel
5: group of sensors
7: rear-wheel velocity sensor
8: front-wheel velocity sensor
10: attitude estimation apparatus
11: handlebars
12: navigation system
14: headlight
15: headlight driving device
16: front fork
20: electronic control unit (ECU)
21: roll angular velocity sensor
22: yaw angular velocity sensor
23: pitch angular velocity sensor
24: top-bottom acceleration sensor
25: front-rear acceleration sensor
26: left-right acceleration sensor
31, 32, 33, 34, 35 and 36: low-pass filters
41, 42, 43 and 45: differentiators
49: calculation unit
50: Kalman filters
51: system equation calculation unit
52: observation equation calculation unit
53: subtractor
54: adder
55: integrator
56: Kalman gain calculation unit
57 likelihood calculation unit
58: low-pass filter
59: imaginary offset input unit
60: load estimation unit
70: suspension stroke quantity estimation unit
80: elevation/depression angle estimation unit
90: slope estimation unit
100: vehicle
200: road surface

The invention claimed is:

1. An attitude estimation apparatus for estimating an attitude of a movable body, comprising:
a first angular velocity detection unit configured to detect a first angular velocity, the first angular velocity being an angular velocity of the movable body about a first axis;
a second angular velocity detection unit configured to detect a second angular velocity, the second angular velocity being an angular velocity of the movable body about a second axis, the second axis being in a different direction than that of the first axis;
a first acceleration detection unit configured to detect a first acceleration, the first acceleration being an acceleration of the movable body in a first direction;
a second acceleration detection unit configured to detect a second acceleration, the second acceleration being an acceleration of the movable body in a second direction, the second direction being different from the first direction;
a third acceleration detection unit configured to detect a third acceleration, the third acceleration being an acceleration of the movable body in a third direction, the third direction being different from the first and second directions;
a velocity information detection unit configured to detect information about a moving velocity in a direction of advance of the movable body; and
an attitude estimation unit configured to estimate a roll angle of the movable body and estimate a first offset error using a calculation process, the first offset error being an offset error in at least one of the first angular velocity detection unit, the second angular velocity detection unit, the first acceleration detection unit, the second acceleration detection unit, or the third acceleration detection unit,
wherein the attitude estimation unit includes:
a plurality of Kalman filters each configured to receive, as an imaginary offset quantity for the first offset error, an associated one of a plurality of values including at least two values different from each other, and
each of the plurality of Kalman filters uses, in a current estimation operation, a detected value from the first angular velocity detection unit, a detected value from the second angular velocity detection unit, a detected value from the first acceleration detection unit, a detected value from the second acceleration detection unit, a detected value from the third acceleration detection unit, a detected value from the velocity information detection unit, an estimated value of the roll angle from a previous estimation operation, and the imaginary offset quantity to calculate the estimated value of the roll angle of the movable body and a likelihood in the current estimation operation, the likelihood representing a reliability of an estimation result, and
the attitude estimation unit estimates the first offset error based on the likelihoods obtained from the plurality of Kalman filters and the imaginary offset quantities provided to the plurality of Kalman filters.

2. The attitude estimation apparatus according to claim 1, wherein the attitude estimation unit estimates the first offset error by weighting the imaginary offset quantity received by each of the plurality of Kalman filters based on the likelihood obtained from each respective one of the plurality of Kalman filters.

3. The attitude estimation apparatus according to claim 1, wherein the attitude estimation unit estimates the roll angle of the movable body based on the likelihoods obtained from the plurality of Kalman filters and the roll angles of the movable body obtained from the plurality of Kalman filters.

4. The attitude estimation apparatus according to claim 1, wherein each of the plurality of Kalman filters includes:
   a first Kalman filter configured to receive, as the imaginary offset quantity, a value larger than a maximum possible value of an offset quantity for a detection unit of interest from among the first angular velocity detection unit, the second angular velocity detection unit, the first acceleration detection unit, the second acceleration detection unit, and the third acceleration detection unit, the detection unit of interest being the detection unit from among the first angular velocity detection unit, the second angular velocity detection unit, the first acceleration detection unit, the second acceleration detection unit, and the third acceleration detection unit with which the first offset error is associated;
   a second Kalman filter configured to receive, as the imaginary offset quantity, a value smaller than a minimum possible value of the offset quantity of the detection unit of interest; and
   a third Kalman filter configured to receive, as the imaginary offset quantity, a value between the minimum possible value and the maximum possible value of the offset quantity of the detection unit of interest.

5. The attitude estimation apparatus according to claim 1, wherein the first offset error is the offset error from one of the first acceleration detection unit, the second acceleration detection unit, and the third acceleration detection unit.

6. The attitude estimation apparatus according to claim 1, wherein each of the plurality of Kalman filters calculates a second offset error in addition to the roll angle of the movable body and the likelihood, the second offset error being the offset error from one of the first angular velocity detection unit, the second angular velocity detection unit, the first acceleration detection unit, the second acceleration detection unit, and the third acceleration detection unit, other than a detection unit of interest, and, in a current estimation operation, calculates the estimated value of the roll angle of the movable body, an estimated value of the second offset error and the likelihood using the detected value from the first angular velocity detection unit, the detected value from the second angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, an estimated value of the second offset error from the previous estimation operation, and the imaginary offset quantity,
   wherein the attitude estimation unit estimates the second offset error based on the likelihoods obtained from the plurality of Kalman filters and the second offset errors obtained from the plurality of Kalman filters.

7. The attitude estimation apparatus according to claim 6, wherein the second offset error is the offset error from a detection unit, from among the first angular velocity detection unit, the second angular velocity detection unit, the first acceleration detection unit, the second acceleration detection unit, and the third acceleration detection unit, other than the detection unit of interest.

8. The attitude estimation apparatus according to claim 7, wherein the second offset error includes the offset errors from the first angular velocity detection unit and the second angular velocity detection unit.

9. The attitude estimation apparatus according to claim 8, wherein the second offset error includes the offset error from a detection unit, from among the first angular velocity detection unit, the second angular velocity detection unit, the first acceleration detection unit, the second acceleration detection unit, and the third acceleration detection unit, other than the detection unit of interest.

10. The attitude estimation apparatus according to claim 9, wherein:
    the first angular velocity detection unit detects a roll angular velocity of the movable body,
    the second angular velocity detection unit detects a yaw angular velocity of the movable body, and
    the second offset error includes the offset error from the first angular velocity detection unit, the offset error from the second angular velocity detection unit and the offset error from one of the first acceleration detection unit and the second acceleration detection unit that is other than the detection unit of interest.

11. The attitude estimation apparatus according to claim 1, wherein the first acceleration detection unit detects an acceleration in a top-bottom direction of the movable body,
    the second acceleration detection unit detects an acceleration in a left-right direction of the movable body,
    the third acceleration detection unit detects an acceleration in a front-rear direction of the movable body, and
    the first offset error is the offset error from the first acceleration detection unit or the offset error from the second acceleration detection unit.

12. The attitude estimation apparatus according to claim 6, further comprising:
    a third angular velocity detection unit configured to detect a third angular velocity, the third angular velocity being an angular velocity of the movable body about a third axis, the third axis being different from the first and second axes,
    wherein each of the plurality of Kalman filters, in a current estimation operation, calculates the estimated value of the roll angle of the movable body, an estimated value of the pitch angle of the movable body and the likelihood using the detected value from the first angular velocity detection unit, the detected value from the second angular velocity detection unit, a detected value from the third angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, the estimated value of the pitch angle from the previous estimation operation, the imaginary offset quantity, and an estimated value of the second offset error from the previous estimation operation,
    the attitude estimation unit estimates the first offset quantity based on the likelihoods obtained from the plurality of Kalman filters and the imaginary offset quantities provided to the plurality of Kalman filters, estimates the roll angle of the movable body based on the likelihoods obtained from the plurality of Kalman filters and the roll angles of the movable body obtained from the plurality of Kalman filters, and estimates the pitch angle of the movable body based on the likelihoods obtained from the plurality of Kalman filters and the pitch angles of the movable body obtained from the plurality of Kalman filters.

13. The attitude estimation apparatus according to claim 12, wherein each of the plurality of Kalman filters, in the current estimation operation, calculates the estimated value of the roll angle of the movable body, the estimated value of the pitch angle of the movable body and the likelihood using a characteristic equation in which a value of a predetermined function is a constant, the function having, as its elements, the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, the estimated value of the roll angle from the previous estimation operation, the estimated value of the pitch angle from the previous estimation operation, the imaginary offset quantity, and the estimated value of the second offset error from the previous estimation operation.

14. The attitude estimation apparatus according to claim 12, further comprising:
a load estimation unit configured to estimate a load applied to at least one of a front wheel and a rear wheel included in the movable body,
wherein the load estimation unit estimates the load based on the detected value from the first angular velocity detection unit, the detected value from the second angular velocity detection unit, the detected value from the third angular velocity detection unit, the detected value from the first acceleration detection unit, the detected value from the second acceleration detection unit, the detected value from the third acceleration detection unit, the detected value from the velocity information detection unit, and the roll angle of the movable body, the pitch angle of the movable body and the first offset error estimated by the attitude estimation unit.

15. The attitude estimation apparatus according to claim 14, further comprising:
a suspension stroke quantity estimation unit configured to estimate a stroke quantity of a suspension provided on at least one of the front wheel and the rear wheel of the movable body,
wherein the load estimation unit estimates the load applied to both the front wheel and the rear wheel provided on the movable body, and
the suspension stroke quantity estimation unit estimates the stroke quantity of the suspension based on an estimated value of the load applied to both the front wheel and the rear wheel estimated by the load estimation unit.

16. The attitude estimation apparatus according to claim 15, further comprising:
an elevation/depression angle estimation unit configured to estimate an elevation/depression angle based on an estimated value of the stroke quantity of the suspension estimated by the suspension stroke quantity estimation unit, the elevation/depression angle being an angle between an axis in a vehicle-body coordinate system fixed to the movable body and an axis in a road-surface coordinate system fixed to a road surface in contact with the front wheel or the rear wheel.

17. The attitude estimation apparatus according to claim 16, wherein each of the plurality of Kalman filters calculates the estimated value of the roll angle of the movable body, the estimated value of the pitch angle of the movable body, and the likelihood taking account of an estimated value of the elevation/depression angle estimated by the elevation/depression angle estimation unit.

18. The attitude estimation apparatus according to claim 16, further comprising:
a slope estimation unit configured to estimate a longitudinal slope of the road surface on which the movable body is placed based on an estimated value of the elevation/depression angle estimated by the elevation/depression angle estimation unit and the estimated values of the roll angle and the pitch angle of the movable body estimated by the attitude estimation unit.

19. A transportation machine comprising:
the movable body; and
the attitude estimation apparatus according to claim 1.

* * * * *